United States Patent
Matsuo

(10) Patent No.: US 12,487,436 B2
(45) Date of Patent: Dec. 2, 2025

(54) IMAGE-FORMING OPTICAL SYSTEM, PROJECTION DEVICE, AND IMAGING DEVICE

(71) Applicant: Nittoh Inc., Nagano (JP)

(72) Inventor: Takahiko Matsuo, Nagano (JP)

(73) Assignee: Nittoh Inc., Nagano (JP)

( * ) Notice: Subject to any disclaimer, the term of this patent is extended or adjusted under 35 U.S.C. 154(b) by 426 days.

(21) Appl. No.: 18/019,712

(22) PCT Filed: Aug. 3, 2021

(86) PCT No.: PCT/JP2021/028805
§ 371 (c)(1),
(2) Date: Feb. 3, 2023

(87) PCT Pub. No.: WO2022/030503
PCT Pub. Date: Feb. 10, 2022

(65) Prior Publication Data
US 2023/0305275 A1 Sep. 28, 2023

(30) Foreign Application Priority Data
Aug. 5, 2020 (JP) .................................. 2020-133008

(51) Int. Cl.
*G02B 13/16* (2006.01)
*G02B 7/04* (2021.01)
*G02B 15/14* (2006.01)

(52) U.S. Cl.
CPC ............... *G02B 13/16* (2013.01); *G02B 7/04* (2013.01); *G02B 15/143103* (2019.08)

(58) Field of Classification Search
CPC .... G02B 13/16; G02B 15/143; G02B 15/103; G02B 7/04; G02B 15/143103
(Continued)

(56) References Cited

U.S. PATENT DOCUMENTS 10,063,819 B2  8/2018  Matsuo
10,375,363 B2  8/2019  Matsuo
(Continued)

FOREIGN PATENT DOCUMENTS

JP  5728202 B2  6/2015
JP  2017068089 A  4/2017
(Continued)

OTHER PUBLICATIONS

Translation of JP 2020106660 (Year: 2025).*
(Continued)

*Primary Examiner* — Jerry L Brooks
(74) *Attorney, Agent, or Firm* — Harter Secrest & Emery LLP; Timothy W. Menasco, Esq.

(57) ABSTRACT

An image formation optical system includes a first optical system, in which a first refractive system is arranged toward the reduction side of an intermediate image and a second refractive system is arranged toward the magnification side of the intermediate image, and the first refractive system has a first stop, and the second refractive system has a second stop. Lens surfaces are arranged next to and both toward the reduction side and toward the magnification side of the first stop and the second stop, and the following condition is satisfied:

1.5<$Y1$-1 (unit of mm), where $Y1$-1 is the absolute value of the ray height of a principal ray at an outermost angle of view in rays emitted from a lens surface arranged next to and toward the reduction side of the first stop.

24 Claims, 45 Drawing Sheets

(58) Field of Classification Search
USPC .......................................................... 353/101
See application file for complete search history.

(56) References Cited

U.S. PATENT DOCUMENTS

| | | | |
|---|---|---|---|
| 10,645,353 | B2 | 5/2020 | Matsuo |
| 2012/0120484 | A1 | 5/2012 | Konuma et al. |
| 2016/0021351 | A1* | 1/2016 | Yamagishi ........... H04N 9/3176 |
| | | | 348/745 |
| 2018/0284462 | A1 | 10/2018 | Kano |
| 2019/0235206 | A1 | 8/2019 | Ichimura |
| 2019/0306390 | A1 | 10/2019 | Nagatoshi et al. |
| 2021/0124244 | A1 | 4/2021 | Matsuo |

FOREIGN PATENT DOCUMENTS

| | | | |
|---|---|---|---|
| JP | 6313865 | B2 | 4/2018 |
| JP | 2019132904 | A | 8/2019 |
| JP | 2019174633 | A | 10/2019 |
| JP | 2020106660 | A * | 7/2020 |
| WO | 2014141718 | A1 | 9/2014 |
| WO | 2020008942 | A1 | 1/2020 |

OTHER PUBLICATIONS

International Search Report for PCT/JP2021/028805, Oct. 19, 2021.
International Search Opinion for PCT/JP2021/028805.
Notice of Reasons for Refusal, dated Jun. 27, 2025, in Japanese Patent Application No. 2022-541570, 13 pages.

* cited by examiner

FIG.2
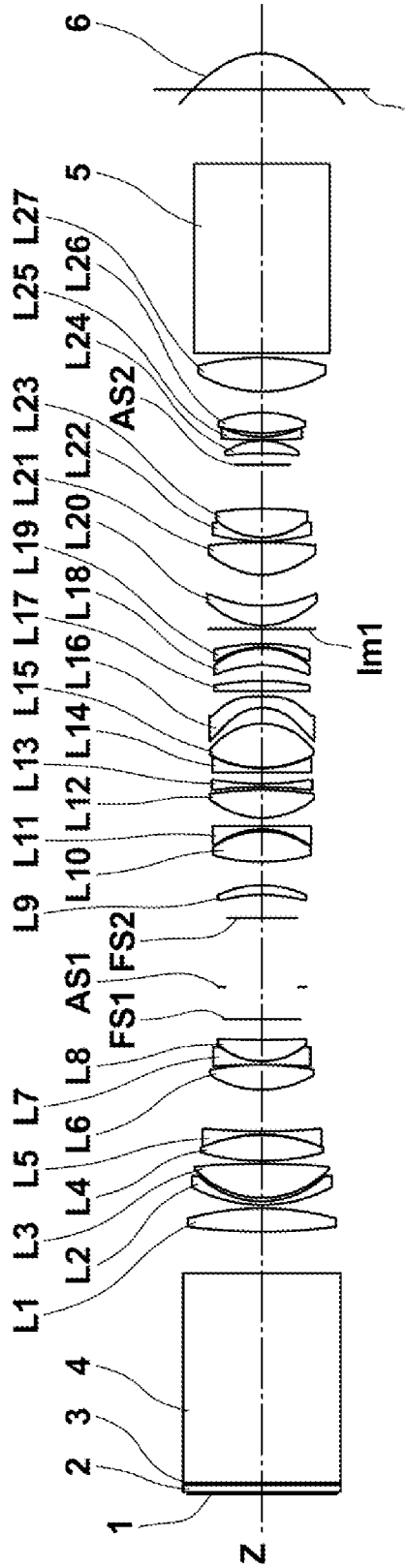
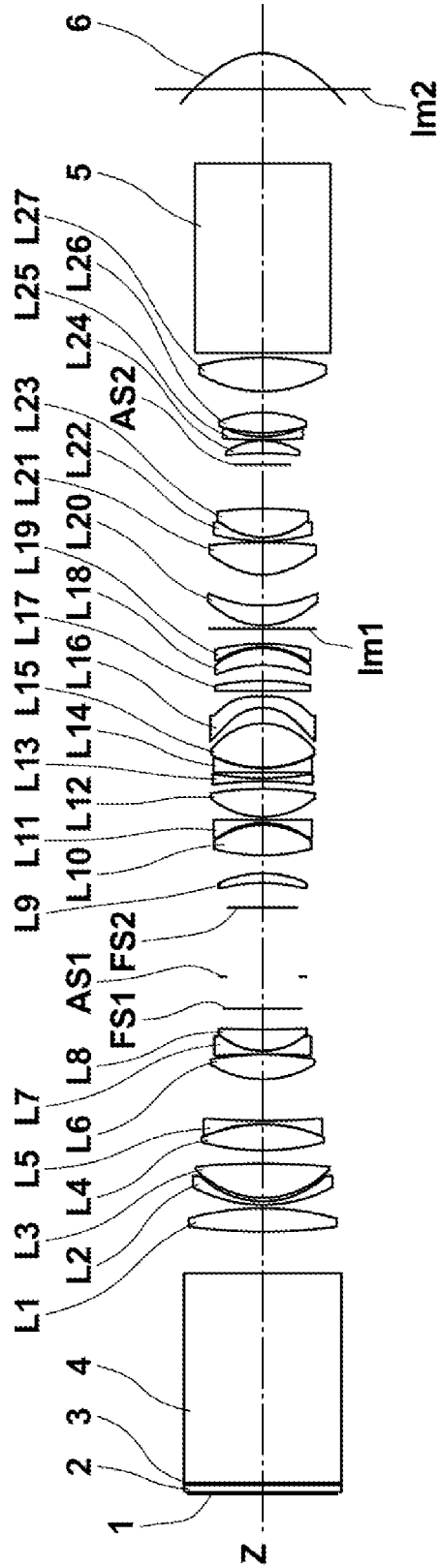

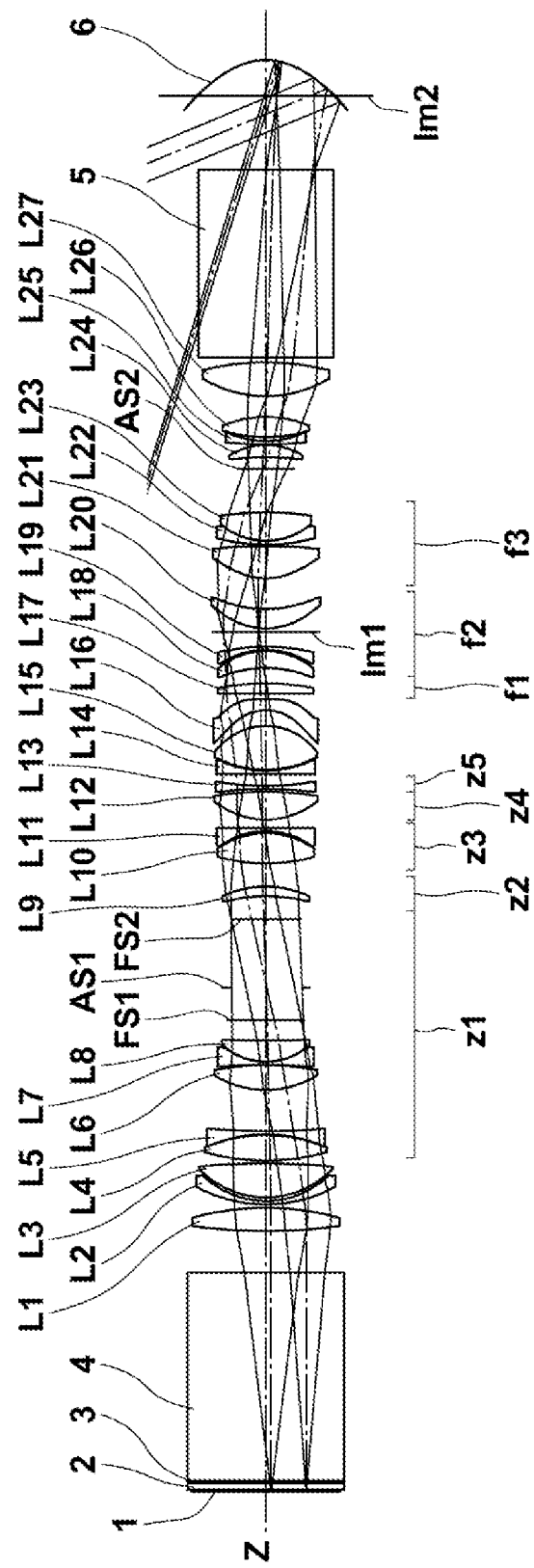

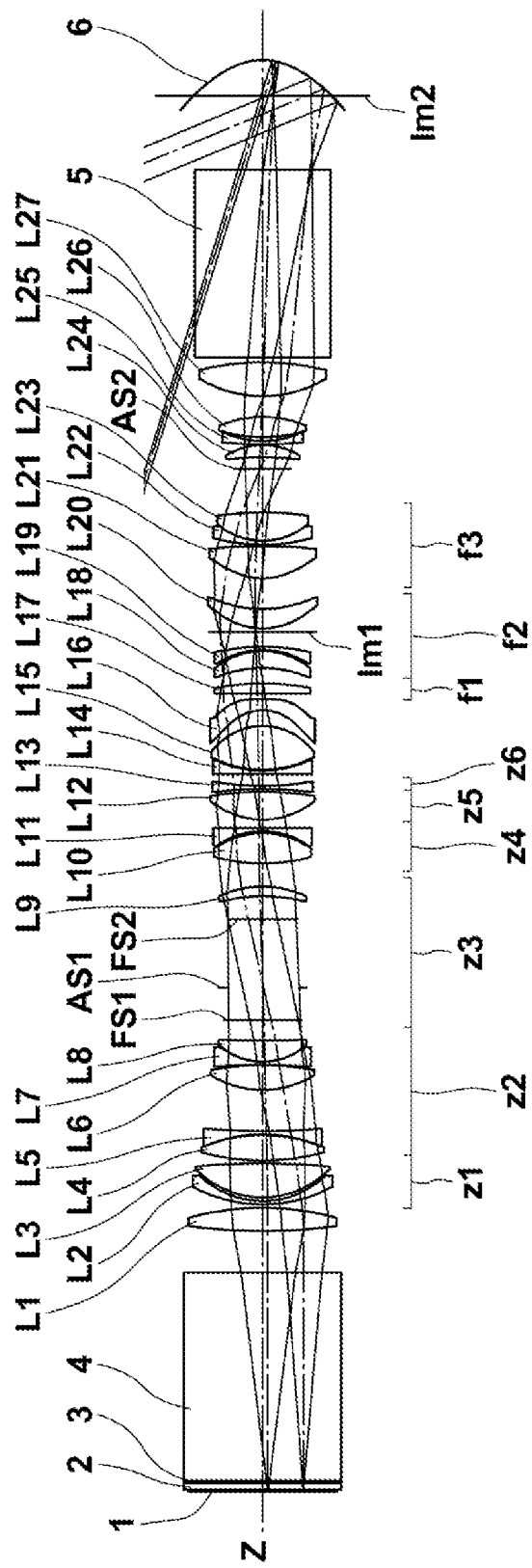

FIG.5

EXAMPLE 1 << BASIC DATA >>

| No. | ELEMENTS | RADIUS OF CURVATURE | SURFACE DISTANCE | EFFECTIVE DIAMETER | GLASS MATERIAL | REFRACTIVE INDEX | ABBE'S NUMBER |
|---|---|---|---|---|---|---|---|
| 0 | OBJ | Flat | 0.00 | | | | |
| 1 | | Flat | 0.80 | | | | |
| 2 | PR2 | Flat | 3.00 | 70.00 | ZKN7 | 1.5085 | 61.2 |
| 3 | PR3 | Flat | 1.00 | 70.00 | S-FSL5 | 1.4875 | 70.2 |
| 4 | PR4 | Flat | 91.00 | 70.00 | BK7 | 1.5168 | 64.2 |
| 5 | | Flat | 18.00 | 70.00 | | | |
| 6 | LENS L1 | 275.41 | 10.18 | 65.50 | FD60-W | 1.8052 | 25.5 |
| 7 | | -139.33 | 1.50 | 65.70 | | | |
| 8 | LENS L2 | 73.17 | 1.50 | 61.90 | TAFD35 | 1.9108 | 35.2 |
| 9 | | 44.82 | 1.53 | 58.70 | | | |
| 10 | LENS L3 | 45.83 | 14.88 | 59.20 | S-FPL55 | 1.4388 | 94.7 |
| 11 | | -364.80 | 1.20 | 58.40 | | | |
| 12 | LENS L4 | 116.64 | 11.20 | 53.90 | FCD705 | 1.5503 | 75.5 |
| 13 | | -76.46 | 0.25 | 52.30 | | | |
| 14 | LENS L5 | -72.88 | 1.40 | 52.20 | TAFD35 | 1.9108 | 35.2 |
| 15 | | 338.03 | 18.02 | 50.80 | | | |
| 16 | LENS L6 | 48.91 | 10.77 | 45.40 | S-FSL5 | 1.4875 | 70.2 |
| 17 | | -140.69 | 0.10 | 43.60 | | | |
| 18 | LENS L7 | -395.64 | 1.40 | 42.50 | S-LAL18 | 1.7292 | 54.7 |
| 19 | | 32.56 | 13.20 | 38.60 | | | |
| 20 | LENS L8 | 32.95 | 0.10 | 38.60 | J-PKH1 | 1.5186 | 69.9 |
| 21 | | 438.13 | 9.18 | 37.00 | | | |
| 22 | FS1 | Flat | 9.00 | 36.10 | | | |
| 23 | AS1 | Flat | 14.00 | 36.00 | | | |
| 24 | FS1 | Flat | 30.00 | 34.10 | | | |
| 25 | LENS L9 | -82.07 | 10.00 | 32.50 | S-NBH53V | 1.7380 | 32.3 |
| 26 | | -51.30 | 4.19 | 37.30 | | | |
| 27 | LENS L10 | 91.88 | 10.16 | 38.60 | S-NBM51 | 1.6134 | 44.3 |
| 28 | | -41.41 | 13.20 | 42.60 | | | |
| 29 | LENS L11 | -37.94 | 0.93 | 42.60 | S-LAH97 | 1.7550 | 52.3 |
| 30 | | -16771.47 | 1.40 | 42.10 | | | |
| 31 | LENS L12 | 40.54 | 3.58 | 43.20 | S-FPL55 | 1.4388 | 94.7 |
| 32 | | -161.33 | 12.13 | 45.80 | | | |
| 33 | LENS L13 | -197.45 | 1.20 | 44.90 | S-LAH60 | 1.8340 | 37.2 |
| 34 | | 143.72 | 5.11 | 44.20 | | | |
| 35 | LENS L14 | Flat | 1.60 | 43.60 | S-LAH93 | 1.9053 | 35.0 |
| 36 | | 55.95 | 0.30 | 43.40 | | | |
| 37 | LENS L15 | 55.06 | 19.08 | 43.80 | S-FPL55 | 1.4388 | 94.7 |
| 38 | | -31.40 | 6.84 | 45.10 | | | |
| *39 | LENS L16 | -25.34 | 5.00 | 43.00 | K-CSK120 | 1.5858 | 59.5 |
| *40 | | -165.21 | 2.30 | 46.00 | | | |
| 41 | LENS L17 | 5099.04 | 4.43 | 42.00 | S-FPL55 | 1.4388 | 94.7 |
| 42 | | -125.90 | 6.80 | 42.00 | | | |
| 43 | LENS L18 | -58.02 | 7.35 | 42.00 | S-LAH89 | 1.8515 | 40.8 |
| 44 | | -36.83 | 0.50 | 42.00 | | | |
| 45 | LENS L19 | -40.72 | 1.40 | 42.00 | S-NPH5 | 1.8590 | 22.7 |
| 46 | | -103.46 | 6.50 | 42.00 | | | |
| 47 | Im1 | Flat | 1.50 | 50.00 | | | |
| *48 | LENS L20 | 34.40 | 8.55 | 48.00 | K-CSK120 | 1.5858 | 59.5 |
| *49 | | 113.66 | 13.34 | 47.00 | | | |
| *50 | LENS L21 | 34.15 | 14.00 | 47.00 | K-PBK40 | 1.5161 | 63.3 |
| *51 | | -389.73 | 0.64 | 46.00 | | | |
| 52 | LENS L22 | 94.52 | 1.67 | 43.00 | S-LAH93 | 1.9053 | 35.0 |
| 53 | | 34.59 | 0.10 | 40.00 | | | |
| 54 | LENS L23 | 35.07 | 12.29 | 40.00 | S-FSL5 | 1.4875 | 70.2 |
| 55 | | -162.23 | 19.03 | 38.00 | | | |
| 56 | AS2 | Flat | 5.00 | 26.00 | | | |
| 57 | LENS L24 | -144.61 | 5.43 | 30.00 | S-FSL5 | 1.4875 | 70.2 |
| 58 | | -34.12 | 0.30 | 32.00 | | | |
| 59 | LENS L25 | 212.14 | 1.40 | 34.00 | TAFD35 | 1.9108 | 35.2 |
| 60 | | 44.60 | 1.73 | 35.00 | | | |
| 61 | LENS L26 | 76.05 | 8.80 | 35.00 | S-FPL55 | 1.4388 | 94.7 |
| 62 | | -54.96 | 9.10 | 38.00 | | | |
| 63 | LENS L27 | 61.58 | 14.71 | 56.00 | S-FPM2 | 1.5952 | 67.7 |
| 64 | | -129.86 | 2.00 | 56.00 | | | |
| 65 | PR5 | Flat | 82.00 | 60.00 | S-LAH66 | 1.7725 | 49.6 |
| 66 | | Flat | 32.34 | 60.00 | | | |
| 67 | Im2 | Flat | 15.66 | 100.00 | | | |
| *68 | MIR | -36.27 | -1170.00 | 73.00 | | | |
| 69 | IMG | Flat | 0.00 | | | | |

FIG.6

EXAMPLE 1  《ASPHERIC COEFFICIENT》

| No. | Rdy | K | A4 | A6 | A8 |
|---|---|---|---|---|---|
| 39 | -25.343 | -6.164000 | -8.158600E-05 | 2.412800E-07 | -5.141400E-10 |
| 40 | -165.209 | 0.000000 | -5.356900E-05 | 1.043400E-07 | -1.798300E-10 |
| 48 | 34.395 | 0.645860 | -6.235000E-06 | 4.264800E-08 | -2.132000E-10 |
| 49 | 113.66 | 0.000000 | 4.252000E-05 | -1.808000E-07 | 3.542300E-10 |
| 50 | 34.154 | -0.520320 | 1.149900E-05 | -8.302500E-08 | 2.303400E-10 |
| 51 | -389.727 | 0.000000 | 1.070800E-06 | -2.039200E-08 | 6.502700E-11 |

| A10 | A12 | A14 | A16 |
|---|---|---|---|
| 7.178000E-13 | -4.183700E-16 | 0.000000E+00 | 0.000000E+00 |
| 2.119800E-13 | -9.098800E-17 | 0.000000E+00 | 0.000000E+00 |
| 3.863900E-13 | -2.663500E-16 | 0.000000E+00 | 0.000000E+00 |
| -3.121600E-13 | 9.215400E-17 | 0.000000E+00 | 0.000000E+00 |
| -3.267600E-13 | 1.859900E-16 | 0.000000E+00 | 0.000000E+00 |
| -1.081000E-13 | 7.791400E-17 | 0.000000E+00 | 0.000000E+00 |

FIG.7

EXAMPLE 1  《ASPHERIC COEFFICIENT》

| No. | Rdy | K | A3 | A4 | A5 | A6 |
|---|---|---|---|---|---|---|
| 68 | -36.270 | -32.382000 | -8.443800E-04 | 2.323700E-05 | 0.000000E+00 | -1.152200E-08 |

| A8 | A10 | A12 | A14 | A16 |
|---|---|---|---|---|
| 6.804100E-12 | -2.761200E-15 | 5.022100E-19 | 0.000000E+00 | 0.000000E+00 |

FIG.8A
EXAMPLE 1  《ZOOM/FOCUS》FIRST PARAMETER

| Z | EFL | s1 | s11 | s24 | s26 | s30 | s32 | s34 |
|---|---|---|---|---|---|---|---|---|
|  |  | ZOOM | ZOOM | ZOOM | ZOOM | ZOOM | ZOOM | ZOOM |
| 1 | -9.068 | 0.800 | 1.200 | 10.000 | 10.160 | 3.580 | 1.200 | 5.110 |
| 2 | -9.477 | 0.800 | 5.700 | 10.630 | 7.740 | 1.200 | 3.300 | 2.670 |
| 3 | -9.078 | 0.800 | 1.200 | 10.000 | 10.160 | 3.580 | 1.200 | 5.110 |
| 4 | -9.487 | 0.800 | 5.700 | 10.630 | 7.740 | 1.200 | 3.300 | 2.670 |

| s40 | s42 | s49 | s51 | s55 |
|---|---|---|---|---|
| FOCUS | FOCUS | FOCUS | FOCUS | FOCUS |
| 2.300 | 6.800 | 13.340 | 0.640 | 19.030 |
| 2.300 | 6.800 | 13.340 | 0.640 | 19.030 |
| 2.780 | 6.040 | 13.700 | 0.250 | 19.350 |
| 2.780 | 6.040 | 13.700 | 0.250 | 19.350 |

FIG.8B
EXAMPLE 1  《ZOOM/FOCUS》SECOND PARAMETER

| Z | EFL | s7 | s11 | s21 | s26 | s30 | s32 | s34 |
|---|---|---|---|---|---|---|---|---|
|  |  | ZOOM | ZOOM | ZOOM | ZOOM | ZOOM | ZOOM | ZOOM |
| 1 | -9.068 | 1.500 | 1.200 | 9.000 | 10.160 | 3.580 | 1.200 | 5.110 |
| 2 | -9.482 | 1.700 | 5.500 | 9.630 | 7.740 | 1.200 | 3.300 | 2.670 |

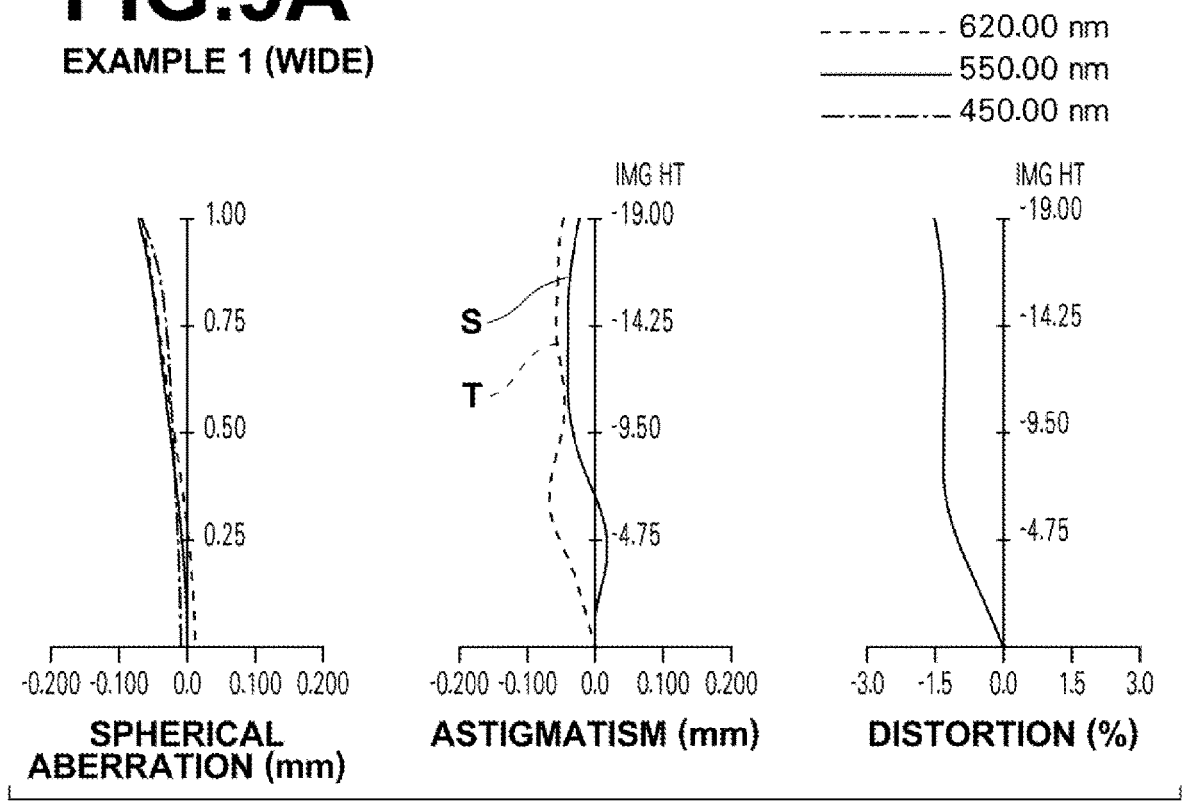
FIG.9A EXAMPLE 1 (WIDE)
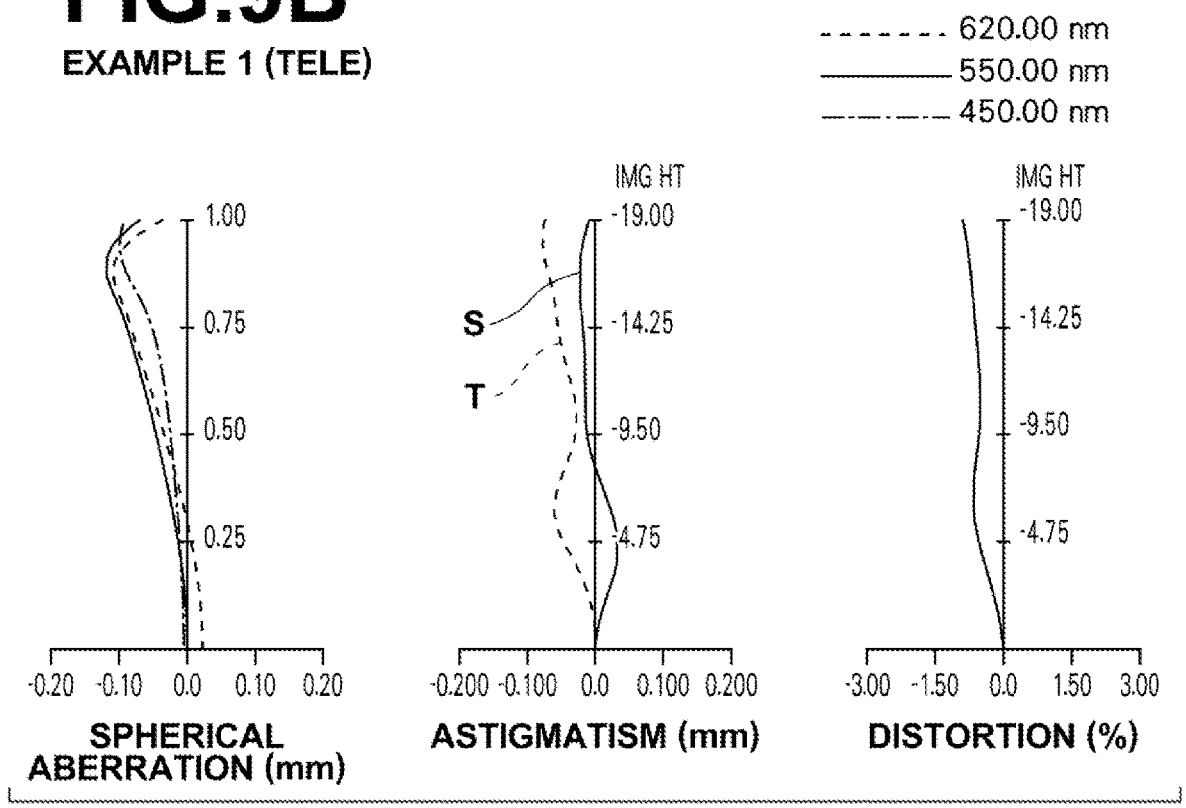
FIG.9B EXAMPLE 1 (TELE)

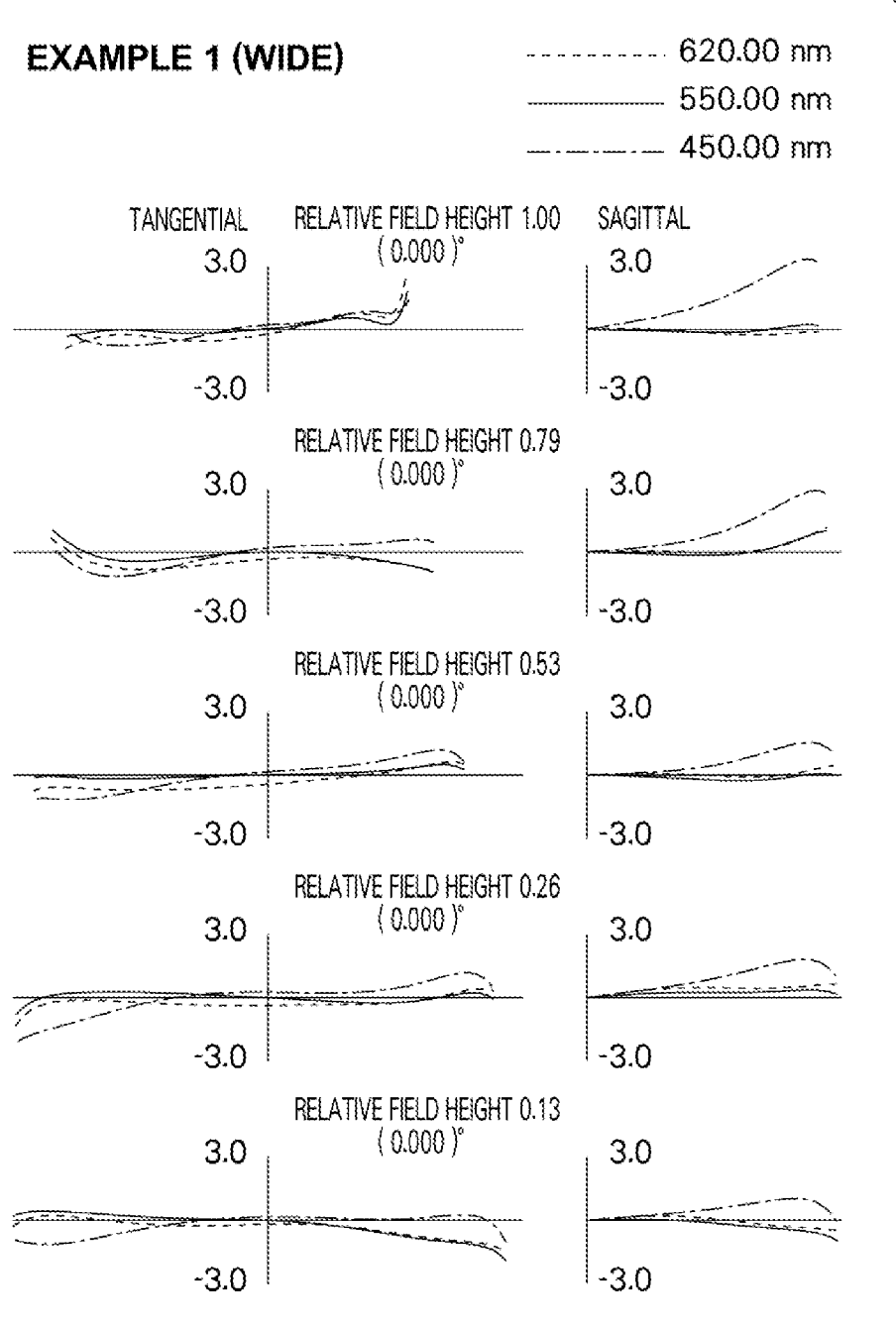

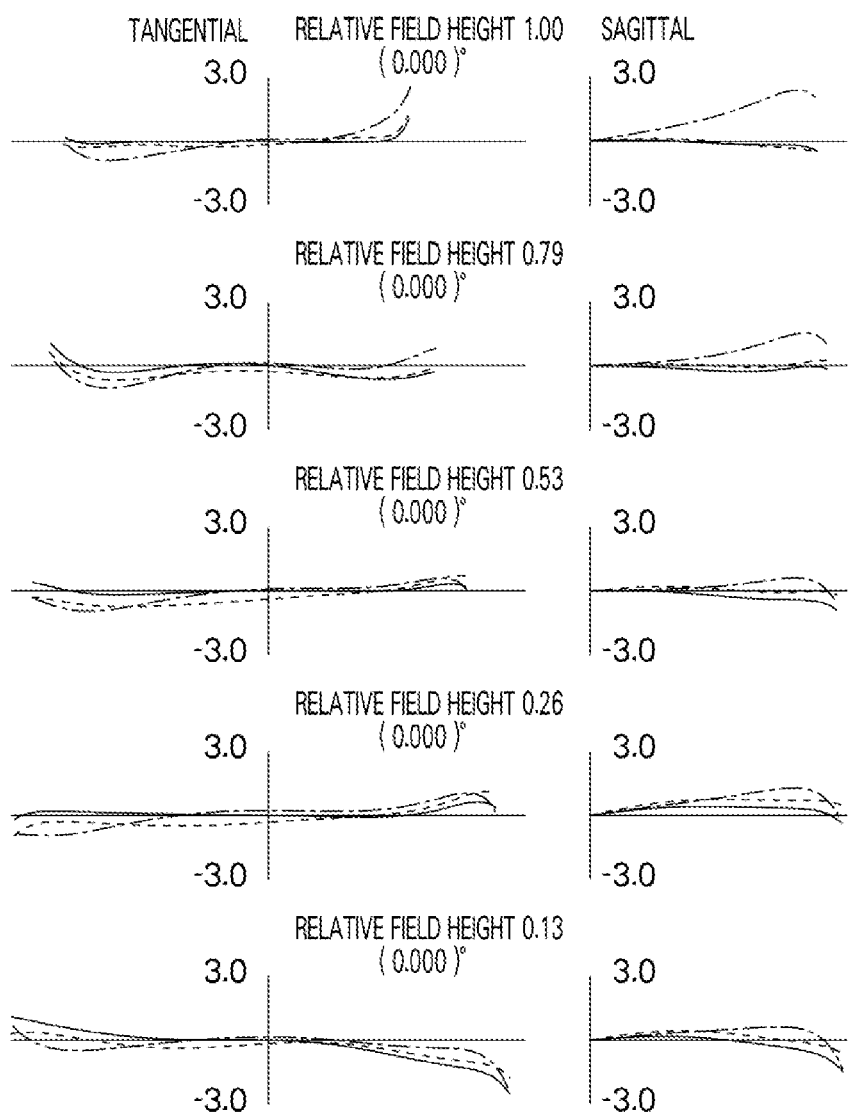

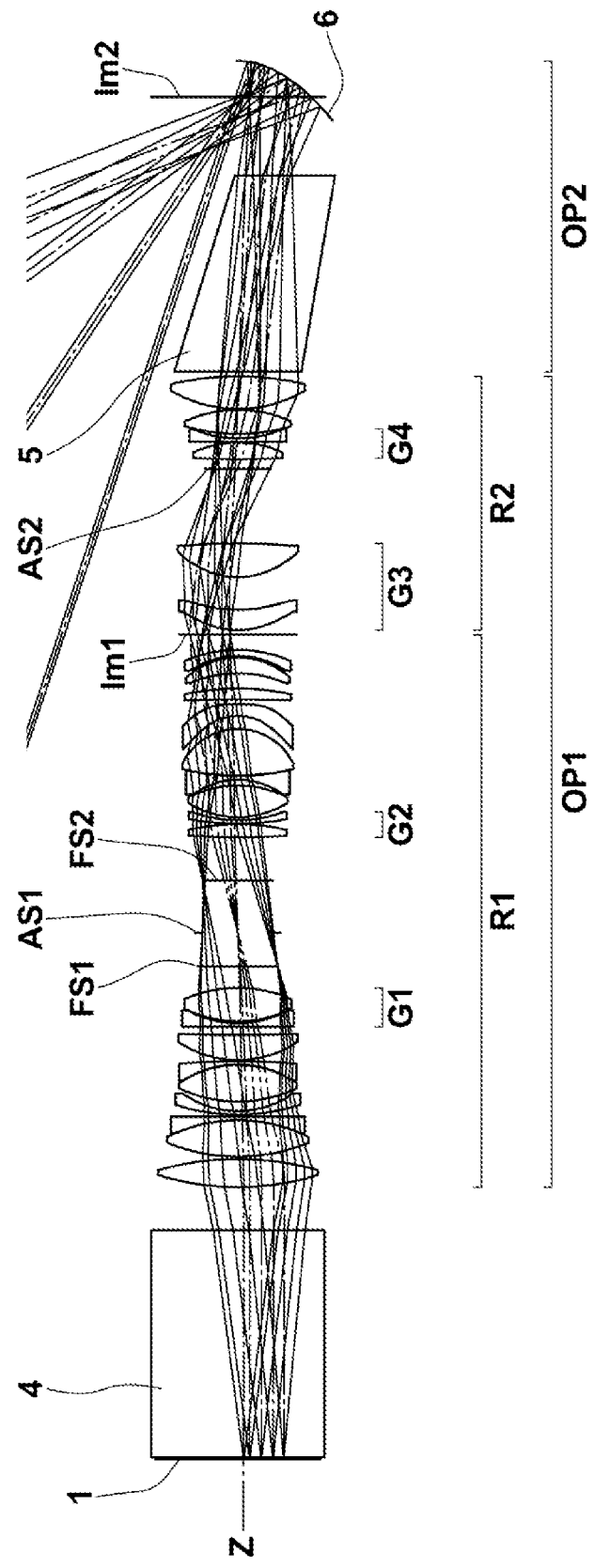

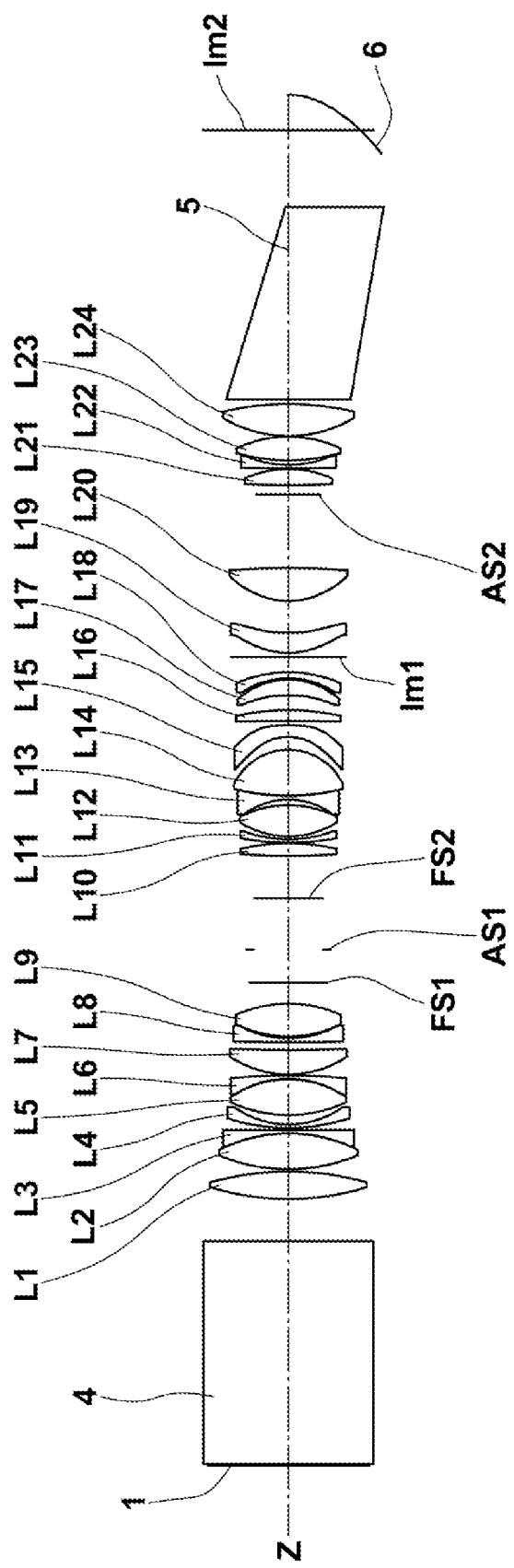

FIG.14

EXAMPLE 2 << BASIC DATA >>

| No. | ELEMENTS | RADIUS OF CURVATURE | SURFACE DISTANCE | EFFECTIVE DIAMETER | GLASS MATERIAL | REFRACTIVE INDEX | ABBE'S NUMBER |
|---|---|---|---|---|---|---|---|
| 0 | OBJ | Flat | 0.00 | | | | |
| 1 | | Flat | 0.80 | 70.00 | | | |
| 2 | PR4 | Flat | 95.00 | 70.00 | | | |
| 3 | | Flat | 18.00 | 70.00 | | | |
| 4 | LENS L1 | 115.35 | 11.75 | 64.50 | BK7 | 1.5168 | 64.2 |
| 5 | | -126.66 | 1.00 | 64.10 | | | |
| 6 | LENS L2 | 80.23 | 15.24 | 57.00 | FD60-W | 1.8052 | 25.5 |
| 7 | | -68.19 | 0.07 | 54.00 | | | |
| 8 | LENS L3 | -67.48 | 1.50 | 53.80 | S-FPL55 | 1.4388 | 94.7 |
| 9 | | -6021.72 | 0.80 | 52.10 | | | |
| 10 | LENS L4 | 87.47 | 1.50 | 49.90 | TAFD35 | 1.9108 | 35.2 |
| 11 | | 41.37 | 3.97 | 47.00 | | | |
| 12 | LENS L5 | 59.68 | 15.30 | 47.30 | TAFD35 | 1.9108 | 35.2 |
| 13 | | -44.80 | 0.16 | 46.50 | | | |
| 14 | LENS L6 | -43.96 | 1.40 | 46.50 | S-FPM3 | 1.5378 | 74.7 |
| 15 | | -299.57 | 0.50 | 47.20 | | | |
| 16 | LENS L7 | 46.27 | 10.52 | 47.70 | S-FSL5 | 1.4875 | 70.2 |
| 17 | | 714.79 | 3.31 | 46.20 | | | |
| 18 | LENS L8 | 1866.94 | 1.60 | 44.70 | S-LAL18 | 1.7292 | 54.7 |
| 19 | | 45.46 | 0.76 | 42.80 | | | |
| 20 | LENS L9 | 51.35 | 14.00 | 42.80 | S-FSL5 | 1.4875 | 70.2 |
| 21 | | -56.92 | 9.00 | 42.20 | | | |
| 22 | FS1 | Flat | 14.00 | 34.00 | | | |
| 23 | AS1 | Flat | 22.00 | 30.30 | | | |
| 24 | FS2 | Flat | 18.00 | 30.00 | | | |
| 25 | LENS L10 | 309.11 | 5.44 | 38.20 | S-NBH53 | 1.7380 | 32.3 |
| 26 | | -93.34 | 0.30 | 39.00 | | | |
| 27 | LENS L11 | 119.01 | 1.40 | 39.00 | TAFD30 | 1.8830 | 40.8 |
| 28 | | 56.59 | 1.30 | 38.40 | | | |
| 29 | LENS L12 | 40.56 | 13.23 | 39.60 | S-FTM16 | 1.5927 | 35.3 |
| 30 | | -47.40 | 2.40 | 38.80 | | | |
| 31 | LENS L13 | -32.72 | 1.60 | 38.50 | TAFD33 | 1.8810 | 40.1 |
| 32 | | 95.97 | 0.19 | 41.20 | | | |
| 33 | LENS L14 | 103.98 | 19.50 | 41.30 | S-FPL55 | 1.4388 | 94.7 |
| 34 | | -26.42 | 5.43 | 44.30 | | | |
| *35 | LENS L15 | -23.93 | 5.00 | 41.00 | K-CSK120 | 1.5870 | 59.5 |
| *36 | | -129.65 | 1.86 | 44.00 | | | |
| 37 | LENS L16 | -829.34 | 4.59 | 42.70 | S-FPL55 | 1.4388 | 94.7 |
| 38 | | -106.45 | 6.37 | 42.30 | | | |
| 39 | LENS L17 | -51.36 | 6.69 | 40.40 | S-TIL6 | 1.5317 | 48.8 |
| 40 | | -32.95 | 0.50 | 41.30 | | | |
| 41 | LENS L18 | -37.11 | 2.60 | 40.70 | FDS90 | 1.8467 | 23.8 |
| 42 | | -56.87 | 6.50 | 42.30 | | | |
| 43 | Im1 | Flat | 1.80 | 50.00 | | | |
| *44 | LENS L19 | 34.22 | 8.55 | 47.30 | K-CSK120 | 1.5870 | 59.5 |
| *45 | | 115.45 | 13.58 | 46.80 | | | |
| *46 | LENS L20 | 35.71 | 14.00 | 48.20 | K-PBK40 | 1.5176 | 63.5 |
| *47 | | -400.00 | 31.35 | 46.10 | | | |
| 48 | AS2 | Flat | 4.00 | 28.00 | | | |
| 49 | LENS L21 | 391.62 | 6.96 | 33.50 | S-FSL5 | 1.4875 | 70.2 |
| 50 | | -45.54 | 0.30 | 35.30 | | | |
| 51 | LENS L22 | 1506.25 | 1.40 | 37.30 | TAFD30 | 1.8830 | 40.8 |
| 52 | | 47.52 | 1.93 | 38.50 | | | |
| 53 | LENS L23 | 82.78 | 10.12 | 39.00 | S-FPL55 | 1.4388 | 94.7 |
| 54 | | -53.80 | 0.30 | 42.30 | | | |
| 55 | LENS L24 | 56.56 | 13.63 | 53.40 | S-FPM2 | 1.5952 | 67.7 |
| 56 | | -125.45 | 2.00 | 53.70 | | | |
| 57 | PR5 | Flat | 82.00 | 60.00 | S-LAH66 | 1.7725 | 49.6 |
| 58 | | Flat | 32.90 | 60.00 | | | |
| 59 | Im2 | Flat | 15.10 | 74.06 | | | |
| *60 | MIR | -29.72 | -1170.00 | 71.00 | | | |
| 61 | IMG | Flat | 0.00 | | | | |

FIG.15

EXAMPLE 2 《ASPHERIC COEFFICIENT》

| No. | Rdy | K | A3 | A4 | A6 |
|---|---|---|---|---|---|
| 35 | −23.930 | −5.676000 | 0.000000E+00 | −8.003200E−05 | 2.416500E−07 |
| 36 | −129.650 | 0.000000 | 0.000000E+00 | −5.230200E−05 | 1.031700E−07 |
| 44 | 34.220 | 0.568000 | 0.000000E+00 | −8.740300E−06 | 4.539800E−08 |
| 45 | 115.450 | 0.000000 | 0.000000E+00 | 4.425300E−05 | −1.864600E−07 |
| 46 | 35.710 | −0.228000 | 0.000000E+00 | 1.417000E−05 | −8.323200E−08 |
| 47 | −400.000 | 0.000000 | 0.000000E+00 | 1.326500E−06 | −1.955200E−08 |
| 60 | −29.720 | −1.183000 | −8.675400E−06 | 1.948300E−06 | −2.309800E−09 |

| A8 | A10 | A12 |
|---|---|---|
| −5.226100E−10 | 7.116500E−13 | −4.020900E−16 |
| −1.808000E−10 | 2.117700E−13 | −9.362800E−17 |
| −2.172200E−10 | 3.820200E−13 | −2.634900E−16 |
| 3.540000E−10 | −3.116200E−13 | 8.661500E−17 |
| 2.291700E−10 | −3.301000E−13 | 1.943800E−16 |
| 6.421000E−11 | −1.074900E−13 | 8.160000E−17 |
| 1.921700E−12 | −1.101800E−15 | 2.504700E−19 |

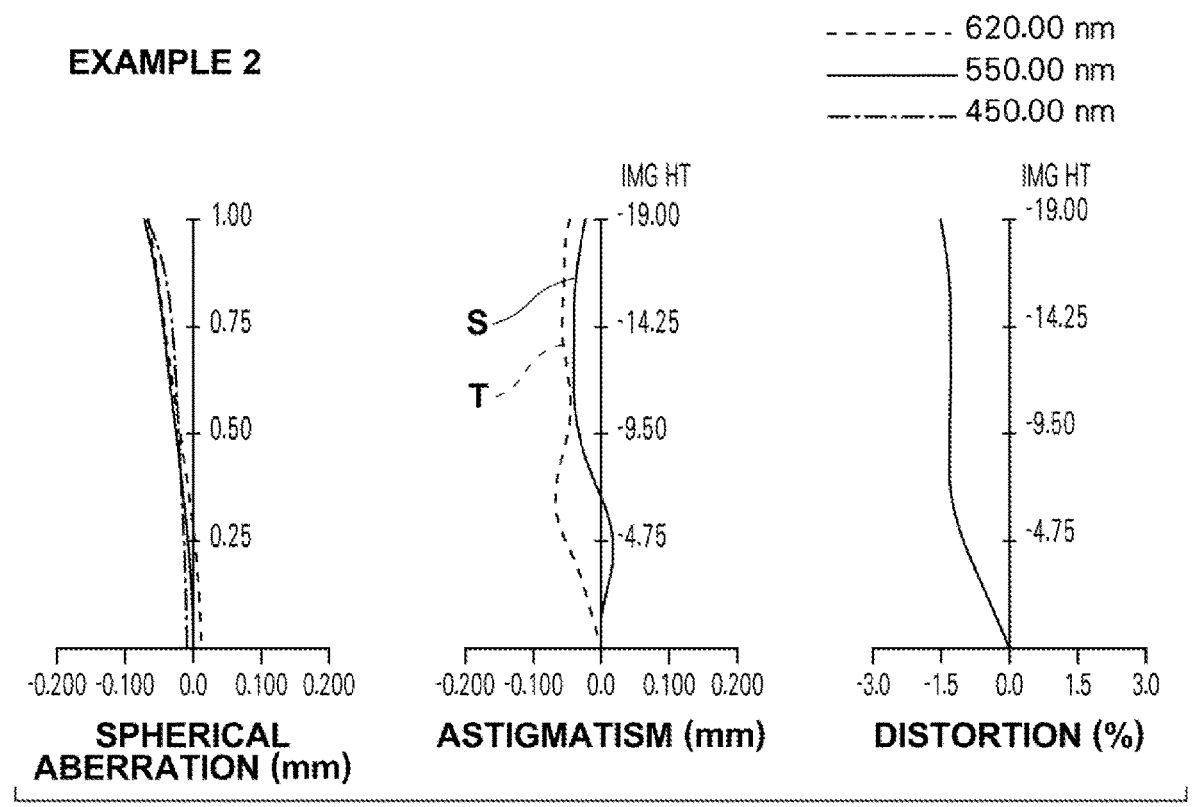

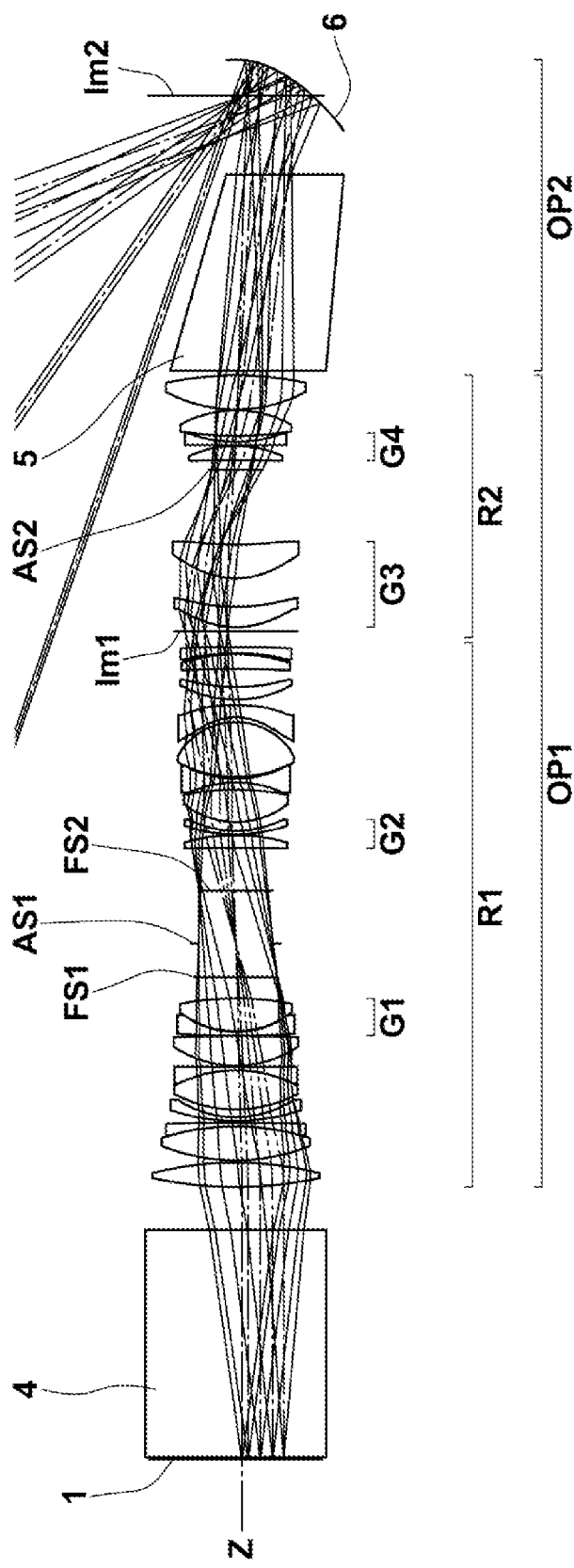

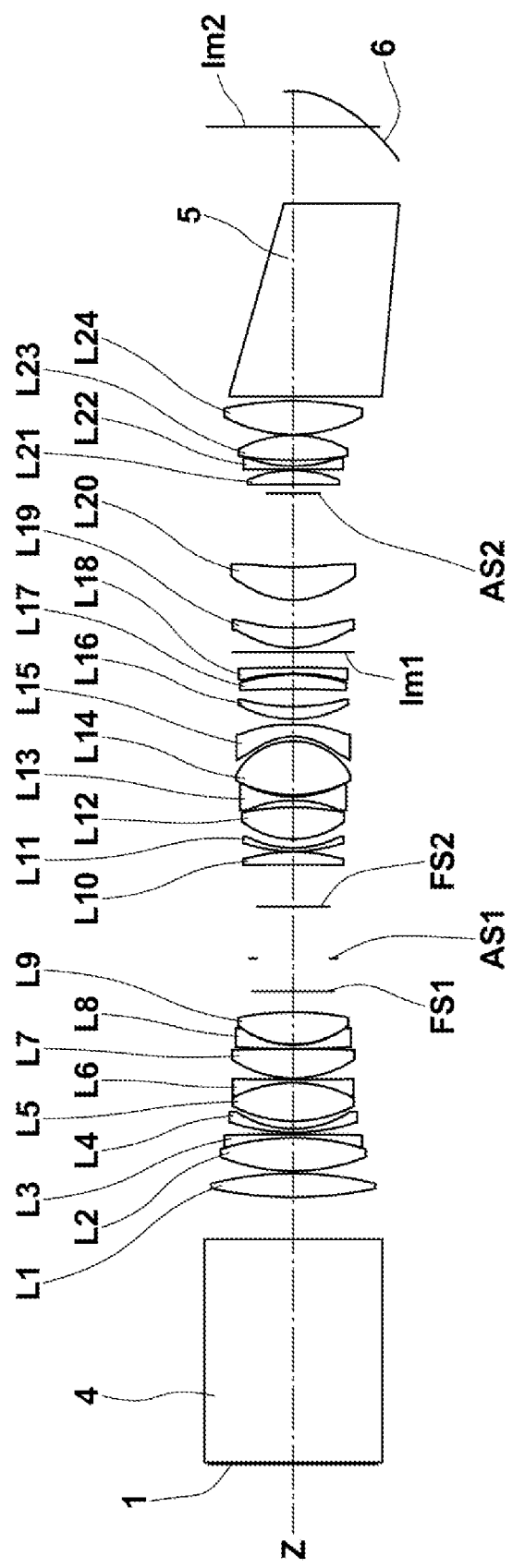

FIG.20

EXAMPLE 3  << BASIC DATA >>

| No. | ELEMENTS | RADIUS OF CURVATURE | SURFACE DISTANCE | EFFECTIVE DIAMETER | GLASS MATERIAL | REFRACTIVE INDEX | ABBE'S NUMBER |
|---|---|---|---|---|---|---|---|
| 0 | OBJ | Flat | 0.00 | | | | |
| 1 | | Flat | 0.80 | 70.00 | | | |
| 2 | PR | Flat | 95.00 | 70.00 | BK7 | 1.5168 | 64.2 |
| 3 | | Flat | 18.00 | 70.00 | | | |
| 4 | LENS L1 | 157.55 | 10.15 | 64.50 | FD60-W | 1.8052 | 25.5 |
| 5 | | -133.93 | 1.00 | 64.10 | | | |
| 6 | LENS L2 | 78.39 | 14.11 | 57.00 | S-FPL55 | 1.4388 | 94.7 |
| 7 | | -96.26 | 0.07 | 54.00 | | | |
| 8 | LENS L3 | -94.92 | 1.50 | 53.80 | TAFD35 | 1.9108 | 35.2 |
| 9 | | -354.57 | 0.80 | 52.10 | | | |
| 10 | LENS L4 | 81.02 | 1.50 | 49.90 | TAFD35 | 1.9108 | 35.2 |
| 11 | | 1537.34 | 3.28 | 47.00 | | | |
| 12 | LENS L5 | 41.73 | 16.29 | 47.30 | S-FPM3 | 1.5378 | 74.7 |
| 13 | | 52.12 | 0.07 | 46.50 | | | |
| 14 | LENS L6 | -52.23 | 1.40 | 46.50 | TAFD35 | 1.9108 | 35.2 |
| 15 | | -51.75 | 0.50 | 47.20 | | | |
| 16 | LENS L7 | 43.85 | 12.42 | 47.70 | S-FSL5 | 1.4875 | 70.2 |
| 17 | | -721.52 | 0.10 | 46.20 | | | |
| 18 | LENS L8 | 354.37 | 1.60 | 44.70 | S-LAL18 | 1.7292 | 54.7 |
| 19 | | 35.41 | 0.28 | 42.80 | | | |
| 20 | LENS L9 | 36.47 | 13.69 | 42.80 | S-FSL5 | 1.4875 | 70.2 |
| 21 | | -119.17 | 9.00 | 42.20 | | | |
| 22 | FS1 | Flat | 14.00 | 34.00 | | | |
| 23 | AS1 | Flat | 22.00 | 30.30 | | | |
| 24 | FS2 | Flat | 18.00 | 30.00 | | | |
| 25 | LENS L10 | -771.25 | 5.32 | 38.20 | S-NBH53 | 1.7380 | 32.3 |
| 26 | | -71.16 | 0.30 | 39.00 | | | |
| 27 | LENS L11 | 62.65 | 1.40 | 39.00 | TAFD30 | 1.8830 | 40.8 |
| 28 | | 40.80 | 3.77 | 38.40 | | | |
| 29 | LENS L12 | 33.79 | 13.51 | 39.60 | S-MBH8 | 1.7205 | 34.7 |
| 30 | | -103.05 | 2.99 | 38.80 | | | |
| 31 | LENS L13 | -45.48 | 1.60 | 38.50 | TAFD35 | 1.9108 | 35.2 |
| 32 | | 42.57 | 0.85 | 41.20 | | | |
| 33 | LENS L14 | 49.04 | 22.79 | 41.30 | S-FPL55 | 1.4388 | 94.7 |
| 34 | | -26.66 | 1.95 | 44.30 | | | |
| *35 | LENS L15 | -25.70 | 5.00 | 41.00 | L-LAL13 | 1.6935 | 53.2 |
| *36 | | -235.33 | 2.42 | 44.00 | | | |
| 37 | LENS L16 | 45.12 | 5.30 | 42.70 | S-FPL55 | 1.4388 | 94.7 |
| 38 | | 75.18 | 7.56 | 42.30 | | | |
| 39 | LENS L17 | -355.25 | 6.11 | 40.40 | S-MBH52 | 1.6730 | 38.1 |
| 40 | | -69.94 | 0.50 | 41.30 | | | |
| 41 | LENS L18 | -81.54 | 2.59 | 40.70 | FDS90 | 1.8467 | 23.8 |
| 42 | | -432.60 | 6.50 | 42.30 | | | |
| 43 | Im1 | Flat | 1.80 | 50.00 | | | |
| *44 | LENS L19 | 34.57 | 8.55 | 47.30 | L-LAL13 | 1.6935 | 53.2 |
| *45 | | 201.89 | 11.82 | 46.80 | | | |
| *46 | LENS L20 | 33.67 | 14.00 | 48.20 | L-LAL13 | 1.6935 | 53.2 |
| *47 | | 114.93 | 31.36 | 46.10 | | | |
| 48 | AS2 | Flat | 4.00 | 22.00 | | | |
| 49 | LENS L21 | -554.49 | 5.96 | 33.50 | S-FSL5 | 1.4875 | 70.2 |
| 50 | | -44.67 | 0.30 | 35.30 | | | |
| 51 | LENS L22 | 2706.12 | 1.40 | 37.30 | S-YGH51 | 1.7550 | 52.3 |
| 52 | | 52.92 | 2.51 | 38.50 | | | |
| 53 | LENS L23 | 138.73 | 10.68 | 39.00 | S-FPL55 | 1.4388 | 94.7 |
| 54 | | -45.48 | 0.30 | 42.30 | | | |
| 55 | LENS L24 | 57.76 | 14.28 | 53.40 | S-FPM2 | 1.5952 | 67.7 |
| 56 | | -130.00 | 2.00 | 53.70 | | | |
| 57 | PR5 | Flat | 82.00 | 60.00 | S-LAH66 | 1.7725 | 49.6 |
| 58 | | Flat | 32.90 | 60.00 | | | |
| 59 | Im2 | Flat | 15.10 | 71.35 | | | |
| *60 | MIR | -29.61 | -1170.00 | 71.00 | | | |
| 61 | IMG | Flat | | | | | |

FIG.21

EXAMPLE 3 《ASPHERIC COEFFICIENT》

| No. | Rdy | K | A3 | A4 | A6 |
|---|---|---|---|---|---|
| 35 | -25.700 | -6.709000 | 0.000000E+00 | -6.770200E-05 | 2.512900E-07 |
| 36 | -235.330 | 0.000000 | 0.000000E+00 | -3.710700E-05 | 1.012000E-07 |
| 44 | 34.570 | 0.592000 | 0.000000E+00 | -1.051100E-05 | 5.150300E-08 |
| 45 | 201.890 | 0.000000 | 0.000000E+00 | 4.538100E-05 | -1.861400E-07 |
| 46 | 33.670 | -0.365000 | 0.000000E+00 | 1.328200E-05 | -8.812200E-08 |
| 47 | 114.930 | 0.000000 | 0.000000E+00 | 5.936400E-08 | -2.355400E-08 |
| 60 | -29.610 | -1.107000 | -2.101700E-06 | 2.187300E-06 | -2.208600E-09 |

| A8 | A10 | A12 |
|---|---|---|
| -5.408300E-10 | 7.013300E-13 | -3.915600E-16 |
| -1.812200E-10 | 1.896800E-13 | -7.291000E-17 |
| -2.190000E-10 | 3.639300E-13 | -2.391400E-16 |
| 3.528500E-10 | -3.134100E-13 | 9.438600E-17 |
| 2.395300E-10 | -3.322200E-13 | 1.798800E-16 |
| 6.627300E-11 | -1.072400E-13 | 7.840500E-17 |
| 1.769700E-12 | -9.645200E-16 | 2.011700E-19 |

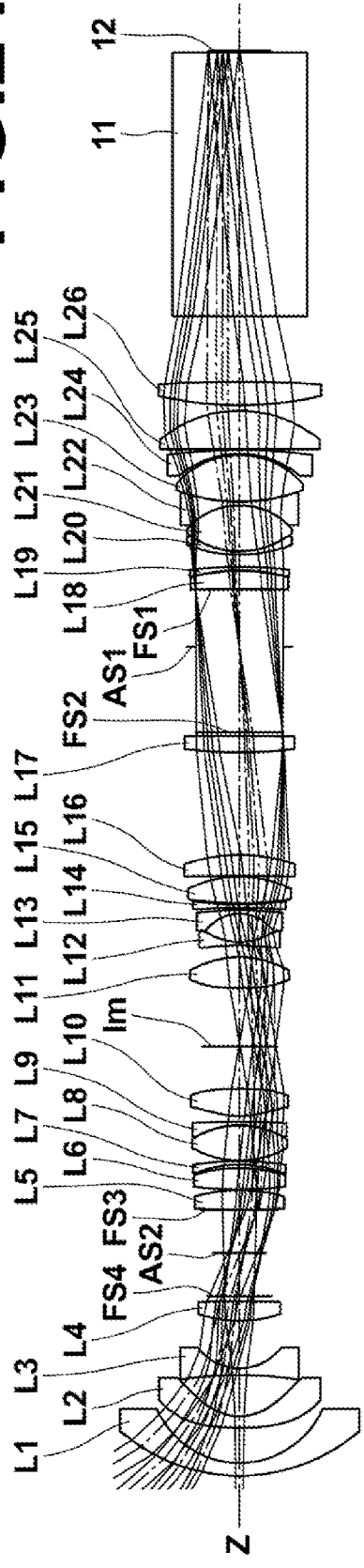
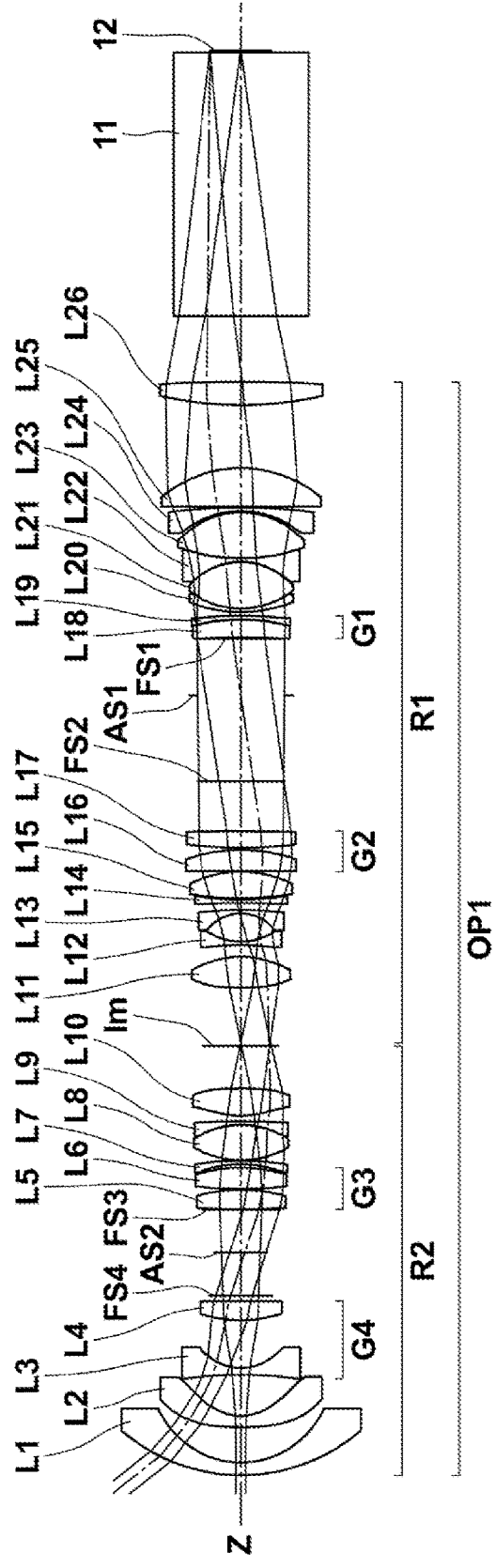
FIG.24

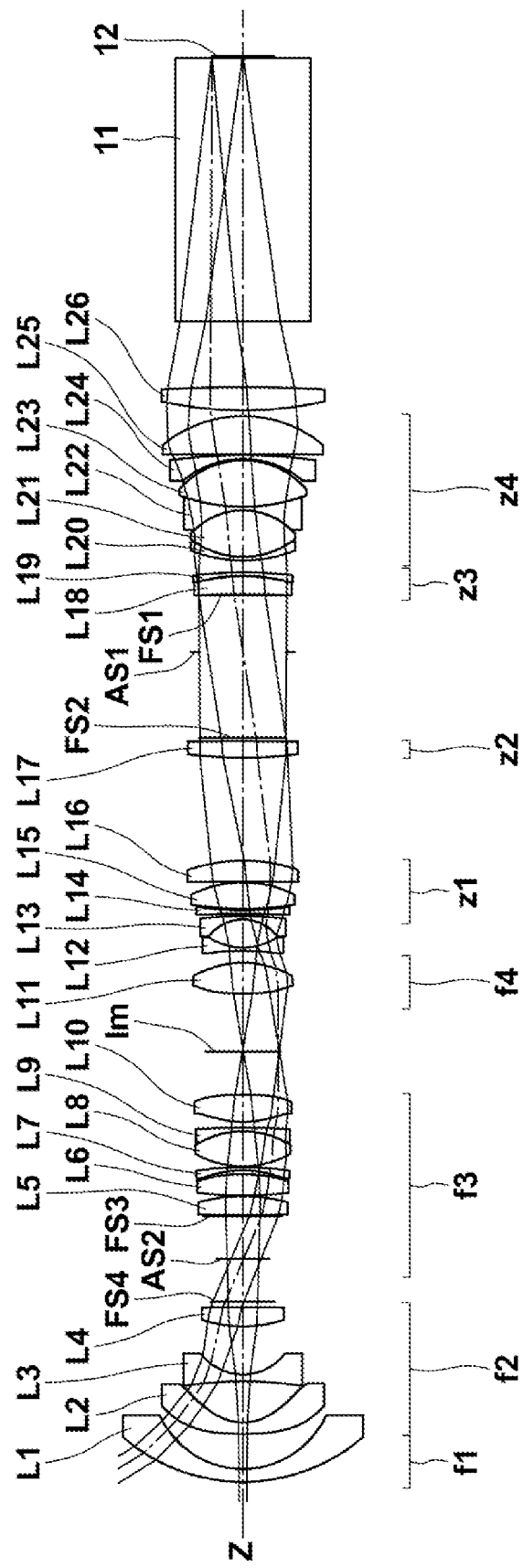

FIG.26

EXAMPLE 4 <<BASIC DATA>>

| No. | ELEMENTS | RADIUS OF CURVATURE | SURFACE DISTANCE | EFFECTIVE DIAMETER | GLASS MATERIAL | REFRACTIVE INDEX | ABBE'S NUMBER |
|---|---|---|---|---|---|---|---|
| 0 | | Flat | 1554.40 | | | | |
| 1 | LENS L1 | 66.74 | 4.50 | 82.00 | S-LAL18 | 1.7292 | 54.7 |
| 2 | | 33.02 | 12.32 | 59.70 | | | |
| *3 | LENS L2 | 121.79 | 4.00 | 55.00 | S-FPM2 | 1.5952 | 67.7 |
| *4 | | 17.14 | 14.45 | 41.40 | | | |
| 5 | LENS L3 | -137.73 | 2.40 | 39.70 | S-FPL55 | 1.4388 | 94.7 |
| 6 | | 19.03 | 16.90 | 30.20 | | | |
| 7 | LENS L4 | 47.47 | 6.66 | 27.10 | TAFD35 | 1.9108 | 35.2 |
| 8 | | -743.56 | 2.00 | 25.10 | | | |
| 9 | FS4 | Flat | 15.00 | 22.70 | | | |
| 10 | AS2 | Flat | 15.00 | 18.70 | | | |
| 11 | FS3 | Flat | 0.25 | 27.80 | | | |
| 12 | LENS L5 | 382.15 | 6.72 | 28.10 | S-LAL18 | 1.7292 | 54.7 |
| 13 | | -59.80 | 0.25 | 29.70 | | | |
| 14 | LENS L6 | 135.86 | 7.50 | 30.30 | S-LAL18 | 1.7292 | 54.7 |
| 15 | | -57.07 | 1.26 | 30.40 | | | |
| 16 | LENS L7 | -41.18 | 1.20 | 30.30 | TAFD35 | 1.9108 | 35.2 |
| 17 | | -106.70 | 0.25 | 30.90 | | | |
| 18 | LENS L8 | 34.75 | 12.27 | 31.60 | S-FPL55 | 1.4388 | 94.7 |
| 19 | | -32.20 | 0.08 | 30.70 | | | |
| 20 | LENS L9 | -31.85 | 1.20 | 30.70 | S-NPH5 | 1.8590 | 22.7 |
| 21 | | -284.29 | 2.00 | 31.40 | | | |
| *22 | LENS L10 | 29.78 | 9.56 | 32.50 | S-FPL55 | 1.4388 | 94.7 |
| *23 | | -200.00 | 15.08 | 32.50 | | | |
| 24 | Im | Flat | 20.46 | 26.90 | | | |
| *25 | LENS L11 | 200.00 | 10.80 | 33.30 | FCD705 | 1.5503 | 75.5 |
| *26 | | -31.69 | 4.10 | 32.80 | | | |
| 27 | LENS L12 | -102.14 | 1.20 | 26.80 | S-FPL55 | 1.4388 | 94.7 |
| 28 | | 22.64 | 9.85 | 24.40 | | | |
| 29 | LENS L13 | -15.48 | 1.20 | 24.40 | S-FPL55 | 1.4388 | 94.7 |
| 30 | | -133.11 | 0.80 | 28.40 | | | |
| 31 | LENS L14 | -302.11 | 1.20 | 29.50 | S-NPH5 | 1.8590 | 22.7 |
| 32 | | 108.26 | 0.56 | 30.90 | | | |
| 33 | LENS L15 | 124.67 | 9.23 | 31.60 | S-LAL18 | 1.7292 | 54.7 |
| 34 | | -42.26 | 0.25 | 34.40 | | | |
| 35 | LENS L16 | -2243.79 | 7.35 | 35.90 | S-LAL18 | 1.7292 | 54.7 |
| 36 | | -61.72 | 36.17 | 37.00 | | | |
| 37 | LENS L17 | 169.52 | 5.77 | 36.70 | TAFD35 | 1.9108 | 35.2 |
| 38 | | -923.30 | 1.20 | 36.20 | | | |
| 39 | FS2 | Flat | 30.00 | 31.00 | | | |
| 40 | AS1 | Flat | 20.00 | 31.22 | | | |
| 41 | FS1 | Flat | 0.30 | 31.60 | | | |
| 42 | LENS L18 | -446.25 | 6.29 | 31.60 | S-BAH28 | 1.7234 | 38.0 |
| 43 | | -68.55 | 0.17 | 32.60 | | | |
| 44 | LENS L19 | -64.22 | 1.20 | 32.60 | S-NBH52V | 1.6730 | 38.3 |
| 45 | | -160.23 | 4.23 | 33.10 | | | |
| 46 | LENS L20 | 52.12 | 1.20 | 35.00 | TAFD35 | 1.9108 | 35.2 |
| 47 | | 30.85 | 0.08 | 34.30 | | | |
| *48 | LENS L21 | 31.98 | 16.20 | 34.30 | S-FPL55 | 1.4388 | 94.7 |
| *49 | | -25.64 | 0.08 | 34.90 | | | |
| 50 | LENS L22 | -25.42 | 1.20 | 34.90 | S-NBH53V | 1.7380 | 32.3 |
| 51 | | 65.86 | 0.08 | 39.50 | | | |
| 52 | LENS L23 | 66.93 | 16.23 | 39.60 | S-FPL55 | 1.4388 | 94.7 |
| 53 | | -30.65 | 0.50 | 42.70 | | | |
| 54 | LENS L24 | -34.02 | 1.32 | 43.00 | S-NBH58 | 1.7888 | 28.4 |
| 55 | | -195.97 | 0.25 | 49.00 | | | |
| 56 | LENS L25 | -5538.23 | 13.45 | 51.20 | S-TIH6 | 1.8052 | 25.4 |
| 57 | | -45.65 | 2.00 | 54.20 | | | |
| 58 | LENS L26 | 138.65 | 8.13 | 55.30 | S-TIH6 | 1.8052 | 25.4 |
| 59 | | -500.00 | 23.00 | 54.60 | | | |
| 60 | PR11 | Flat | 92.40 | 45.70 | BK7 | 1.5168 | 64.2 |
| 61 | | Flat | 0.70 | 23.10 | | | |
| 62 | IS12 | Flat | 0.00 | | | | |

FIG.27

EXAMPLE 4 《ASPHERIC COEFFICIENT》

| No. | Rdy | K | A4 | A6 | A8 |
|---|---|---|---|---|---|
| 3 | 121.794 | 0.000000 | 1.149300E-05 | -7.241700E-09 | 4.765500E-12 |
| 4 | 17.143 | -0.807490 | -1.442600E-05 | 6.183800E-08 | -1.202000E-10 |
| 22 | 29.784 | -0.721030 | -2.208100E-05 | -7.573000E-09 | 2.877100E-11 |
| 23 | -200.000 | 0.000000 | -2.340000E-05 | 1.561500E-08 | 3.207700E-12 |
| 25 | 200.000 | 0.000000 | 3.800800E-05 | -8.424400E-08 | 1.128300E-10 |
| 26 | -31.691 | 0.000000 | 9.546800E-06 | -1.083900E-08 | 2.500400E-11 |
| 48 | 31.981 | 0.000000 | 1.061500E-06 | 1.754300E-09 | 2.328200E-12 |
| 49 | -25.644 | 0.000000 | -5.181100E-07 | 7.502000E-10 | 0.000000E+00 |

| A10 | A12 | A14 | A16 |
|---|---|---|---|
| 0.000000E+00 | 0.000000E+00 | 0.000000E+00 | 0.000000E+00 |
| 2.028900E-14 | 0.000000E+00 | 0.000000E+00 | 0.000000E+00 |
| 0.000000E+00 | 0.000000E+00 | 0.000000E+00 | 0.000000E+00 |
| 0.000000E+00 | 0.000000E+00 | 0.000000E+00 | 0.000000E+00 |
| -5.203900E-14 | 0.000000E+00 | 0.000000E+00 | 0.000000E+00 |
| 0.000000E+00 | 0.000000E+00 | 0.000000E+00 | 0.000000E+00 |
| 1.835300E-15 | 0.000000E+00 | 0.000000E+00 | 0.000000E+00 |
| 0.000000E+00 | 0.000000E+00 | 0.000000E+00 | 0.000000E+00 |

FIG.28

EXAMPLE 4 《ZOOM/FOCUS》

| Z | EFL | s0 | s2 | s8 | s23 | s26 |
|---|---|---|---|---|---|---|
|   |   | FOCUS | FOCUS | FOCUS | FOCUS | FOCUS |
| 1 | -6.767 | 1554.400 | 12.320 | 2.000 | 15.080 | 4.100 |
| 2 | -7.782 | 1554.400 | 12.320 | 2.000 | 15.080 | 4.100 |
| 3 | -8.600 | 1554.400 | 12.320 | 2.000 | 15.080 | 4.100 |
| 4 | -6.648 | 6000.000 | 13.605 | 2.617 | 14.922 | 4.517 |
| 5 | -7.645 | 6000.000 | 13.605 | 2.617 | 14.922 | 4.517 |
| 6 | -8.448 | 6000.000 | 13.605 | 2.617 | 14.922 | 4.517 |

| s30 | s36 | s38 | s45 | s57 |
|---|---|---|---|---|
| ZOOM | ZOOM | ZOOM | ZOOM | ZOOM |
| 0.800 | 36.170 | 1.200 | 4.230 | 2.000 |
| 1.764 | 16.778 | 8.687 | 4.216 | 12.955 |
| 2.465 | 0.805 | 17.718 | 1.262 | 22.150 |
| 0.800 | 36.170 | 1.200 | 4.230 | 2.000 |
| 1.764 | 16.778 | 8.687 | 4.216 | 12.955 |
| 2.465 | 0.805 | 17.718 | 1.262 | 22.150 |

EXAMPLE 4 (WIDE)

EXAMPLE 4 (TELE)

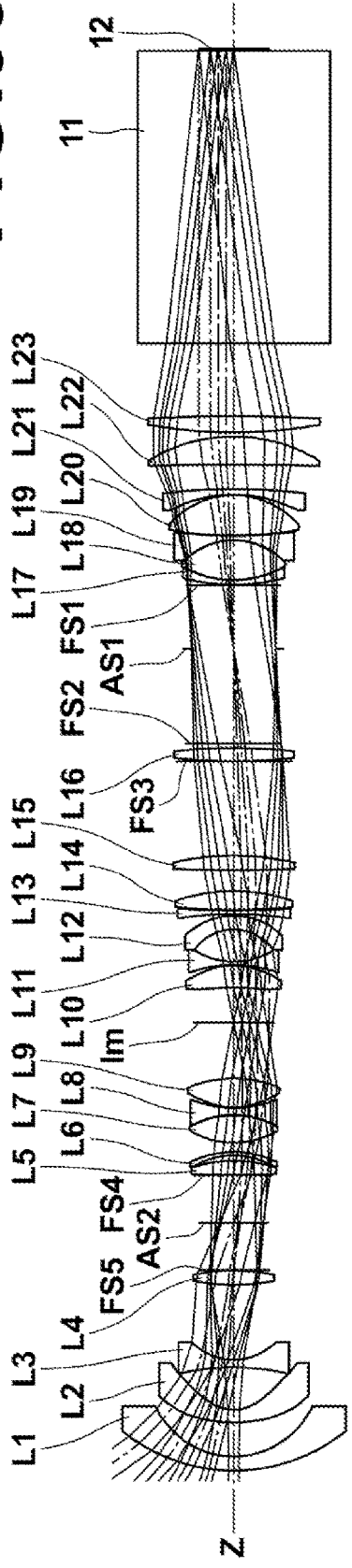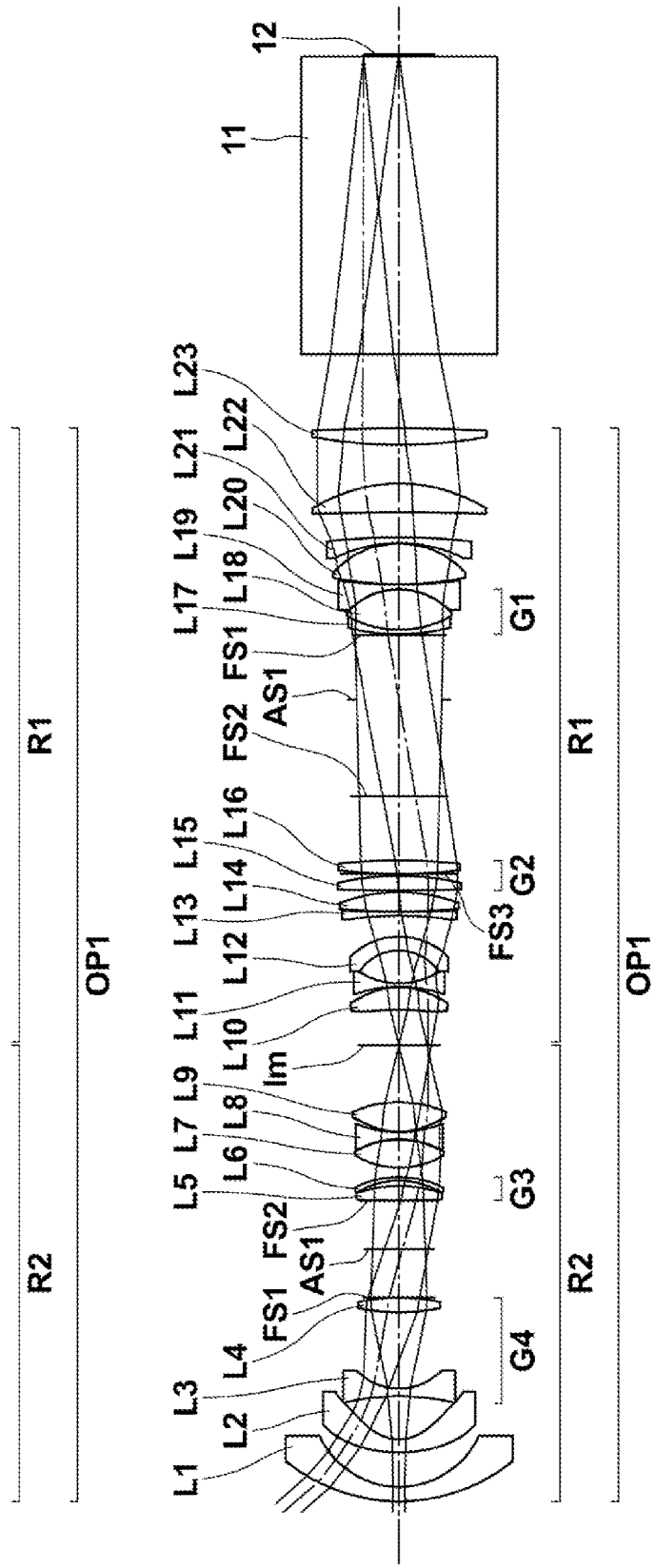
FIG.33

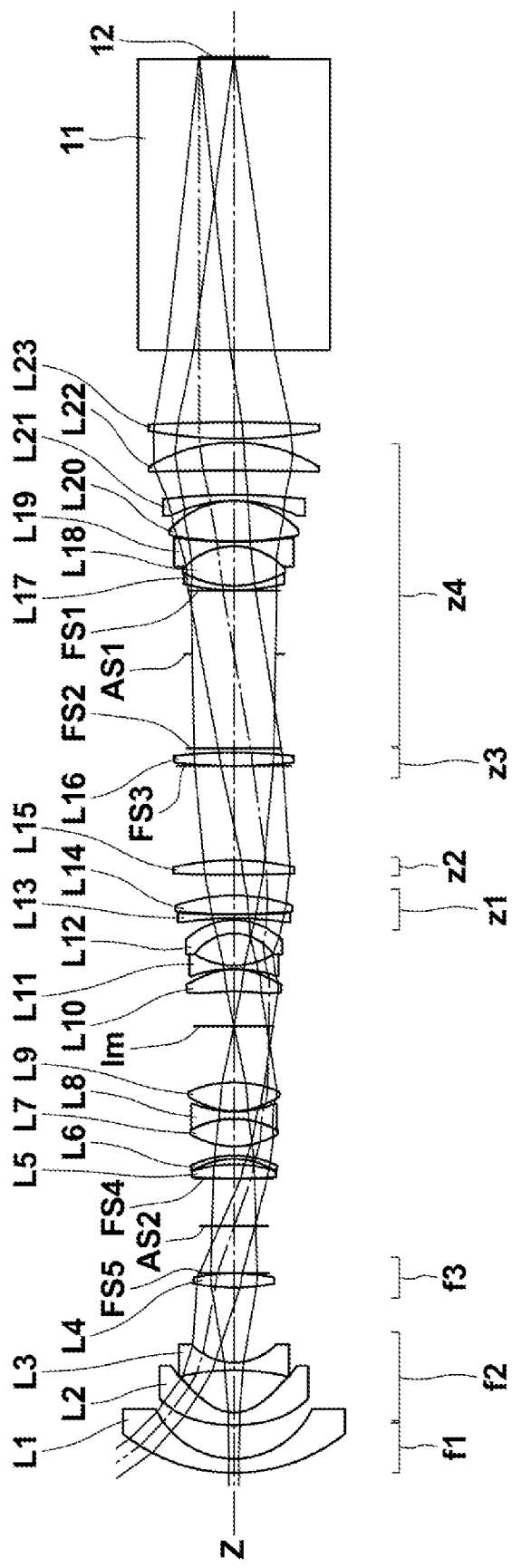

FIG. 35

EXAMPLE 5 << BASIC DATA >>

| No. | ELEMENTS | RADIUS OF CURVATURE | SURFACE DISTANCE | EFFECTIVE DIAMETER | GLASS MATERIAL | REFRACTIVE INDEX | ABBE'S NUMBER |
|---|---|---|---|---|---|---|---|
| 0 |  | Flat | 3400.00 |  |  |  |  |
| 1 | LENS L1 | 117.12 | 9.00 | 139.20 | S-LAL18 | 1.7292 | 54.7 |
| 2 |  | 56.69 | 21.35 | 101.70 |  |  |  |
| *3 | LENS L2 | 110.63 | 8.00 | 92.50 | K-PBK40 | 1.5161 | 63.3 |
| *4 |  | 24.79 | 26.93 | 69.20 |  |  |  |
| 5 | LENS L3 | -154.57 | 4.80 | 67.80 | S-FPL55 | 1.4388 | 94.7 |
| 6 |  | 38.16 | 47.84 | 54.80 |  |  |  |
| 7 | LENS L4 | 147.92 | 8.90 | 49.20 | TAFD35 | 1.9108 | 35.2 |
| 8 |  | -126.84 | 0.25 | 48.20 |  |  |  |
| 9 | FS5 | Flat | 30.00 | 45.60 |  |  |  |
| 10 | AS2 | Flat | 30.00 | 43.90 |  |  |  |
| 11 | FS4 | Flat | 0.25 | 50.60 |  |  |  |
| 12 | LENS L5 | 656.64 | 8.81 | 50.80 | S-LAL18 | 1.7292 | 54.7 |
| 13 |  | -88.88 | 3.36 | 51.40 |  |  |  |
| 14 | LENS L6 | -51.97 | 2.20 | 51.30 | TAFD35 | 1.9108 | 35.2 |
| 15 |  | -64.51 | 5.96 | 52.70 |  |  |  |
| 16 | LENS L7 | 57.11 | 17.28 | 53.60 | S-FPL55 | 1.4388 | 94.7 |
| 17 |  | -58.15 | 0.25 | 52.40 |  |  |  |
| 18 | LENS L8 | -58.59 | 4.40 | 52.00 | S-TIH53W | 1.8467 | 23.8 |
| 19 |  | 72.68 | 0.25 | 52.50 |  |  |  |
| *20 | LENS L9 | 41.03 | 18.34 | 55.70 | S-FPM2 | 1.5952 | 67.7 |
| *21 |  | -63.69 | 35.80 | 56.50 |  |  |  |
| 22 | Iм | Flat | 22.07 | 51.60 |  |  |  |
| *23 | LENS L10 | -102.46 | 14.05 | 57.80 | L-LAH84 | 1.8084 | 40.5 |
| *24 |  | -42.65 | 0.25 | 58.40 |  |  |  |
| 25 | LENS L11 | -86.33 | 2.20 | 54.80 | S-FPL55 | 1.4388 | 94.7 |
| 26 |  | 49.34 | 20.29 | 50.90 |  |  |  |
| 27 | LENS L12 | -31.10 | 8.54 | 50.90 | S-FPL55 | 1.4388 | 94.7 |
| 28 |  | -45.21 | 1.20 | 59.20 |  |  |  |
| 29 | LENS L13 | -221.93 | 2.40 | 67.10 | S-NPH5 | 1.8590 | 22.7 |
| 30 |  | 656.34 | 0.25 | 69.60 |  |  |  |
| 31 | LENS L14 | 428.94 | 11.84 | 70.30 | S-LAL18 | 1.7292 | 54.7 |
| 32 |  | -113.80 | 13.18 | 72.30 |  |  |  |
| 33 | LENS L15 | 1117.80 | 9.15 | 74.40 | S-LAL18 | 1.7292 | 54.7 |
| 34 |  | -178.18 | 60.07 | 75.00 |  |  |  |
| 35 | FS3 | Flat | 0.00 | 74.50 |  |  |  |
| 36 | LENS L16 | 366.39 | 8.44 | 74.00 | J-PKH1 | 1.5186 | 69.9 |
| 37 |  | -340.79 | 2.70 | 73.70 |  |  |  |
| 38 | FS2 | Flat | 60.00 | 61.30 |  |  |  |
| 39 | AS1 | Flat | 40.00 | 54.00 |  |  |  |
| 40 | FS1 | Flat | 0.44 | 60.00 |  |  |  |
| 41 | LENS L17 | 132.34 | 2.80 | 60.80 | TAFD35 | 1.9108 | 35.2 |
| 42 |  | 67.94 | 0.08 | 62.10 |  |  |  |
| *43 | LENS L18 | 67.57 | 25.00 | 61.70 | S-FPL55 | 1.4388 | 94.7 |
| *44 |  | -44.78 | 0.12 | 63.50 |  |  |  |
| 45 | LENS L19 | -45.74 | 2.80 | 63.70 | S-NBH53V | 1.7380 | 32.3 |
| 46 |  | 291.78 | 0.25 | 73.90 |  |  |  |
| 47 | LENS L20 | 218.70 | 25.67 | 75.60 | S-FPL55 | 1.4388 | 94.7 |
| 48 |  | -56.72 | 0.25 | 80.10 |  |  |  |
| 49 | LENS L21 | -92.25 | 3.60 | 82.10 | S-NBH58 | 1.7888 | 28.4 |
| 50 |  | -405.29 | 15.46 | 88.30 |  |  |  |
| 51 | LENS L22 | -1958.81 | 17.85 | 103.90 | S-TIH6 | 1.8052 | 25.4 |
| 52 |  | -107.20 | 2.50 | 106.20 |  |  |  |
| *53 | LENS L23 | 322.65 | 10.38 | 106.50 | S-TIH6 | 1.8052 | 25.4 |
| *54 |  | -1000.00 | 46.00 | 105.80 |  |  |  |
| 55 | PR11 | Flat | 184.80 | 120.00 | BK7 | 1.5168 | 64.2 |
| 56 |  | Flat | 1.40 | 120.00 |  |  |  |
| 57 | IS12 | Flat | 0.00 |  |  |  |  |

FIG.36

EXAMPLE 5  《ASPHERIC COEFFICIENT》

| No. | Rdy | K | A4 | A6 | A8 |
|---|---|---|---|---|---|
| 3 | 110.632 | 0.000000 | 1.149600E-06 | -1.449900E-10 | 5.766000E-14 |
| 4 | 24.787 | -0.643950 | -3.668300E-06 | 2.161600E-10 | -7.371400E-13 |
| 20 | 41.031 | -0.985250 | -2.084800E-06 | 1.245300E-10 | -6.531300E-14 |
| 21 | -83.691 | 0.000000 | -1.001300E-06 | 2.936400E-10 | -2.195200E-13 |
| 23 | -102.464 | 0.000000 | 7.765900E-06 | -5.281300E-09 | 2.421800E-12 |
| 24 | -42.646 | 0.000000 | 3.289300E-06 | 2.088300E-10 | 3.531500E-13 |
| 43 | 67.574 | 0.000000 | -9.180000E-08 | 1.626800E-11 | -4.570900E-14 |
| 44 | -44.781 | 0.000000 | 3.864900E-07 | 9.341500E-11 | 0.000000E+00 |

| A10 | A12 | A14 | A16 |
|---|---|---|---|
| 0.000000E+00 | 0.000000E+00 | 0.000000E+00 | 0.000000E+00 |
| -1.003900E-15 | 0.000000E+00 | 0.000000E+00 | 0.000000E+00 |
| 0.000000E+00 | 0.000000E+00 | 0.000000E+00 | 0.000000E+00 |
| 0.000000E+00 | 0.000000E+00 | 0.000000E+00 | 0.000000E+00 |
| -6.039400E-16 | 0.000000E+00 | 0.000000E+00 | 0.000000E+00 |
| 0.000000E+00 | 0.000000E+00 | 0.000000E+00 | 0.000000E+00 |
| 2.752300E-18 | 0.000000E+00 | 0.000000E+00 | 0.000000E+00 |
| 0.000000E+00 | 0.000000E+00 | 0.000000E+00 | 0.000000E+00 |

FIG.37

EXAMPLE 5  《ZOOM/FOCUS》

| Z | EFL | s0 | s2 | s6 | s8 | s28 |
|---|---|---|---|---|---|---|
|   |   |   | FOCUS | FOCUS | FOCUS | ZOOM |
| 1 | -15.872 | 3400.000 | 21.350 | 47.840 | 0.250 | 1.200 |
| 2 | -18.253 | 3400.000 | 21.350 | 47.840 | 0.250 | 10.717 |
| 3 | -19.205 | 3400.000 | 21.350 | 47.840 | 0.250 | 13.022 |
| 4 | -15.800 | 12000.000 | 22.813 | 47.733 | 0.811 | 1.200 |
| 5 | -18.169 | 12000.000 | 22.813 | 47.733 | 0.811 | 10.717 |
| 6 | -19.117 | 12000.000 | 22.813 | 47.733 | 0.811 | 13.022 |

| s32 | s34 | s37 | s40 | s52 |
|---|---|---|---|---|
| ZOOM | ZOOM | ZOOM | ZOOM | ZOOM |
| 13.180 | 60.070 | 2.700 | 0.440 | 2.500 |
| 3.128 | 18.309 | 29.935 | 1.000 | 17.002 |
| 1.200 | 1.200 | 40.129 | 0.452 | 24.087 |
| 13.180 | 60.070 | 2.700 | 0.440 | 2.500 |
| 3.128 | 18.309 | 29.935 | 1.000 | 17.002 |
| 1.200 | 1.200 | 40.129 | 0.452 | 24.087 |

FIG.42

| | | EXAMPLE 1 | EXAMPLE 2 | EXAMPLE 3 | EXAMPLE 4 | EXAMPLE 5 |
|---|---|---|---|---|---|---|
| ENTIRE SYSTEM fw | | -9.08 | -7.45 | -7.44 | -6.77 | -15.87 |
| CLAIM 1 | Y1-1 | 6.42 | 5.84 | 7.23 | 4.66 | 7.87 |
| | Y1-2 | 9.70 | 11.00 | 10.31 | 3.95 | 10.80 |
| | Y2-1 | 9.27 | 14.63 | 15.10 | 7.21 | 11.63 |
| | Y2-2 | 2.45 | 1.90 | 1.90 | 6.73 | 10.69 |
| CLAIM 2 | Y1-1/|fw| | 0.71 | 0.78 | 0.97 | 0.69 | 0.50 |
| | Y1-2/|fw| | 1.07 | 1.48 | 1.39 | 0.58 | 0.68 |
| | Y2-1/|fw| | 1.02 | 1.96 | 2.03 | 1.07 | 0.73 |
| | Y2-2/|fw| | 0.27 | 0.25 | 0.26 | 0.99 | 0.67 |
| CLAIM 3 | D1-1 | 23.00 | 23.00 | 23.00 | 20.30 | 40.44 |
| | D1-2 | 40.00 | 40.00 | 40.00 | 31.20 | 69.22 |
| | D2-1 | 19.03 | 31.35 | 31.36 | 15.25 | 30.25 |
| | D2-2 | 5.00 | 4.00 | 4.00 | 17.00 | 30.25 |
| CLAIM 4 | Ds1 | 63.00 | 63.00 | 63.00 | 51.50 | 109.66 |
| | Ds2 | 24.03 | 35.35 | 35.36 | 32.25 | 60.50 |
| FIRST STOP | $\phi s1$ | 33.60 | 30.30 | 30.30 | 31.22 | 54.00 |
| SECOND STOP | $\phi s2$ | 27.50 | 28.00 | 22.00 | 18.70 | 43.90 |
| LENS SURFACE 1 | $\phi s1\text{-}1$ | 37.00 | 42.20 | 42.20 | 32.60 | 51.40 |
| LENS SURFACE 2 | $\phi s1\text{-}2$ | 37.00 | 38.20 | 38.20 | 36.20 | 48.20 |
| LENS SURFACE 3 | $\phi s2\text{-}1$ | 25.60 | 46.10 | 46.10 | 28.10 | 50.80 |
| LENS SURFACE 4 | $\phi s2\text{-}2$ | 30.00 | 33.50 | 33.50 | 25.10 | 48.20 |
| CLAIM 8 | $\phi s1\text{-}1/\phi s1$ | 1.10 | 1.39 | 1.39 | 1.04 | 0.95 |
| | $\phi s1\text{-}2/\phi s1$ | 1.10 | 1.26 | 1.26 | 1.16 | 0.89 |
| CLAIM 9 | $\phi s2\text{-}1/\phi s2$ | 0.93 | 1.65 | 2.10 | 1.50 | 1.16 |
| | $\phi s2\text{-}2/\phi s2$ | 1.09 | 1.20 | 1.52 | 1.34 | 1.10 |
| FIRST STOP | $\theta 1$ | 14.49 | 14.94 | 15.53 | 8.84 | 10.20 |
| SECOND STOP | $\theta 2$ | 26.12 | 24.76 | 26.22 | 23.35 | 20.19 |
| | $\tan\theta 1$ | 0.26 | 0.27 | 0.28 | 0.16 | 0.18 |
| | $\tan\theta 2$ | 0.49 | 0.46 | 0.49 | 0.43 | 0.37 |
| CLAIM 5 | $\tan\theta 2/\tan\theta 1$ | 1.90 | 1.73 | 1.77 | 2.78 | 2.04 |
| | $\tan\theta 1\times |fw|$ | 2.35 | 1.99 | 2.07 | 1.05 | 2.86 |
| | $\tan\theta 2\times |fw|$ | 4.45 | 3.44 | 3.66 | 2.92 | 5.84 |
| CLAIM 6 | $Ds1\times\tan\theta 1$ | 16.28 | 16.81 | 17.50 | 8.01 | 19.74 |
| CLAIM 7 | $Ds2\times\tan\theta 2$ | 11.77 | 16.30 | 17.41 | 13.92 | 22.25 |
| CLAIM 10 | $Y2\text{-}2\times\tan\theta 2$ | 1.20 | 0.87 | 0.94 | 2.90 | 3.93 |
| CLAIM 11 | $D2\text{-}2 / Y2\text{-}2$ | 2.04 | 2.11 | 2.11 | 2.53 | 2.83 |

FIG.43

GLASS MATERIAL ※( ) A value in parentheses is the value of νd.

| | | EXAMPLE 1 | EXAMPLE 2 | EXAMPLE 3 | EXAMPLE 4 | EXAMPLE 5 |
|---|---|---|---|---|---|---|
| GROUP 1 | SECOND ADJACENT LENS | S-LAL18(54.7) | S-LAL18(54.7) | S-LAL18(54.7) | S-NBH52(38.3) | S-FPL55(94.7) |
| | FIRST ADJACENT LENS | J-PKH1(69.9) | S-FSL5(70.2) | S-FSL5(70.2) | S-BAH28(38.0) | TAFD35(35.2) |
| | | FIRST STOP | FIRST STOP | FIRST STOP | FIRST STOP | FIRST STOP |
| GROUP 2 | FIRST ADJACENT LENS | S-NBH53V(32.3) | S-NBH53(32.3) | S-NBH53(32.3) | TAFD35(35.2) | J-PKH1(69.9) |
| | SECOND ADJACENT LENS | S-NBM51(44.3) | TAFD30(40.8) | TAFD30(40.8) | S-LAL18(54.7) | S-LAL18(54.7) |
| GROUP 3 | SECOND ADJACENT LENS | S-LAH93(35.0) | K-CSK120(59.5) | L-LAL13(53.2) | S-LAL18(54.7) | TAFD35(35.2) |
| | FIRST ADJACENT LENS | S-FSL5(70.2) | K-PBK40(63.5) | L-LAL13(53.2) | S-LAL18(54.7) | S-LAL18(54.7) |
| | | SECOND STOP | SECOND STOP | SECOND STOP | SECOND STOP | SECOND STOP |
| GROUP 4 | FIRST ADJACENT LENS | S-FSL5(70.2) | S-FSL5(70.2) | S-YGH51(52.3) | TAFD35(35.2) | TAFD35(35.2) |
| | SECOND ADJACENT LENS | TAFD35(35.2) | TAFD30(40.8) | TAFD30(40.8) | S-FPL55(94.7) | S-FPL55(94.7) |

FIG.44

INTERNAL TRANSMITTANCE OF GLASS MATERIAL τ 420nm  ※( ) A value in parentheses is the value of νd.

| | | EXAMPLE 1 | EXAMPLE 2 | EXAMPLE 3 | EXAMPLE 4 | EXAMPLE 5 |
|---|---|---|---|---|---|---|
| GROUP 1 | SECOND ADJACENT LENS | 0.991(54.7) | 0.991(54.7) | 0.991(54.7) | 0.992(38.3) | 0.995(94.7) |
| | FIRST ADJACENT LENS | 0.988(69.9) | 0.999(70.2) | 0.999(70.2) | 0.955(38.0) | 0.931(35.2) |
| | | FIRST STOP | FIRST STOP | FIRST STOP | FIRST STOP | FIRST STOP |
| GROUP 2 | FIRST ADJACENT LENS | 0.981(32.3) | 0.981(32.3) | 0.981(32.3) | 0.931(35.2) | 0.988(69.9) |
| | SECOND ADJACENT LENS | 0.989(44.3) | 0.971(40.8) | 0.971(40.8) | 0.991(54.7) | 0.991(54.7) |
| GROUP 3 | SECOND ADJACENT LENS | 0.931(35.0) | 0.998(59.5) | 0.989(53.2) | 0.991(54.7) | 0.931(35.2) |
| | FIRST ADJACENT LENS | 0.999(70.2) | 0.991(63.5) | 0.989(53.2) | 0.991(54.7) | 0.991(54.7) |
| | | SECOND STOP | SECOND STOP | SECOND STOP | SECOND STOP | SECOND STOP |
| GROUP 4 | FIRST ADJACENT LENS | 0.999(70.2) | 0.999(70.2) | 0.999(70.2) | 0.931(35.2) | 0.931(35.2) |
| | SECOND ADJACENT LENS | 0.931(35.2) | 0.971(40.8) | 0.988(52.3) | 0.995(94.7) | 0.995(94.7) |

FIG.45

RELATIVE TEMPERATURE COEFFICIENT OF REFRACTIVE INDEX OF GLASS MATERIAL dn/dt    ※( ) A value in parentheses is the value of νd.

| | | EXAMPLE 1 | EXAMPLE 2 | EXAMPLE 3 | EXAMPLE 4 | EXAMPLE 5 |
|---|---|---|---|---|---|---|
| GROUP 1 | SECOND ADJACENT LENS | 4.0(54.7) | 4.0(54.7) | 4.0(54.7) | 3.8(38.3) | -6.3(94.7) |
| | FIRST ADJACENT LENS | 3.6(69.9) | -0.8(70.2) | -0.8(70.2) | 4.4(38.0) | 5.3(35.2) |
| | | FIRST STOP | FIRST STOP | FIRST STOP | FIRST STOP | FIRST STOP |
| GROUP 2 | FIRST ADJACENT LENS | 5.5(32.3) | 5.5(32.3) | 5.5(32.3) | 5.3(35.2) | 3.6(69.9) |
| | SECOND ADJACENT LENS | 4.0(44.3) | 5.1(40.8) | 5.1(40.8) | 4.0(54.7) | 4.0(54.7) |
| GROUP 3 | SECOND ADJACENT LENS | 5.3(35.0) | 3.1(59.5) | 3.3(53.2) | 4.0(54.7) | 5.3(35.2) |
| | FIRST ADJACENT LENS | -0.8(70.2) | 4.4(63.5) | 3.3(53.2) | 4.0(54.7) | 4.0(54.7) |
| | | SECOND STOP | SECOND STOP | SECOND STOP | SECOND STOP | SECOND STOP |
| GROUP 4 | FIRST ADJACENT LENS | -0.8(70.2) | -0.8(70.2) | -0.8(70.2) | 5.3(35.2) | 5.3(35.2) |
| | SECOND ADJACENT LENS | 5.3(35.2) | 5.1(40.8) | 4.9(52.3) | -6.3(94.7) | -6.3(94.7) |

FIG.46

ABNORMAL DISPERSION OF LENS $\Delta \theta g,F$  ※ ( ) A value in parentheses is the value of $\nu d$.

| EXAMPLE 1 | GLASS MATERIAL | $\Delta \theta g,F$ |
|---|---|---|
| L3 | S-FPL55(94.7) | 0.0457 |
| L4 | FCD705(75.5) | 0.0276 |
| L12 | S-FPL55(94.7) | 0.0457 |
| L15 | S-FPL55(94.7) | 0.0457 |
| L17 | S-FPL55(94.7) | 0.0457 |
| L26 | S-FPL55(94.7) | 0.0457 |
| L27 | S-FPM2(67.7) | 0.0123 |

| EXAMPLE 2 | GLASS MATERIAL | $\Delta \theta g,F$ |
|---|---|---|
| L2 | S-FPL55(94.7) | 0.0457 |
| L5 | S-FPM3(74.7) | 0.0186 |
| L14 | S-FPL55(94.7) | 0.0457 |
| L16 | S-FPL55(94.7) | 0.0457 |
| L17 | S-TIL6(48.8) | 0.0158 |
| L23 | S-FPL55(94.7) | 0.0457 |
| L24 | S-FPM2(67.7) | 0.0123 |

| EXAMPLE 3 | GLASS MATERIAL | $\Delta \theta g,F$ |
|---|---|---|
| L2 | S-FPL55(94.7) | 0.0457 |
| L5 | S-FPM3(74.7) | 0.0186 |
| L14 | S-FPL55(94.7) | 0.0457 |
| L16 | S-FPL55(94.7) | 0.0457 |
| L23 | S-FPL55(94.7) | 0.0457 |
| L24 | S-FPM2(67.7) | 0.0123 |

| EXAMPLE 4 | GLASS MATERIAL | $\Delta \theta g,F$ |
|---|---|---|
| L26 | S-TIH6(25.4) | 0.0158 |
| L25 | S-TIH6(25.4) | 0.0158 |
| L23 | S-FPL55(94.7) | 0.0457 |
| L21 | S-FPL55(94.7) | 0.0457 |
| L11 | FCD705(75.5) | 0.0276 |
| L10 | S-FPL55(94.7) | 0.0457 |
| L8 | S-FPL55(94.7) | 0.0457 |

| EXAMPLE 5 | GLASS MATERIAL | $\Delta \theta g,F$ |
|---|---|---|
| L23 | S-TIH6(25.4) | 0.0158 |
| L22 | S-TIH6(25.4) | 0.0158 |
| L20 | S-FPL55(94.7) | 0.0457 |
| L18 | S-FPL55(94.7) | 0.0457 |
| L9 | S-FPM2(67.7) | 0.0123 |
| L7 | S-FPL55(94.7) | 0.0457 |

IMAGE-FORMING OPTICAL SYSTEM, PROJECTION DEVICE, AND IMAGING DEVICE

TECHNICAL FIELD

CROSS-REFERENCE TO RELATED APPLICATIONS

This application is a National Phase Entry of PCT International Application No. PCT/JP2021/028805 filed on Aug. 3, 2021, which claims priority under 35 U.S.C § 119 (a) to Japanese Patent Application No. 2020-133008 filed on Aug. 5, 2020. Each of the above applications is hereby expressly incorporated by reference, in its entirety, into the present application.

TECHNICAL FIELD

The present disclosure relates to an image formation optical system and also a projection apparatus and an imaging apparatus using the same.

BACKGROUND ART

Conventionally, various kinds of reflective-type projection apparatuses have been proposed to increase the size of a projection screen while reducing a space for projection. For example, Japanese Patent No. 6313865, Japanese Patent No. 5728202 and International Publication No. WO2020/008942 disclose image formation optical systems for projection apparatuses, in which a first optical system comprising a refractive optical system and a second optical system including a reflective surface are arranged from an image display element (light bulb) toward the projection screen, i.e., from a reduction side toward the magnification side.

Recently, since higher output light sources are used in the projection apparatus to satisfy a request for higher brightness, a higher heat amount is generated, and the temperature of image formation optical systems tends to become high. Therefore, when an achromatic lens for correcting chromatic aberrations is applied to the image formation optical system, a damage to a cemented member, such as discoloration and detachment, tends to occur by heat and light. International Publication No. WO2020/008942 also proposes a configuration for suppressing a decrease in transmittance in such a kind of achromatic lens.

Summary

However, in an image formation optical system used in a conventional reflective-type projection apparatus, all the bundles of rays in high intensity are condensed in the vicinity of a stop provided inside the image formation optical system. Therefore, the temperature of lenses arranged in the vicinity of the stop becomes high by absorption of light, and a problem of a fluctuation in performance, such as blur, is recognized The present disclosure intends to provide an image formation optical system that can prevent a fluctuation in performance, such as blur, caused by absorption of light by lenses arranged in the vicinity of a stop. Further, the present disclosure intends to provide a projection apparatus and an imaging apparatus to which such an image formation optical system is applied to prevent a fluctuation in performance.

Solution to Problem

An image formation optical system of the present disclosure forms an image of a reduction-side conjugate surface on a magnification-side conjugate surface, and the system comprises a first optical system including an intermediate image inside and also a first refractive system arranged toward the reduction side of the intermediate image and a second refractive system arranged toward the magnification side of the intermediate image. The first refractive system has a first stop, and the second refractive system has a second stop. Lens surfaces are arranged next to and both toward the reduction side and toward the magnification side of the first stop and lens surfaces are arranged next to and both toward the reduction side and toward the magnification side of the second stop, and the following Formula (1) through (4) are satisfied:

$$1.5 < Y1\text{-}1 \quad (1);$$

$$1.5 < Y1\text{-}2 \quad (2);$$

$$1.0 < Y2\text{-}1 \quad (3); \text{ and}$$

$$0.5 < Y2\text{-}2 \quad (4), \text{ where}$$

Y1-1: the absolute value of the ray height of a principal ray at an outermost angle of view in rays emitted from a lens surface 1 arranged next to and toward the reduction side of the first stop (unit of mm), Y1-2: the absolute value of the ray height of a principal ray at an outermost angle of view in rays entering a lens surface 2 arranged next to and toward the magnification side of the first stop (unit of mm), Y2-1: the absolute value of the ray height of a principal ray at an outermost angle of view in rays emitted from a lens surface 3 arranged next to and toward the reduction side of the second stop (unit of mm), and Y2-2: the absolute value of the ray height of a principal ray at an outermost angle of view in rays entering a lens surface 4 arranged next to and toward the magnification side of the second stop (unit of mm). Here, the expression "arranged next to" means that objects are set next to each other, and does not necessarily mean that they are "in contact with each other".

Here, the term "outermost angle of view" is an angle of view farthest from an optical axis. The "principal ray at an outermost angle of view" is a principal ray of a bundle of rays emitted from a farthest position from an intersection of a straight line extending from the optical axis of the first refractive system and a flat surface including a surface of an image display element in an effective display area of the image display element.

In the range defined by the Formula (1), 2.0<Y1-1 is more preferable, and 2.5<Y1-1 is even more preferable. In the range defined by the Formula (2), 2.0<Y1-2 is more preferable, and 2.5<Y1-2 is even more preferable. In the range defined by the Formula (3), 1.5<Y2-1 is more preferable, and 2.0<Y2-1 is even more preferable. In the range defined by the Formula (4), 1.0<Y2-2 is more preferable, and 1.5<Y2-2 is even more preferable.

In the image formation optical system of the present disclosure, it is desirable that Y1-1, Y1-2, Y2-1 and Y2-2 and focal length fw of the entire system when focusing at wide-angle end at closest satisfy the following Formula (5) through (8):

$$0.5 < Y1\text{-}1/|fw| \quad (5);$$

$$0.5 < Y1\text{-}2/|fw| \quad (6);$$

$$0.3 < Y2\text{-}1/|fw| \quad (7); \text{ and}$$

$$0.1 < Y2\text{-}2/|fw| \quad (8).$$

In the range defined by the Formula (5), $0.6<Y1\text{-}1/|fw|$ is more preferable, and $0.7<Y1\text{-}1/|fw|$ is even more preferable. In the range defined by the Formula (6), $0.6<Y1\text{-}2/|fw|$ is more preferable, and $0.7<Y1\text{-}2/|fw|$ is even more preferable. In the range defined by the Formula (7), $0.4<Y2\text{-}1/|fw|$ is more preferable, and $0.5<Y2\text{-}1/|fw|$ is even more preferable. In the range defined by the Formula (8), $0.2<Y2\text{-}2/|fw|$ is more preferable, and $0.3<Y2\text{-}2/|fw|$ is more preferable.

In the image formation optical system of the present disclosure, it is desirable that the following Formula (9) through (12) are satisfied:

$$5.0<D1\text{-}1 \qquad (9);$$

$$5.0<D1\text{-}2 \qquad (10);$$

$$1.0<D2\text{-}1 \qquad (11); \text{ and}$$

$$1.0<D2\text{-}2 \qquad (12), \text{ where}$$

D1-1: a distance from the first stop to the lens surface 1 arranged next to and toward the reduction side of the first stop (unit of mm), D1-2: a distance from the first stop to the lens surface 2 arranged next to and toward the magnification side of the first stop (unit of mm), D2-1: a distance from the second stop to the lens surface 3 arranged next to and toward the reduction side of the second stop (unit of mm), and D2-2: a distance from the second stop to the lens surface 4 arranged next to and toward the magnification side of the second stop (unit of mm).

In the range defined by the Formula (9), $7.0<D1\text{-}1$ is more preferable, and $10.0<D1\text{-}1$ is even more preferable. In the range defined by the Formula (10), $7.0<D1\text{-}2$ is more preferable, and $10.0<D1\text{-}2$ is even more preferable. In the range defined by the Formula (11), $2.0<D2\text{-}1$ is more preferable, and $3.0<D2\text{-}1$ is even more preferable. In the range defined by the Formula (12), $2.0<D2\text{-}2$ is more preferable, and $3.0<D2\text{-}2$ is even more preferable.

In the image formation optical system of the present disclosure, it is desirable that the following Formula (13) is satisfied:

$$Ds2<Ds1 \qquad (13), \text{ where}$$

$$Ds1: D1\text{-}1+D1\text{-}2, \text{ and}$$

$$Ds2: D2\text{-}1+D2\text{-}2.$$

In the image formation optical system of the present disclosure, it is desirable that the following Formula (14) through (16) are satisfied:

$$1.0<\tan\theta 1\times|fw|<3.0 \qquad (14);$$

$$2.5<\tan\theta 2\times|fw|<6.0 \qquad (15); \text{ and}$$

$$1.5<\tan\theta 2/\tan\theta 1<4.0 \qquad (16), \text{ where}$$

θ1 is an incident angle on the first stop of a principal ray at an outermost angle of view, θ2 is an incident angle on the second stop of a principal ray at an outermost angle of view, and fw is a focal length of the entire system when focusing at wide-angle end and at closest.

In the range defined by the Formula (14), $1.5<\tan\theta 1\times|fw|<2.5$ is more preferable. In the range defined by the Formula (15), $3.0<\tan\theta 2\times|fw|<5.5$ is more preferable.

When the Formula (14) through (16) are satisfied, it is more desirable that the following Formula (17) is satisfied:

$$5.9<Ds1\times\tan\theta 1<20.0 \qquad (17).$$

In the range defined by the Formula (17), $7.0<Ds1\times\tan\theta 1<18.0$ is more preferable.

When the Formula (14) through (16) are satisfied, it is also desirable that the following Formula (18) is satisfied:

$$8.0<Ds2\times\tan\theta 2<30.0 \qquad (18).$$

In the range defined by the Formula (18), $10.0<Ds2\times\tan\theta 2<25.0$ is more preferable.

In the image formation optical system of the present disclosure, it is desirable that the following Formula (19) and (20) are satisfied:

$$0.9<\varphi s1\text{-}1/\varphi s1<2.0 \qquad (19);$$

$$0.9<\varphi s1\text{-}2/\varphi s1<2.0 \qquad (20), \text{ where}$$

φs1: the aperture diameter of the first stop,

φs1-1: the effective diameter of a lens arranged next to and toward the reduction side of the first stop, and φs1-2: the effective diameter of a lens arranged next to and toward the magnification side of the first stop.

When the Formula (19) and (20) are satisfied, it is desirable that the following Formula (21) and (22) are further satisfied:

$0.8\leq\varphi s2\text{-}1/\varphi s2<2.5$ (21); and $0.8\leq\varphi s2\text{-}2/\varphi s2<2.5$ (22), where φs2: the aperture diameter of the second stop, φs2-1: the effective diameter of a lens arranged next to and toward the reduction side of the second stop, and φs2-2: the effective diameter of a lens arranged next to and toward the magnification side of the second stop.

It is desirable that the image formation optical system of the present disclosure satisfies the following Formula (23):

$0.5<Y2\text{-}2\times\tan\theta 2$ (23).

It is desirable that the image formation optical system of the present disclosure satisfies the following Formula (24):

$$0.5<D2\text{-}2/Y2\text{-}2 \qquad (24).$$

In the image formation optical system of the present disclosure, it is desirable that a first adjacent lens next to a stop and a second adjacent lens arranged next to the first adjacent lens and toward a direction away from the stop do not include a cemented lens. In that case, it is more desirable that the whole image formation optical system does not include a cemented lens.

In the image formation optical system of the present disclosure, when two lenses comprising a first adjacent lens arranged next to and toward the reduction side of the first stop and a second adjacent lens arranged next to and toward the reduction side of the first adjacent lens are regarded as a group 1, two lenses comprising a first adjacent lens arranged next to and toward the magnification side of the first stop and a second adjacent lens arranged next to and toward the magnification side of the first adjacent lens are regarded as a group 2, two lenses comprising a first adjacent lens arranged next to and toward the reduction side of the second stop and a second adjacent lens arranged next to and toward the reduction side of the first adjacent lens are regarded as a group 3, and two lenses comprising a first adjacent lens arranged next to and toward the magnification side of the second stop and a second adjacent lens arranged next to and toward the magnification side of the first adjacent lens are regarded as a group 4, it is desirable that the lenses included in the groups 1, 2, 3 and 4 satisfy the following Formula (25) or (26):

$$40 \leq vd \text{ and } 0.97 < \tau 420 \quad (25); \text{ or}$$

$$vd < 40 \text{ and } 0.90 < \tau 420 \quad (26), \text{ where}$$

vd: Abbe's number of an optical material constituting a lens (a glass material, hereinafter the same), and τ420: an internal transmittance of an optical material having a thickness of 10.0 mm at the wavelength of 420 nm. More specifically, τ420 represents the ratio of the amount of emitted light relative to the amount of incident light, which is regarded as 1, when rays having the wavelength of 420 nm enter a flat lens having a thickness of 10.0 mm, and which is formed by a glass material constituting the lens, perpendicularly to a surface.

When the Formula (26) is satisfied, it is more preferable that the following Formula (27) is satisfied:

$$vd < 40 \text{ and } 0.93 < \tau 420 \quad (27).$$

In the image formation optical system of the present disclosure, when the temperature coefficient of a relative refractive index of the optical material is dn/dt, it is desirable that all the lenses in the lens groups satisfy the following Formula (28):

$$|dn/dt| < 6.5 \quad (28).$$

Here, the temperature coefficient of a relative refractive index represents a variation value of a relative refractive index of an optical material per temperature change of 1° C. for d-line (wavelength of 587.6 nm). An applicable temperature range is 0° C. through 20° C.

In the range defined by the Formula (28), |dn/dt|<6.0 is more preferable, and |dn/dt|<5.5 is even more preferable.

In the image formation optical system of the present disclosure, it is desirable that at least one positive lens arranged toward the reduction side of the first stop satisfies the following Formula (29):

$$65.0 < vd \text{ and } 0.005 < \theta g, F \quad (29), \text{ where}$$

vd: Abbe's number of an optical material of the positive lens at d-line (587.6 nm), and θg,F: abnormal dispersibility of the optical material of the positive lens.

In the range defined by the Formula (29), 65.0<vd and 0.010<θg,F is preferable, and 65.0<vd and 0.020<θg,F is even more preferable.

When the Formula (29) is satisfied, it is preferable that at least two positive lenses arranged toward the reduction side of the first stop satisfy 65.0<vd and 0.010<θg,F, and 65.0<vd and 0.020<θg,F is more preferable.

In the image formation optical system of the present disclosure, it is desirable that at least one positive lens arranged toward the magnification side of the first stop satisfies the following Formula (30):

$$65.0 < vd \text{ and } 0.005 < \theta g, F \quad (30).$$

In the range defined by the Formula (30), 65.0<vd and 0.010<θg,F is preferable, and 65.0<vd and 0.020<θg,F is more preferable.

When the Formula (30) is satisfied, it is more preferable that at least two positive lenses arranged toward the magnification side of the first stop satisfy the following formula:

$$65.0 < vd \text{ and } 0.005 < \theta g, F.$$

In the range defined by this formula, 65.0<vd and 0.010<θg,F is more preferable, and 65.0<vd and 0.020<θg,F is even more preferable.

It is desirable that the image formation optical system of the present disclosure includes at least one zoom group (variable magnification group) that moves during magnification change. It is desirable that a first zoom group, which has a largest number of lenses among zoom groups arranged toward the reduction side of the stop in the first refractive system, has a positive focal length, and that the first zoom group includes no lens toward the magnification side of the first stop but includes a lens or lenses toward the reduction side of the first stop.

When the image formation optical system is configured in this manner, it is desirable that a fixed group 1 that has a positive focal length and does not move during magnification change is arranged most toward the reduction side in the image formation optical system.

When the image formation optical system includes at least one zoom group that moves during magnification change as described above, it is desirable that a second zoom group arranged next to and toward the magnification side of the first stop is further included, and that the second zoom group comprises a positive lens or lenses.

It is desirable that the positive lens constituting the second zoom group, as described above, comprises a positive meniscus lens with a concave surface directed to the image side. It is desirable that the first zoom group and the second zoom group move independently during zooming.

When the first zoom group and the second zoom group, as described above, are provided, it is desirable that a last zoom group, which is arranged most toward the magnification side among the zoom groups, includes a negative lens.

It is desirable that the negative lens is arranged most toward the magnification side in the last zoom group. It is desirable that the last zoom group comprises only a negative lens or lenses. When the last zoom group comprises only a negative lens or lenses, it is desirable that a fixed group 2 is arranged next to and toward the magnification side of the last zoom group. It is desirable that such a fixed group 2 includes a negative meniscus aspheric lens. When the fixed group 2 includes the negative meniscus aspheric lens, as described above, it is desirable that the negative meniscus lens included in the first refractive system has a ratio of thickness of a center to an edge (thickness deviation ratio) of 1.5 or greater. It is possible to prevent generation of ghost light by doing so.

It is desirable that the image formation optical system of the present disclosure includes at least one focus group (focusing group) that moves during focusing, and that the at least one focus group includes a reduction-side focus group arranged in the first refractive system.

In that case, it is desirable that the image formation optical system includes at least two groups and configured to perform floating focusing. When the image formation optical system is configured in such a manner, it is desirable that the at least one focus group includes a magnification-side focus group arranged in the second refractive system.

It is desirable that the at least one focus group includes an intermediate focus group including a lens arranged most toward the magnification side in the first refractive system and a lens arranged most toward the reduction side in the second refractive system, and that an intermediate image is formed inside the intermediate focus group.

In the intermediate focus group, it is desirable that a positive meniscus lens with its convex surface directed to the magnification side is arranged toward the reduction side of the intermediate image, and that a positive meniscus lens with its convex surface directed to the reduction side is arranged toward the magnification side of the intermediate image. In the intermediate focus group, it is desirable that a negative meniscus lens is further arranged between the meniscus lens with its convex surface directed to the magnification side and the intermediate image.

When at least one focus group that moves during focusing is included, and the at least one focus group includes a reduction-side focus group arranged in the first refractive system, as described above, it is desirable that the last focus group arranged most toward the magnification side is arranged next to and toward the reduction side of the second stop. It is desirable that the last focus group comprises three elements of a positive lens, a negative lens and a positive lens.

When at least one focus group that moves during focusing is included, and the at least one focus group includes a reduction-side focus group arranged in the first refractive system, as described above, it is desirable that the lens group arranged toward the magnification side of the second stop comprises a fixed group 3 that does not move during zooming and focusing.

In the image formation optical system of the present disclosure, it is desirable that the second optical system including a reflective optical element is arranged toward the magnification side of the first optical system. In that case, it is desirable that the second optical system includes a concave surface mirror, and the concave surface mirror is arranged toward the magnification side of a second intermediate image formed by image formation action of the first optical system.

It is desirable that the reflective optical element includes a prism having a solid structure, and which has a total internal reflection surface, and that the prism has two reflective surfaces and all the incident bundles of rays are transmitted to a next surface at any of the surfaces by total reflection, and that the prism is arranged between the first optical system and the concave surface mirror. It is preferable that the angles of the inclined reflective surfaces of the prism are greater than 45° with respect to the optical axis.

Meanwhile, a projection apparatus of the present disclosure includes the image formation optical system of the present disclosure, as described above, and an image display element arranged at a reduction-side conjugate surface position of the image formation optical system.

An imaging apparatus of the present disclosure includes the image formation optical system of the present disclosure, as described above, and an imaging element arranged at a reduction-side conjugate surface position of the image formation optical system.

FIG. 8A a table showing moving amounts of zoom groups and focus groups of the image formation optical system in Example 1 about a case of moving a zoom group;

FIG. 8B a table showing moving amounts of zoom groups and focus groups of the image formation optical system in Example 1 about another case of moving zoom groups;

FIG. 9A graphs showing a spherical aberration (left), an astigmatism (center) and a distortion (right) when the image formation optical system in Example 1 is in a wide-angle end state;

FIG. 9B graphs showing a spherical aberration (left), an astigmatism (center) and a distortion (right) when the image formation optical system in Example 1 is in a telephoto end state;

FIG. 47A a diagram for explain lenses in the vicinity of a stop in the image formation optical system of the present disclosure;

FIG. 47B a diagram for explain lenses in the vicinity of a stop in the image formation optical system of the present disclosure;

Advantageous Effects of Disclosure

The image formation optical system of the present disclosure satisfies the Formula (1) through (4). As the values of Y1-1, Y1-2, Y2-1 and Y2-2, which are defined by Formula (1) through (4), respectively, are greater, the lenses are farther away from the stop. Therefore, it is possible to reduce light absorption by a lens arranged in the vicinity of the stop, the temperature of which tends to become high, by setting high values as defined by Formula (1) through (4), respectively. Hence, it is possible to prevent a fluctuation in performance of the image formation optical system due to heat generation caused by light absorption by these lenses.

More specifically, since rays entering a stop are basically collected, condensed rays tend to enter lenses on both sides of the stop. Consequently, optical energy tends to excessively concentrate on the lenses. To solve this problem, it is possible to disperse instead of collect rays entering each lens surface or rays emitted from each lens surface by regulating the ray height of the principal ray at the outermost angle of view on each of lens surfaces 1 and 3, which emit rays toward the stop, and lens surfaces 2 and 4, which the rays emitted from the stop enter. Therefore, the excessive concentration of light energy is suppressed, and a fluctuation of optical performance of each lens is suppressible.

Particularly, when Formula (5) through (8) are satisfied, the values defined by Formula (1) through (4) are further divided by the focal length when focusing at wide-angle end at closest. Therefore, it is possible to accurately regulate the ray height in a use area where a fluctuation in performance occurs most often.

Particularly, when Formula (9) through (12) are satisfied, the influence of heat and light on the lenses is more securely suppressible. More specifically, since the stop in the image formation optical system changes light energy to heat when excluding unwanted rays, the lenses in the vicinity of the stop tend to be affected by heat. Since the rays are more condensed as the distance from the stop is shorter, the optical energy tends to concentrate. Therefore, it is possible to prevent the stop and a lens surface next to the stop from becoming too close to each other by regulating the distance between the stop and the lens surface arranged next to the stop, as defined by Formula (9) through (12), and it is possible to suppress the influence of heat and light.

The Formula (13) through (16) represent a geometric relationship between the first refractive system arranged toward the reduction side of the intermediate image and the second refractive system arranged toward the magnification side of the intermediate image. For example, the incident angle θ2 on the second stop is set larger than the incident angle θ1 on the first stop to make a distance Ds2 between adjacent lenses on both sides of the stop in the second refractive system smaller than a distance Ds1 between adjacent lenses on both sides of the stop in the first refractive system. Then, it is possible to reduce an impact on each lens by the rays, and to reduce the entire length of the second refractive system. The first refractive system can obtain a sufficient length by reduction in the entire length of the second refractive system. Further, it is possible to secure a sufficient space for moving groups to focus (focusing) (focus stroke) and for moving groups to change magnification (zooming). As a result, it is possible to obtain a high quality image formation optical system.

Particularly, when Formula (13) is satisfied, in other words when a distance Ds1 between adjacent lenses on both sides of the stop in the first refractive system is set larger than a distance Ds2 between adjacent lenses on both sides of the stop in the second refractive system, it is possible to make lenses even in the vicinity of the first stop, which high intensity rays tend to enter from the reduction-side conjugate surface, less affected by light.

The value of tan $\theta1 \times |fw|$, defined by Formula (14), is the ratio of a tangent of an incident angle $\theta1$ on the first stop of a principal ray at an outermost angle of view and the focal length. If this numerical value is too small, the incident angle $\theta1$ becomes too small, and axial rays and off-axial rays are not sufficiently separated. Therefore, it becomes necessary to arrange the first stop and a lens with a large distance from each other, and the entire length of the lens becomes long. If this numerical value is too large, the incident angle $\theta1$ becomes too large, and the effective diameter of a lens arranged next to the stop becomes large. Therefore, the size of the optical system becomes large. Further, since the rays need to be greatly refracted, generated aberrations become too large. If the numerical value is in the range defined by Formula (14), it is possible to prevent the entire length of the lens from becoming long, and that is advantageous to reduce the size of the image formation optical system. Regarding the value of tan $\theta2 \times |fw|$, defined by Formula (15), similar explanations are applicable to the second stop.

Formula (16) defines a balance between the incident angle $\theta1$ of rays on the first stop and the incident angle $\theta2$ of rays on the second stop. If the value of tan $\theta2$/tan $\theta1$ is outside the range defined by this Formula (16), the entire length of the first refractive system or the second refractive system becomes long. Specifically, if the upper limit value is exceeded, the incident angle $\theta1$ becomes too small, and the entire length of the first refractive system becomes too long. If the incident angle $\theta2$ becomes too large, the lens diameter of the second refractive system becomes large, and there is a risk of increasing the number of lenses for suppressing excessive aberrations. If the value is below the lower limit value, the incident angle $\theta1$ becomes too large and the lens diameter becomes large. Further, the number of lenses for correcting excessive aberrations increases. As a result, it becomes difficult to maintain a lens distance necessary for zooming, and there is a risk of increased cost. If the incident angle $\theta2$ becomes too small, the entire length of second refractive system becomes too long. If the value of tan $\theta2$/tan $\theta1$ satisfies Formula (16), it is possible to prevent the entire length of the first refractive system or second refractive system from becoming long and to prevent an increase in the cost of the image formation optical system.

The value of Ds1×tan $\theta1$ defined by Formula (17) represents a value obtained by multiplying a distance between two lenses on both sides of the first stop by the tangent of the incident angle of light on the first stop. If the value is below the lower limit value of Formula (17), the ray height defined by Formula (1) decreases, and an influence of light on the optical performance of the image formation optical system increases. In contrast, if the value of Ds1×tan $\theta1$ exceeds the upper limit value of Formula (17), the entire length of the image formation optical system becomes too long, and that is disadvantageous to reduce the size of the image formation optical system.

If the incident angle $\theta1$ of light on the first stop is too steep in such a manner that the value of Ds1×tan $\theta1$ exceeds the range defined by Formula (17), the lens power becomes strong, and aberrations increase. The lens diameter of the lens rear part (the reduction side of the stop in the first refractive system) is restricted by mechanical restrictions of the projection apparatus and the like. When the distance between a stop and a lens is too long, or when the incident angle $\theta1$ of rays on the first stop is too steep, it is necessary to reduce (narrow) the width of rays by eliminating upper and lower rays of off-axial rays to maintain the off-axial rays while suppressing an increase in the effective diameter of the lens. In other words, there is a risk of a decrease in the relative illumination as the quantity of marginal light decreases. To prevent such problems, it is necessary to satisfy Formula (17).

So far, the value of Ds1×tan $\theta1$, the range of which is defined by Formula (17), was explained. Regarding the value Ds2×tan $\theta2$, the range of which is defined by Formula (18). similar explanations are applicable to the second stop and a distance to a lens surface related to the second stop.

Formula (19) and (20) define the effective diameters of the reduction-side lens surface and the magnification-side lens surface of adjacent lenses, respectively, with respect to the aperture diameter of the first stop. It is possible to restrict the degree of collecting rays on the lens surface by regulating in this manner. If the defined value is below the lower limit value of each formula, rays are excessively condensed on the lens surface, and the lens glass material is affected by light energy, and the optical performance changes. In contrast, if the defined value is the upper limit of each formula or greater, the lens effective diameter becomes too large, and the size of the whole optical system becomes large. If Formula (19) and (20) are satisfied, it is possible to prevent such problems.

Formula (21) and (22) define the effective diameters of a reduction-side lens surface and a magnification-side lens surface of adjacent lenses, respectively, with respect to the aperture diameter of the second stop. In this case, if Formula (21) and (22) are satisfied, similar effects achievable by satisfying Formula (19) and (20) are achievable.

Both of Formula (23) and Formula (24) represent the aforementioned conditions (a distance between a stop and a lens, an incident angle of rays on a stop, and a ray height) in different manners or supplement the conditions. If these Formula (23) and (24) are satisfied, it is possible to reduce an impact on the lens in the vicinity of the stop by rays.

The feature that no cemented lens is included is desirable especially when the image formation optical system is used for a high-brightness projector, for example. In other words, when the image formation optical system is used in a high-brightness projector, especially high output blue light illuminates the optical surface, and an adhesive tends to deteriorate. Therefore, it is preferable that no cemented lens using adhesive is included to make the image formation optical system durable.

As stated above, the problem of blur caused by a change in optical performance due to absorption of light by a lens arranged in the vicinity of a stop is remarkable especially for short-wavelength-side light, such as blue light. Therefore, it is necessary use glass having high $\tau420$ for a lens arranged in the vicinity of a stop. However, a glass material having high $\tau420$ tends to have a high Abbe's number vd, and that is disadvantageous for correcting chromatic aberrations. Therefore, it is possible to design the lens configuration having necessary aberration correction capability while absorption of short-wavelength-side light, such as blue light, is suppressed by also regulating Abbe's numbers vd so as to satisfy Formula (25) and (26) for each of a lens arranged next to and toward the reduction side of the first stop and a lens arranged next to and toward the magnification side of the first stop.

Formula (28) defines a temperature coefficient of glass material. A stop, which blocks unwanted rays, absorbs light and generates heat in some cases. The lens glass material, itself, also absorbs a part of light energy and generates heat in some cases. Therefore, lenses arranged in the vicinity of the stop tend to be influenced by heat. Although a blur may be generated when a lens in the vicinity of the first stop or the second stop is heated by light energy, the blur is suppressible by restricting the temperature coefficient of the refractive index of the glass material of the lens to a predetermined value or less.

Generally, the glass material having high τ420, and which is used for a lens in the vicinity of a stop, tends to have a high Abbe's number vd. When the glass material having high Abbe's number vd is used for many lenses, aberrations, particularly, chromatic aberrations tend to be insufficiently corrected. To solve this problem, a glass material having high abnormal dispersion characteristics (i.e., a high θg,F value), as defined by Formula (29) and (30), is used for a positive lens arranged in the vicinity of the first stop to appropriately correct chromatic aberrations, which tend to be insufficiently corrected.

In the present disclosure, it is possible to maintain the long entire length of the first refractive system by appropriately setting the incident angle of rays on the stop. Since a zoom group is appropriately arranged in a space generated as a result, a zoom lens having a high quality optical performance is achievable.

Particularly, it is preferable that the most reduction side group is a fixed group 1 having a positive focal length to make the image formation state on the reduction side of the image formation optical system telecentric for both WIDE and TELE states.

When the fixed group 1 comprises a positive single lens, various kinds of aberrations become large. Therefore, it is preferable that the fixed group 1 comprises a plurality of lenses, and that a negative lens is included.

A group including a largest number of lenses, and which is arranged toward the reduction side of the first stop, has an effect of determining the zoom ratio (magnification change ratio). It is preferable that this group has a positive focal length to reduce a moving distance.

BRIEF DESCRIPTION OF THE DRAWINGS

FIG. 2 a cross-section of the image formation optical system in Example 1 in a wide-angle end state (upper section) and in a telephoto end state (lower section);

FIG. 3 a cross-section illustrating that optical elements constituting the image formation optical system in Example 1 are in one magnification change and focusing state;

FIG. 4 a cross-section illustrating that optical elements constituting the image formation optical system in Example 1 are in another magnification change and focusing state;

FIG. 5 a table showing basic data about optical elements constituting the image formation optical system in Example 1;

FIG. 6 a table showing aspheric data about lenses constituting the image formation optical system in Example 1;

FIG. 7 a table showing aspheric data about a concave surface mirror constituting the image formation optical system in Example 1;

FIG. 8 a table showing moving amounts of zoom groups and focus groups of the image formation optical system in Example 1 about a case of moving a zoom group (1) and another case of moving zoom groups (2);

FIG. 9 graphs showing a spherical aberration (left), an astigmatism (center) and a distortion (right) when the image formation optical system in Example 1 is in a wide-angle end state (1) and in a telephoto end state (2);

FIG. 10 graphs showing a lateral aberration of the image formation optical system in Example 1 at a wide-angle end;

FIG. 11 graphs showing a lateral aberration of the image formation optical system in Example 1 at a telephoto end;

FIG. 12 a cross-section of an image formation optical system in Example 2 illustrating its lens configuration together with major bundles of rays;

FIG. 13 a cross-section of the image formation optical system in Example 2, illustrating that its lens configuration is in a wide-angle end state;

FIG. 14 a table showing basic data about optical elements constituting the image formation optical system in Example 2;

FIG. 15 a table showing aspheric data of lenses constituting the image formation optical system in Example 2;

FIG. 17 graphs showing a spherical aberration (left), an astigmatism (center) and a distortion (right) of the image formation optical system in Example 2;

FIG. 18 a cross-section of an image formation optical system in Example 3 illustrating its lens configuration together with major bundles of rays;

FIG. 19 a cross-section of the image formation optical system in Example 3 illustrating that its lens configuration is in a wide-angle end state;

FIG. 20 a table showing basic data about optical elements constituting the image formation optical system in Example 3;

FIG. 21 a table showing aspheric data of lenses constituting the image formation optical system in Example 3;

FIG. 24 a cross-section of the image formation optical system in Example 4 in a wide-angle end state (upper section) and in a telephoto end state (lower section);

FIG. 25 a cross-section of the mage formation optical system in Example 4, illustrating zoom groups and focus groups separately;

FIG. 26 a table showing basic data about optical elements constituting the image formation optical system in Example 4;

FIG. 27 a table showing aspheric data of lenses constituting the image formation optical system in Example 4;

FIG. 28 a table showing moving amounts of zoom groups and focus groups of the image formation optical system in Example 4;

FIG. 33 a cross-section of the image formation optical system in Example 5 in a wide-angle end state (upper section) and in a telephoto end state (lower section);

FIG. 34 a cross-section of the image formation optical system in Example 5 illustrating zoom groups and focus groups separately;

FIG. 35 a table showing basic data about optical elements constituting the image formation optical system in Example 5;

FIG. 36 a table showing aspheric data of lenses constituting the image formation optical system in Example 5;

FIG. 37 a table showing moving amounts of a zoom group and a focus group of the image formation optical system in Example 5;

FIG. 42 a table showing numerical values about major configuration of the image formation optical system for each example of the present disclosure;

FIG. 43 a table showing the names of glass material of major lenses in the image formation optical system for each example of the present disclosure;

FIG. 44 a table showing the internal transmittance τ420 of the glass material shown in FIG. 43 for each example;

FIG. 45 a table showing temperature coefficient dn/dt of the relative refractive index of the glass material shown in FIG. 43 for each example;

FIG. 46 a table showing abnormal dispersibility θg,F of major lenses of the image formation optical system for each example of the present disclosure;

DESCRIPTION OF EMBODIMENTS

Figure 1:
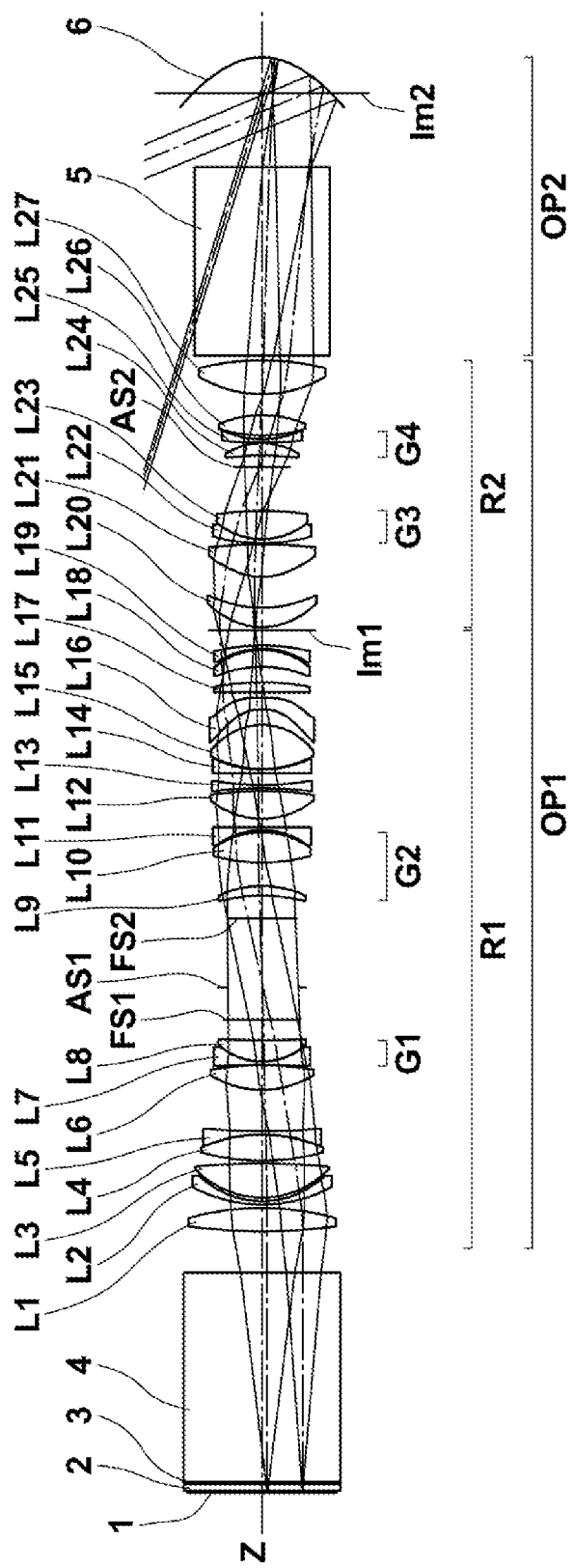
FIG. 1 a cross-section of an image formation optical system in Example 1 illustrating its lens configuration together with major bundles of rays.

Hereinafter, embodiments of the present disclosure will be described in detail with reference to the drawings. FIG. 1 is a cross-section of an image formation optical system 100 according to an embodiment of the present disclosure, illustrating its configuration together with major bundles of rays. FIG. 1 illustrates the image formation optical system 100 in a wide-angle end state. In FIG. 2, the bundles of rays are excluded, and the image formation optical system 100 in a wide-angle end state, indicated by "WIDE", is illustrated in the upper section. The image formation optical system 100 in a telephoto end state, indicated by "TELE", is illustrated in the lower section of FIG. 2. FIGS. 3 and 4, which will be described later, also illustrate the image formation optical system 100 in a wide-angle end state. In these diagrams, the left side is the reduction side and the right side is the magnification side. When the propagation direction of bundles of rays is considered, the magnification side is called front side and the reduction side is called rear side in some cases. This image formation optical system 100 corresponds to Example 1, which will be described later.

For example, the image formation optical system 100 is applied to a projection apparatus (projector) for magnifying and projecting an image displayed on an image display surface 1 of an image display element 2. Basically, the image formation optical system 100 comprises a first optical system OP1 and a second optical system OP2, arranged toward the magnification side of the first optical system OP1. The first optical system OP1 includes a first refractive system R1 and a second refractive system R2. The first refractive system R1 generates an intermediate image Im1, and the second refractive system R2 is arranged toward magnification side of the first refractive system R1 with this intermediate image Im1 between the two refractive systems. The second optical system OP2 includes a concave surface mirror 6, which is a reflective optical element. FIG. 1 is a cross-section of the image formation optical system 100 viewed along a flat plane including the optical path of a principal ray of a bundle of rays emitted from the center of a projection effective area on the image display surface 1 of the image display element 2 until reaching a projection screen. In the image formation optical system 100, illustrated in FIG. 1, the most image display element 2 side, in other words, the most rear lens L1 side is the reduction side, and the most front lens L27 side is the magnification side. In FIG. 1, G1, G2, G3 and G4 represent group 1, group 2, group 3 and group 4, respectively. The manner of illustration in FIGS. 1 and 2, as described above, is similar also in FIGS. 12 and 13 illustrating the image formation optical system 200 in Example 2 and FIGS. 18 and 19 illustrating the image formation optical system 300 in Example 3.

In FIG. 1, a principal ray of rays emitted from a position on the image display surface 1 of the image display element 2 closest to the optical axis Z (near end principal ray) is indicated by a dot dashed line. An upper ray and a lower ray emitted from the same position as the principal ray but at certain angles with respect to the principal ray, exhibiting scattering of the rays, are indicated by solid lines. A principal ray of rays emitted from a projection effective area end portion on the image display surface 1 (a lower end portion in FIG. 1) and an upper ray and a lower ray with respect to this principal ray are similarly illustrated. A position where the principal ray, the upper ray and the lower ray intersect one another is an image formation position. A first intermediate image Im1 and a second intermediate image Im2, which will be described later, are formed at this position. The manner of illustrating the principal ray and the upper ray and the lower ray, as described above, is similar also in FIGS. 3, 4, 12 and 18, which will be described later.

As illustrated in FIG. 1, a projection apparatus including the image formation optical system 100 comprises an image display element (light bulb) 2 having an image display surface 1, a prism 3, a glass block 4, a first optical system OP1 and a second optical system OP2 arranged in this order from the reduction side toward the magnification side. In this projection apparatus, after light is emitted from a light source, which is not illustrated, bundles of rays to which image information is given at the image display surface 1 enter the first optical system OP1 through the prism 3 and the glass block 4. A first intermediate image Im1 is formed by the first refractive system R1. The prism 3 is a color combination prism, such as a dichroic prism and a TIR prism. The bundles of rays further enter the second refractive system R2 in the first optical system OP1 and the second optical system OP2. Accordingly, the first intermediate image Im1 is formed as a second intermediate image Im2 between a prism (glass block) 5 and a concave surface mirror 6. The second intermediate image Im2 is reflected and magnified by the second optical system OP2 including the concave surface mirror 6, and projected as a magnified projection image on a screen, which is not illustrated.

In the lens configuration diagrams illustrated in FIG. 1 and FIGS. 2 through 4, 12, 13, 18 and 19, which will be described later, the first intermediate image Im1 and the second intermediate image Im2 are represented by solid straight lines, and only approximate positions on the optical axis Z are indicated. However, actual first intermediate image Im1 and second intermediate image Im2 are real images having shapes inclined (slanted) toward the rear side, i.e., toward the reduction side as farther away from the principal ray.

Next, elements, such as lenses, constituting the first refractive system R1 and the second refractive system R2 will be more specifically described. The first refractive system R1 comprises a biconvex lens L1, a negative meniscus lens L2, a biconvex lens L3, a biconvex lens L4, a biconcave lens L5, a biconvex lens L6, a biconcave lens L7, a positive meniscus lens L8, a first field stop FS1, a first aperture stop AS1, a second field stop FS2, a positive meniscus lens L9, a biconvex lens L10, a negative meniscus lens L11, a biconvex lens L12, a biconcave lens L13, a planoconcave lens L14, a biconvex lens L15, a negative meniscus lens L16, a biconvex lens L17, a positive meniscus lens L18 and a negative meniscus lens L19 arranged along the optical axis Z in this order from the reduction side toward the magnification side. The first intermediate image Im1 is formed by the first refractive system R1.

The second refractive system R2 comprises a positive meniscus lens L20, a biconvex lens L21, a negative meniscus lens L22, a biconvex lens L23, a second aperture stop AS2, a positive meniscus lens L24, a negative meniscus lens L25, a biconvex lens L26 and a biconvex lens L27 arranged along the optical axis Z in this order from the reduction side toward the magnification side. The first intermediate image Im1 is further formed as the second intermediate image Im2 by the second refractive system R2.

A second optical system OP2 including a prism 5 and a concave surface mirror 6 is arranged toward the magnification side of the second refractive system R2, and bundles of rays emitted from the second refractive system R2 enter the second optical system OP2. Then, as described above, the second intermediate image Im2 is reflected and magnified by the second optical system OP2, and projected onto a screen, which is not illustrated, as a magnified projection image. The prism 5 has a solid structure and two total internal reflection surfaces, and all the bundles of rays incident on the prism 5 are totally reflected at both of the two surfaces and transmitted to next surfaces.

Each element, such as a lens, constituting the first optical system OP1, as described above, is moved alone or in a set of a plurality of elements, in the direction of the optical axis Z, for zooming (magnification change) and focusing (focus). Next, with reference to FIGS. 3 and 4, a lens group that is moved for zooming, i.e., a zoom group and a lens group that is moved for focusing, i.e., a focus group will be described. In FIGS. 3 and 4, a lens group functioning as a zoom group (which may include a stop that moves in conjunction with the lens group) is represented by a group number of "z" followed by 1 through 5 or 1 through 6. A lens group functioning as a focus group is represented by a group number of "f" followed by 1 through 3. In FIGS. 3 and 4, a drive mechanism for moving each of these lens groups is omitted.

The image formation optical system 100 of the present embodiment is expected to apply to two cases, i.e, a case where only one zoom group z1 is arranged toward the reduction side of the first aperture stop AS1, and the zoom group z1 is moved together with the first aperture stop AS1 during zooming (magnification change) and a case where two zoom groups z1 and z2 are arranged toward the reduction side of the first aperture stop AS1 and the zoom group z1 and the zoom group z2 are moved together with the first aperture stop AS1 during zooming. FIG. 3 illustrates the zoom groups z1 through 5 and focus groups f1 through 3 in the former case, and FIG. 4 illustrates the zoom groups z1 through 6 and focus groups f1 through 3 in the latter case.

Next, with reference to FIGS. 5 through 9, detailed data about elements constituting Example 1 according to an embodiment of the present disclosure will be described. First, FIG. 5 shows basic data about elements in Example 1. In the basic data of FIG. 5, the column of surface No. shows surface numbers sequentially increase from a most reduction side surface of the elements, as a 0th surface, toward the magnification side. For each surface number, a surface having an aspheric shape is represented by a mark "*". In the column of elements, elements other than the lenses L1 through L27 are expressed by abbreviations. With reference to FIG. 1, the abbreviations will be sequentially described from the reduction side. "OBJ" represents a surface of an image displayed on an image display surface 1 of an image display element 2, and "PR2", "PR3" and "PR4", which follow "OBJ", represent an image display element 2, a prism 3 and a prism 4, respectively. "FS1", "AS1" and "FS2" represent a first field stop FS1, a first aperture stop AS1 and a second field stop FS2, respectively. "Im1" represents the aforementioned first intermediate image Im1, and "AS2" represents a second aperture stop AS2. "PR5" represents a prism 5, and "Im2" represents a second intermediate image Im2, and "MIR" represents a concave surface mirror 6. "IMG" represents a projection image, projected onto a screen, which is not illustrated. The column of a radius of curvature in FIG. 5 shows a paraxial radius of curvature of each surface. The sign of the radius of curvature is positive when the surface shape is convex toward the reduction side, and negative when the surface shape is convex toward the magnification side. The column of surface distance shows a distance on the optical axis Z between a surface having the relevant surface number and a surface having the next surface number in the direction of the optical axis Z. These values are values when the image formation optical system 100 is set to wide-angle end, and values in an optical path from the reduction side to the concave surface mirror 6 are dealt as positive values, and values in a reverse optical path from the concave surface mirror 6 are dealt as negative values. The value of an effective diameter is twice a value of an effective image height. The unit of the radius of curvature, the surface distance and the effective diameter is mm. Further, the columns of a glass material, a refractive index and an Abbe's number show the name of a glass material of each optical element, a refractive index for d-line (wavelength of 587.6 nm) and an Abbe's number for d-line. In FIG. 5, the values are also appropriately rounded. The manner of illustration in FIG. 5, as described above, is similar also in FIGS. 14, 20, 26 and 35, which will be described later.

FIG. 6 shows the surface number (No.) of an aspheric surface and aspheric coefficients, as data about an aspheric lens surface. "En" means "10 to the n-th power". The shape of an aspheric surface is expressed by the following formula using the coefficients K, A4, A6, A8, A10, A12, A14 and A16 in FIG. 6:

$$X=(1/Rdy)R^2/[1+\{1-(1+K)(1/Rdy)^2R^2\}^{1/2}]+A4R^4+A6R^6+A8R^8+A10R^{10}+A12R^{12}+A14R^{14}+A16R^{16},$$

where

X is a sag amount of a surface parallel to the optical axis, R is a radius distance [$R=(x^2+y^2)^{1/2}$], x and y are coordinates in directions perpendicular to the optical axis and orthogonal to each other, Rdy is a paraxial radius of curvature, and K is a conic constant. The meaning of "No.", "En", "X", "R", "K" and "Rdy" is similar also in the later explanation about an aspheric surface.

FIG. 7 shows aspheric coefficients, as data about a concave surface mirror 6, in which a reflective surface (surface No.=68) is aspheric. The aspheric shape of a reflective surface of the concave surface mirror 6 is expressed by the following formula, by applying the aspheric coefficients shown in FIG. 7:

$$X=(1/Rdy)R^2/[1+\{1-(1+K)(1/Rdy)^2R^2\}^{1/2}]+A3R^3+A4R^4+A5R^5+A6R^6+A8R^8+A10R^{10}+A12R^{12}+A14R^{14}+A16R^{16}.$$

Next, with reference to FIGS. 8A and 8B, the moving amount of the zoom group and the focus group will be described. As described already, the present embodiment expects two cases, i.e., a case where one zoom group z1 is moved together with the first aperture stop AS1 (see FIG. 3) and a case where two zoom groups z1 and z2 are moved together with the first aperture stop AS1 (see FIG. 4). The former case is illustrated in FIG. 8A, in which moving amounts of a zoom group and a focus group are called first parameter. The latter case is illustrated in FIG. 8B, in which a moving amount of a zoom group is called second parameter. As will be described later, the moving amount is represented by a surface distance between lens surfaces. Since the moving amount of a focus group is common in the two cases, the moving amount of the focus group is omitted in FIG. 8B.

In FIGS. 8A and 8B, the column of Z shows the state of lens groups that differ depending on zooming or focusing. This state corresponds to the four states of states 1 through 4 in the first parameter in FIG. 8A and 2 states of state 1 and 2 in the second parameter in FIG. 8B. In FIGS. 8A and 8B, the column of EFL shows an effective focal length of the image formation optical system 100 (effective focal length: unit is mm). The column "s+numerical value" continuing on the right side of the column EFL shows a surface distance (unit of mm) between surfaces shown in FIG. 5, and the numerical value represents the surface number (No.). For example, s11 is a surface distance from a surface having a surface number No. =11, i.e., a front lens surface of the lens L3 to the next surface having a surface number No. = 12. The term "ZOOM" written under the box of "s+numerical value" represents that a surface distance in the column changes by zooming, and the term "FOCUS" represents that a surface distance in the column changes by focusing. In the first parameters in FIG. 8A, the state 1 and 2 are a state of focusing (focus) on a closest object, such as a screen, in a focusing range, and the state 3 and 4 are a state of focusing on a farthest object in a focusing range. Further, the state 1 and 3 are in a wide-angle end state set by zooming, and the state 2 and 4 are in a telephoto end state set by zooming. In the second parameter in FIG. 8B, the state 1 is a wide-angle end state, and the state 2 is in a telephoto end state.

Next, the configuration of more details in Example 1 of the present disclosure and the effect of the configuration will be described. The configuration of the details is mainly related to numerical values. Therefore, for the purpose of comparison, the numerical values are shown in FIGS. 42 through 46 together with those about Example 2 through 5, which will be described later. In FIGS. 42 and 44 through 46 showing numerical values, the values are also appropriately rounded.

FIG. 42 shows the focal length fw of the entire system of the image formation optical system 100 in a wide-angle end state, as "fw". All the numerical values in FIG. 42 are values when the image formation optical system 100 is focusing in a wide-angle end state at closest, and the values are appropriately rounded. The unit of the numerical values is mm unless otherwise specified. Under the box of "fw", values of ray heights Y1-1, Y1-2, Y2-1 and Y2-2, the numerical value ranges of which are defined by Formula (1), (2), (3) and (4) respectively, are shown. In the following descriptions, the numerical values in FIG. 42 will be described also from the top to the bottom of FIG. 42.

Figure 47A:
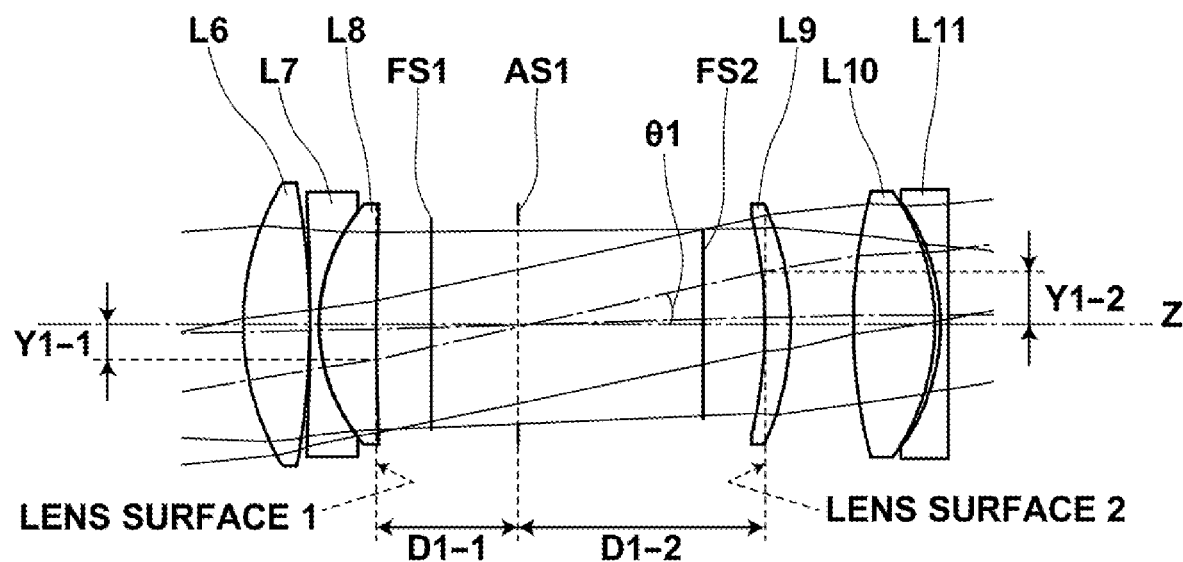
FIG. 47 a diagram for explain lenses in the vicinity of a stop in the image formation optical system of the present disclosure.
Figure 47B:
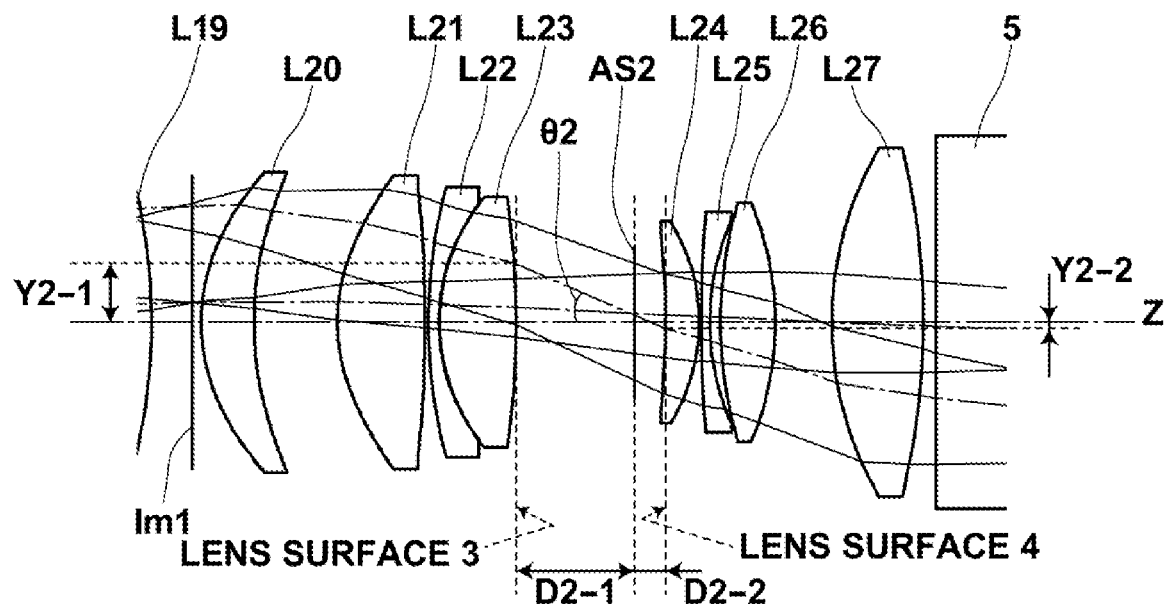

Now, with reference to FIGS. 47A and 47B, the ray heights will be clearly described. Ray heights Y1-1 and Y1-2 are the absolute values of ray heights of a principal ray at a lens surface 1 arranged next to and toward the reduction side of the first stop and at a lens surface 2 arranged next to and toward the magnification side of the first stop. Specifically, in the present example, as illustrated in FIG. 47A, a lens surface toward the first aperture stop AS1 of the lens L8, arranged next to and toward the reduction side of the first aperture stop AS1, is a lens surface 1 and a lens surface toward the first aperture stop AS1 of the lens L9, arranged next to and toward the magnification side of the first aperture stop AS1, is a lens surface 2. A principal ray at an outermost angle of view emitted from the lens surface 1 and entering the lens surface 2 (a surface orthogonal to the optical axis Z) is illustrated as a ray forming an incident angle θ1 with respect to the lens surface 2. Here, the outermost angle of view means what has already described. The ray heights Y1-1 and Y1-2 are lengths of portions illustrated in FIG. 47A.

The ray heights Y2-1 and Y2-2 are the absolute values of the ray heights of the principal ray at the lens surface 3, which is arranged next to and toward the reduction side of the second stop, and at the lens surface 4, which is arranged next to and toward the magnification side of the second stop. Specifically, in the present example, as illustrated in FIG. 47B, a lens surface toward the second aperture stop AS2 of the lens L23, which is arranged next to and toward the reduction side of the second aperture stop AS2, is a lens surface 3 and a lens surface toward the second aperture stop AS2 of the lens L24, which is arranged next to and toward the magnification side of the second aperture stop AS2, is a lens surface 4. A principal ray at an outermost angle of view emitted from the lens surface 3 and entering the lens surface 4 (a surface orthogonal to the optical axis Z) is illustrated as a ray forming an incident angle θ2 with respect to the lens surface 4. The ray heights Y2-1 and Y2-2 are lengths of portions illustrated in FIG. 47B.

As described above, in Example 1 of the present disclosure, the values of ray heights Y1-1, Y1-2, Y2-1 and Y2-2 are as shown in FIG. 42, and all of them satisfy Formula (1), (2), (3) and (4), respectively. When the values of Y1-1, Y1-2, Y2-1 and Y2-2 are large enough to satisfy these Formula (1) through (4), lenses L8 and L9 are sufficiently away from the first aperture stop AS1, and the lenses L23 and L24 are sufficiently away from the second aperture stop AS2. The temperature of the first aperture stop AS1 and the second aperture stop AS2 tends to become high by receiving rays. If each of the lenses L8, L9, L23 and L24 is sufficiently away from the aperture stop AS1 or AS2, it is possible to prevent the temperature of these lenses L8, L9, L23 and L24 from becoming high by heat absorption. Then, it is possible to prevent a fluctuation in performance of the image formation optical system 100 caused by heat absorption by the lenses L8, L9, L23 and L24. This reason was already described in detail.

The aforementioned effect achievable in the range defined by Formula (1) is more remarkable if $2.0<Y1\text{-}1$ is satisfied, and further if $2.5<Y1\text{-}1$ is satisfied in this order. The aforementioned effect achievable in the range defined by Formula (2) is more remarkable if $2.0<Y1\text{-}2$ is satisfied, and further if $2.5<Y1\text{-}2$ is satisfied in this order. The aforementioned effect achievable in the range defined by Formula (3) is more remarkable if $1.5<Y2\text{-}1$ is satisfied, and further if $2.0<Y2\text{-}1$ is satisfied in this order. The aforementioned effect achievable in the range defined by Formula (4) is more remarkable if $1.0<Y2\text{-}2$ is satisfied, and further if $1.5<Y2\text{-}2$ is satisfied in this order.

Next, FIG. 42 shows the values of Y1-1/|fw|, Y1-2/|fw|, Y2-1/|fw| and Y2-2/|fw|, the ranges of which are defined by the Formula (5), (6), (7) and (8), respectively. These values are obtained by dividing the four ray heights by the absolute value of fw, which is 9.08. In Example 1 of the present disclosure, all the values satisfy the Formula (5), (6), (7) and (8). When the Formula (5) through (8) are satisfied, values defined by the Formula (1) through (4) are further divided by the focal length when focusing at a wide-angle end at closest. Therefore, it is possible to appropriately define the ray height in a use area where a fluctuation in performance occurs most often.

The aforementioned effect achievable in the range defined by Formula (5) is more remarkable if $0.6<Y1\text{-}1/|fw|$ is satisfied, and further if $0.7<Y1\text{-}1/|fw|$ is satisfied in this order. The aforementioned effect achievable in the range defined by Formula (6) is more remarkable if $0.6<Y1\text{-}2/|fw|$ is satisfied, and if $0.7<Y1\text{-}2/|fw|$ is satisfied in this order. The aforementioned effect achievable in the range defined by Formula (7) is more remarkable if $0.4<Y2\text{-}1/|fw|$ is satisfied, and further if $0.5<Y2\text{-}1/|fw|$ is satisfied in this order. The aforementioned effect achievable in the range defined by Formula (8) is more remarkable if $0.2<Y2\text{-}2/|fw|$ is satisfied, and further if $0.3<Y2\text{-}2/|fw|$ is satisfied in this order.

[0092]

Next, FIG. 42 shows the values of distances D1-1, D1-2, D2-1 and D2-2 from a stop to a lens surface, the numerical value ranges of which are defined by the Formula (9), (10), (11) and (12), respectively. Here, with reference to FIGS. 47A and 47B, these distances will be clearly described. The distances D1-1 and D1-2 are a distance from the lens surface 1 arranged next to and toward the reduction side of the first stop to the first stop and a distance from the lens surface 2 arranged next to and toward the magnification side of the first stop to the first stop, respectively. Specifically, in this example, these lens surface 1 and lens surface 2 are as illustrated in FIG. 47A, which has been described already. A distance D1-1 between the lens surface 1 and the first aperture stop AS1 and a distance D1-2 between the lens surface 2 and the first aperture stop AS1 are also as illustrated in FIG. 47A.

A distance D2-1 is a distance between a lens surface 3 that is arranged next to and toward the reduction side of a second stop and the second stop and a distance D2-2 is a distance between a lens surface 4 that is arranged next to and toward the magnification side of the second stop and the second stop. Specifically, in this example, these lens surface 3 and lens surface 4 are as illustrated in FIG. 47B, which has been described already. The distance D2-1 between the lens surface 3 and the second aperture stop AS2 and the distance D2-2 between the lens surface 4 and the second aperture stop AS2 are also as illustrated in FIG. 47B.

The values of the distances D1-1, D1-2, D2-1 and D2-2 in Example 1 of the present disclosure, which are distances from a stop to a lens surface as described above, are shown in FIG. 42. All the values satisfy the Formula (9), (10), (11) and (12). If the lenses L8, L9, L23 and L24 are sufficiently away from aperture stops AS1 or AS2 to satisfy these Formula (9), (10), (11) and (12), it is possible to prevent the temperature of the lenses L8, L9, L23 and L24 from becoming high by heat absorption. Accordingly, it is possible to prevent a fluctuation in performance of the image formation optical system 100 caused by heat absorption by the lenses L8, L9, L23 and L24.

Next, FIG. 42 shows values of Ds1 and Ds2, the magnitude relationship of which is defined by Formula (13). As already described, Ds1=D1-1+D1-2, and Ds2=D2-1+D2-2. Specifically, in Example 1 of the present disclosure, Ds1=62.95 and Ds2=35.74. Therefore, the magnitude relationship defined by Formula (13) is satisfied.

Next, FIG. 42 sequentially shows an aperture diameter φs1 of the aperture stop AS1, which is the first stop, an aperture diameter φs2 of the aperture stop AS2, which is the second stop, an effective diameter φs1-1 of the lens surface 1, an effective diameter φs1-2 of a lens surface 2, an effective diameter φs2-1 of a lens surface 3 and an effective diameter φs2-2 of a lens surface 4.

Next, FIG. 42 sequentially shows the values of φs1-1/φs1, φs1-2/φs1, φs2-1/φs2 and φs2-2/φs2, which are derived from the aforementioned values of the effective diameters. The numerical value range of the value of φs1-1/φs1 is defined by Formula (19). The numerical value range of the value of φs1-2/φs1 is defined by Formula (20). The numerical value range of the value of φs2-1/φs2 is defined by Formula (21). The numerical value range of the value of φs2-2/φs2 is defined by Formula (22). Specifically, in Example 1 of the present disclosure, the values are 1.42, 1.25, 1.58 and 1.00, respectively. Therefore, all the Formula (19), (20), (21) and (22) are satisfied.

Formula (19) and (20) define the effective diameter of a reduction side lens surface of an adjacent lens and the effective diameter of a magnification side lens surface of an adjacent lens with respect to the aperture diameter of the first stop, respectively. It is possible to restrict the degree of collecting rays on the lens surface by regulating in this manner. If the defined value is below the lower limit value of each formula, the rays are excessively collected on the lens surface, and the lens glass material is affected by light energy, and the optical performance changes. In contrast, if the defined value is the upper limit value of each formula or greater, the lens effective diameter becomes too large, and the size of the whole optical system becomes large. If Formula (19) and (20) are satisfied, it is possible to prevent such problems.

Formula (21) and (22) define the effective diameter of a reduction side lens surface of an adjacent lens and the effective diameter of a magnification side lens surface of an adjacent lens with respect to the aperture diameter of the second stop, respectively. If both of Formula (21) and (22) are satisfied, a similar effect achievable by satisfying Formula (19) and (20) is achievable.

Next, FIG. 42 shows an incident angle θ1 on the first stop (aperture stop AS1) of a principal ray at an outermost angle of view and an incident angle θ2 on the second stop (aperture stop AS2) of a principal ray at an outermost angle of view. The unit of the incident angles θ1 and 02 is ° (degree). The values under them are tan θ1 and tan θ2, which are tangent values of the incident angles θ1 and 02, respectively. These values of tan θ1 and tan θ2 are naturally bare numbers.

Next, FIG. 42 shows values related to the values of tan θ1 and tan θ2, and which are the value of tan θ2/tan θ1, the numerical value range of which is defined by Formula (16), the value of tan θ1×|fw|, the numerical value range of which is defined by Formula (14) and the value of tan θ2×|fw|, the numerical value range of which is defied by Formula (15). As already described, |fw|=9.08. Specifically, in Example 1 of the present disclosure, tan θ2/tan θ1=1.90, which satisfies Formula (16). Further, tan θ1×|fw|=2.35, which satisfies Formula (14). Further, tan θ2×|fw|=4.45, which satisfies Formula (15).

If Formula (14) and (15) are satisfied, it is possible to prevent the entire length of the lens from becoming long, and that is advantageous in reducing the size of the image formation optical system 100. The reason was already described in detail. Particularly, in Example 1 of the present disclosure, a more preferable relationship 1.5<tan θ1×|fw|<2.5 is also satisfied in the range defined by the Formula (14), and a more preferable relationship 3.0<tan θ2×|fw|<5.5 is also satisfied in the range defined by the Formula (15). Therefore, more remarkable effect is achievable. Since Formula (16) is satisfied, it is possible to prevent the entire length of the first refractive system R1 or second refractive system R2 from becoming long, and to prevent an increase in the cost of the image formation optical system 100. The reason was already described in detail.

Next, FIG. 42 shows a value related to the values of DS1 and tan θ1, and which is the value of Ds1×tan θ1, the numerical value range of which is defined by Formula (17). Specifically, in Example 1 of the present disclosure, Ds1×tan θ1=16.28, which satisfies Formula (17). If Formula (17) is satisfied, it is possible to prevent problems, such as a problem that an impact on the optical performance of the image formation optical system 100 increases as the ray height defined by Formula (1) decreases, a problem that it becomes difficult to reduce the size of the image formation optical system 100 and a problem that a relative illumination becomes lower. The reason was already described in detail. Particularly, in Example 1 of the present disclosure, a more preferable relationship 7.0<Ds1×tan θ1<18.0 is also satisfied in the range defined by the Formula (17). Therefore, a more remarkable effect is achievable.

Next, FIG. 42 shows a value related to the values of Ds2 and tan θ2, and which is the value of Ds2×tan θ2, the numerical value range of which is defined by Formula (18). Specifically, in Example 1 of the present disclosure, Ds2×tan θ2=11.77, which satisfies Formula (18). If Formula (18) is satisfied, a similar effect achievable by satisfying Formula (17) is achievable. The reason was already described in detail. Particularly, in Example 1 of the present disclosure, a more preferable relationship 10.0<Ds2×tan θ2<25.0 is also satisfied in the range defined by the Formula (18). Therefore, a more remarkable effect is achievable.

Next, FIG. 42 shows a value related to the values of Y2-2 and tan θ2, and which is the value of Y2-2×tan θ2, the numerical value range of which is defined by Formula (23). Specifically, in Example 1 of the present disclosure, Y2-2× tan θ2=1.20, which satisfies Formula (23). If Formula (23) is satisfied, it is possible to reduce an impact on a lens in the vicinity of the aperture stop AS2 by rays. The reason was already described in detail.

Next, FIG. 42 shows a value related to the values of D2-2 and Y2-2, and which is the value of D2-2/Y2-2, the numerical value range of which is defined by Formula (24). Specifically, in Example 1 of the present disclosure, D2-2/ Y2-2=2.04, which satisfies Formula (24). If Formula (24) is satisfied, it is possible to reduce an impact on a lens in the vicinity of the aperture stop AS2 by rays. The reason was already described in detail.

Here, with reference to FIGS. 43 through 45, the characteristics of lenses in the vicinity of the first stop and the second stop, i.e., first adjacent lenses arranged next to and toward the reduction side or magnification side of the first stop, first adjacent lenses arranged next to and toward the reduction side or magnification side of the second stop, and second adjacent lenses arranged next to the first adjacent lenses and opposite from the stops will be described. In the present example, the first stop is the aperture stop AS1 and the second stop is the aperture stop AS2. A set of a first adjacent lens and a second adjacent lens is called a group, and a group on the reduction side of the aperture stop AS1 is group 1 and a group on the magnification side of the aperture stop AS1 is group 2. A group on the reduction side of the aperture stop AS2 is group 3 and a group on the magnification side of the aperture stop AS2 is group 4. Specifically, as seen from FIG. 1 and the like, lenses L7 and L8 are a second adjacent lens and a first adjacent lens, respectively, in group 1. In group 2, lenses L9 and L10 are a first adjacent lens and a second adjacent lens, respectively. Meanwhile, in group 3, lenses L22 and L23 are a second adjacent lens and a first adjacent lens. In group 4, lenses L24 and L25 are a first adjacent lens and a second adjacent lens, respectively.

FIG. 43 shows the glass material of the first adjacent lenses and the second adjacent lenses in the groups 1 through 4 for each example together.

FIG. 44 shows the value of internal transmittance τ420 for each of the glass materials. These values are bare numbers, and for example, 0.991 is 99.1%, represented in percentage. Next, with reference to FIG. 44, the configuration related to Formula (25) through (27) will be described. First, among the lenses included in the groups 1 through 4, lenses having an Abbe's number of less than 40 for d-line are the first adjacent lens (lens L9) in the group 2, the second adjacent lens (lens L22) in the group 3 and the second adjacent lens (lens L25) in the group 4. Specifically, the Abbe's numbers vd of these lenses are 32.3, 35.0 and 35.2, respectively (see FIG. 5, hereinafter similar), and τ420 is 0.982, 0.901 and 0.931, respectively. Therefore, Formula (25) is satisfied.

Meanwhile, among the lenses included in the groups 1 through 4, lenses having an Abbe's number of 40 or greater for d-line are the first adjacent lens (lens L7) and the second adjacent lens (lens L8) in the first group, the second adjacent lens (lens L10) in the group 2, the first adjacent lens (lens L23) in the group 3 and the first adjacent lens (lens L24) in the group 4. Specifically, the Abbe's numbers vd of these lenses are 54.7, 69.9, 44.3, 70.2 and 70.2, respectively, and τ420 is 0.991, 0.995, 0.989, 0.999 and 0.999, respectively. Therefore, Formula (26) is satisfied, and Formula (27) is also satisfied.

If Formula (25) and (26) are satisfied, it is possible to design the configuration of a lens having necessary aberration correction capability while absorption of short wavelength side light, such as blue light, at lenses L8, L9 and L10 in the vicinity of the aperture stop AS1 is suppressed. The reason was already described in detail.

Next, the configuration related to Formula (28) will be considered. Since all of the first adjacent lenses or second adjacent lenses related to the formula, i.e., all of the eight lenses of lenses L7 through L10 and lenses L22 through L25 included in the groups 1 through 4 satisfy |dn/dt|<6.5, as shown in FIG. 45, Formula (28) is satisfied. Therefore, the impact on the optical performance of the lenses by heat is suppressible. The reason was already described in detail.

Next, with reference to FIG. 46, configuration related to Formula (29) and (30) will be described. FIG. 46 shows abnormal dispersibility θg,F of major lenses for each example together. In Example 1 of the present disclosure, lenses L3 and L4 are listed as positive lenses arranged toward the reduction side of the aperture stop AS1. The abnormal dispersibility θg,F of the glass material of the lenses L3 and L4 are 0.0457 and 0.0276, respectively, and both of which exceed 0.005. The Abbe's numbers vd of the glass material of the lenses L3 and L4 for d-line (587.6 nm) are 94.7 and 75.5, respectively (see FIG. 5, hereinafter similar), both of which exceed 65. Therefore, Formula (29) is satisfied in Example 1 of the present disclosure.

In Example 1 of the present disclosure, five lenses of lenses L12, L15, L17, L26 and L27 are listed as positive lenses arranged toward the magnification side of the aperture stop AS1 in FIG. 46. The abnormal dispersibility θg,F of the glass material of the lenses L12, L15, L17, L26 and L27 are 0.0457, 0.0457, 0.0457, 0.0457 and 0.0123, respectively, which exceed 0.005. The Abbe's numbers vd of the glass material of the lenses L12, L15, L17, L26 and L27 for d-line (587.6 nm) are 94.7, 94.7, 94.7, 94.7 and 67.7, respectively, which exceed 65. Therefore, Formula (30) is satisfied in Example 1 of the present disclosure.

Since Formula (29) and (30) are satisfied, as described above, it is possible to appropriately correct chromatic aberrations, which tend to be insufficiently corrected, while using a glass material having a high Abbe's number vd.

In Example 1 of the present disclosure, the incident angles of rays on the aperture stop AS1, which is the first stop, and the aperture stop AS2, which is the second stop, are appropriately set by satisfying Formula (1) through (4). Therefore, it is possible to maintain the long entire length of the first refractive system R1. Since zoom groups z1 through 5 or zoom groups z1 through 6 are appropriately arranged, as illustrated in FIGS. 3 and 4, in a space generated in the first refractive system R1 as a result, a zoom lens having a high optical performance is achievable.

In Example 1 of the present disclosure, as a fixed group 1 having a positive focal length, and which does not move during magnification change, the lens L1 is arranged most toward the reduction side of the image formation optical system 100. Therefore, it is possible to easily make the image formation state toward the reduction side of the image formation optical system 100 telecentric for both a wide-angle end and a telephoto end.

If the fixed group 1 comprises a positive single lens, various kinds of aberrations become large. Therefore, it is preferable that the fixed group 1 comprises a plurality of lenses. It is more preferable that a negative lens is included.

In Example 1 of the present disclosure, a zoom group z2 including a largest number of lenses (five lenses) arranged toward the reduction side of the aperture stop AS1, which is the first stop, functions to determine the zoom ratio (variable magnification ratio). This zoom group z2 has a positive focal length, and that is preferable to reduce a moving distance for changing magnification.

A zoom group z3, which is arranged next to and toward the magnification side of the zoom group z2, also has a positive focal length. That is advantageous to reduce the diameter of lens groups arranged toward the magnification side of the zoom group z3 and an aspheric lens included in the groups, and to reduce the cost. Further, the zoom group z3 comprises a positive meniscus lens having a convex surface directed to the magnification side, and that is preferable to reduce aberrations.

It is preferable that the first refractive system R1 is a retro focus type to maintain a long object distance on the reduction side (back focus). Further, it is preferable that a rear group in the first refractive system R1, i.e., a lens group on the reduction side of the aperture stop AS1, which is the first stop, is a positive lens group, and that a front group in the first refractive system R1, i.e., a lens group on the magnification side of the aperture stop AS1 is a negative lens group. Therefore, it is preferable that the zoom group z5 or z6 most toward the magnification side (see FIGS. 3 and 4) has a negative focal length.

It is preferable that a negative meniscus shaped aspheric lens, which generates a large coma aberration, is included toward the magnification side of the front group in the first refractive system R1 to complement a coma aberration generated in the second refractive system R2. In Example 1 of the present disclosure, the lens L16 is such a negative meniscus shaped aspheric lens. In Example 1 of the present disclosure, a most magnification side group in the front group comprises lenses L18 and L19, and this group is a fixed group that does not move during magnification change. Since such a fixed group is usable as a reference to measure a misalignment during production of the image formation optical system 100, this is a preferable configuration.

The first optical system OP1 includes a stop unit comprising a first field stop FS1, a first aperture stop AS1 and a second field stop FS2. In the zoom group configuration illustrated in FIG. 4, this stop unit is located outside the first zoom group (a zoom group having a largest number of lenses: in this example, zoom group z2), and configured to move in an integrated manner with the zoom group z2. A stop, such as the first aperture stop AS1, is heated by light, which is cut. However, if the aforementioned configuration is adopted, it is possible to prevent a damage on the optical performance caused by transfer of heat from the stop to the lenses in the zoom group z2.

In Example 1 of the present disclosure, some lens groups arranged toward the reduction side of the first aperture stop AS1 are moved to change magnification. In such a case, it is desirable to design so that the height of the axial marginal rays does not change between the wide-angle side and the telephoto side. Then, it is possible to make the image formation optical system 100 the F number of which does not change between the wide-angle side and the telephoto side. Therefore, a preferable use state is achievable.

The lenses L2, L11, L16 and L19 included in the first refractive system R1 are negative meniscus lenses. It is preferable that the negative meniscus lenses have a large ratio of thickness of a center to an edge of the lens to reduce a reflective ghost between surfaces caused by high brightness light.

In Example 1 of the present disclosure, a part of the focus group f2 and the focus group f3 are arranged in the second refractive system R2. Since the movement amount of the focus group is very small compared with that of the zoom group, it is preferable to arrange the focus group in the second refractive system R2 in this manner. It is preferable that the focus group is a floating focus group, in which a plurality of groups are moved, to make the focus group durable for a fluctuation in distance in an ultra short focus. It is preferable that one group in the floating focus, for example, the focus group f1 is arranged as a part of the first refractive system R1 that does not move during zooming because the mechanical mechanism is simplified and a space for movement is saved.

It is preferable that one of the focus groups, such as the focus group f2 in Example 1 of the present disclosure, has the intermediate image Im1 therein. The intermediate image Im1 is an image formation point. If dust adheres to a lens surface in the vicinity of this image formation point, an image is influenced by a shadow and the like. Therefore, it is preferable that the focus group having the intermediate image Im1 therein is formed in an integrated manner because the clean state of the inside of the focus group in assembly is maintainable. In the focus group f2 having the intermediate image Im1 therein, it is preferable that the positive meniscus lenses L18 and L20 are arranged to face each other to complement aberrations. Further, it is preferable that the negative lens L19 is arranged to reduce aberrations.

Since a most magnification side group in the second refractive system R2 has a large misalignment sensitivity with the concave surface mirror 6, it is preferable that the group is a fixed group comprising the lenses L24 through L27. From this aspect, it is preferable that the most magnification side focus group f3 is arranged next to and toward the reduction side of the second aperture stop AS2, which is the second stop. Since the most magnification side focus group f3 needs an image formation function, the group needs to be a positive group. Therefore, it is necessary that the focus group f3 comprises a positive single lens, or a plurality of positive lenses L21 and L23, as in Example 1 of the present disclosure. It is preferable that the focus group f3 includes a negative lens L22 and has a positive negative positive configuration to reduce aberrations during focusing.

It is preferable that an offset prism 5 for shifting an optical axis is included between the second refractive system R2 and the second optical system OP2. Accordingly, it is possible to make a projection screen close to the lens. The prism 5 includes two reflective surfaces. It is preferable to determine the inclination angles of the reflective surfaces so that all the bundles of rays are totally reflected to increase the transfer efficiency of light.

Next, aberrations of the image formation optical system 100 in Example 1 of the present disclosure will be described. FIGS. 9A and 9B illustrate longitudinal aberrations of the image formation optical system 100 in Example 1. FIGS. 9A and 9B illustrate the result of measuring the longitudinal aberrations when the image formation optical system 100 is at a wide-angle end and at a telephoto end, respectively (unit of mm). Each diagram illustrates a spherical aberration, an astigmatism and a distortion aberration (distortion) of the image formation optical system 100 in Example 1 of the present disclosure in this order from the left side. The spherical aberration was calculated for light having the wavelengths of 620.00 nm, 550.00 nm and 450.00 nm. The result of measurement for each wavelength is differentiated by using different line types. Regarding the astigmatism, light having the wavelength of 550.00 nm was used for a tangential plane and for a sagittal plane. The result of the former is indicated by T, and the result of the latter is indicated by S. The distortion was calculated for light having the wavelength of 550.00 nm. As illustrated in FIGS. 9A and 9B, the spherical aberration, astigmatism and distortion are excellently corrected.

FIGS. 10 and 11 illustrate lateral aberrations of the image formation optical system 100 in Example 1. FIGS. 10 and 11 illustrate the result of measuring the lateral aberrations when the image formation optical system 100 is at a wide-angle end and at a telephoto end, respectively (unit of mm). For each case, projection was performed in a closest focusing state, and the lateral aberration was measured at five points on a projection screen in a tangential direction (Y-FAN) and in a sagittal direction (X-FAN). The five points are one point where the relative field height is the highest (this is regarded as a point where relative field height=1.00) and four points with relative field heights (in Example 1, 0.79, 0.53, 0.26 and 0.16), and the result of measurement at these points are illustrated from the top to the bottom in FIGS. 10 and 11. The highest field height (highest image height) for each example is as follows: Example 1: 19.5 mm, Example 2: 19.5 mm, Example 3: 19.5 mm, Example 4: 11.2 mm and Example 5: 22.0 mm. Since the lateral aberration is symmetrical with respect to a center in an aberration in the sagittal direction, only one side is illustrated for the sagittal direction. The measurement of the lateral aberration was performed for light having the wavelengths of 620.0 nm, 550.0 nm and 460.0 nm. The result of measurement for each wavelength is differentiated by using different line types. As illustrated in FIGS. 10 and 11, the lateral aberration is excellently suppressed when the image formation optical system 100 is at wide-angle end and also at a telephoto end.

Next, Example 2 related to another embodiment of the present disclosure will be described. FIG. 12 is a cross-section of an image formation optical system 200, which is Example 2 of the present disclosure, illustrating its configuration together with major bundles of rays. FIG. 12 illustrates the image formation optical system 200 in a wide-angle end state. In FIG. 13, the bundles of rays are excluded, and the image formation optical system 200 in a wide-angle end state is illustrated. In FIGS. 12 and 13, the same reference numerals are used for similar elements to those already described in FIGS. 1 through 4, and explanations are omitted unless otherwise necessary (hereinafter, similar). The manner of illustration in FIGS. 12 and 13 is similar also in FIGS. 18 and 19, which will be described later.

This image formation optical system 200 is also applied to a projection apparatus that magnifies and projects an image displayed on an image display surface 1. Basically, the image formation optical system 200 comprises a first optical system OP1 and a second optical system OP2, arranged toward the magnification side of the first optical system OP1. The first optical system OP1 includes a first refractive system R1 and a second refractive system R2. Next, elements, such as lenses, constituting the first refractive system R1 and the second refractive system R2 in Example 2 of the present disclosure will be specifically described. The first refractive system R1 comprises a biconvex lens L1, a biconvex lens L2, a negative meniscus lens L3, a negative meniscus lens L4, a biconvex lens L5, a negative meniscus lens L6, a positive meniscus lens L7, a negative meniscus lens L8, a biconvex lens L9, a first field stop FS1, a first aperture stop AS1, a second field stop FS2, a biconvex lens L10, a negative meniscus lens L11, a biconvex lens L12, a biconcave lens L13, a biconvex lens L14, a negative meniscus lens L15, a positive meniscus lens L16, a positive meniscus lens L17 and a negative meniscus lens L18 arranged along the optical axis Z in this order from the reduction side toward the magnification side. The first intermediate image Im1 is formed by the first refractive system R1.

The second refractive system R2 comprises a positive meniscus lens L19, a biconvex lens L20, a second aperture stop AS2, a biconvex lens L21, a negative meniscus lens L22, a biconvex lens L23 and biconvex lens L24 arranged along the optical axis Z in this order from the reduction side toward the magnification side. The first intermediate image Im1 is further formed as a second intermediate image Im2 by the second refractive system R2. The second intermediate image Im2 is reflected and magnified by the second optical system OP2, and projected onto a screen, which is not illustrated, as a magnified projection image.

FIG. 14 shows detailed data about the elements in Example 2 of the present disclosure. FIG. 15 shows aspheric data about aspheric surfaces in the elements. In Example 2 of the present disclosure, aspheric shapes of all the aspheric surfaces are expressed by the following formula by applying the aspheric coefficients in FIG. 15:

$$X=(1/Rdy)R^2/[1+\{1-(1+K)(1/Rdy)^2R^2\}^{1/2}]+A3R^3+A4R^4+A6R^6+A8R^8+A10R^{10}+A12R^{12}.$$

Regarding Example 2 of the present disclosure and Example 3, which will be described later, explanations particularly on the configuration of a zoom group and a focus group are omitted, but well-known configuration is appropriately adoptable.

FIG. 42 illustrates a more detailed configuration in Example 2 of the present disclosure in a similar manner to Example 1. FIGS. 43, 44 and 45 show, as lens data in the vicinity of a stop in Example 2 of the present disclosure, data about first adjacent lenses and second adjacent lenses in groups 1 and 2 for aperture stop AS1 and first adjacent lenses and second adjacent lenses in groups 3 and 4 for aperture stop AS2. In Example 2 of the present disclosure, the second adjacent lens and the first adjacent lens in the group 1, the first adjacent lens and the second adjacent lens in the group 2, the second adjacent lens and the first adjacent lens in the group 3 and the first adjacent lens and the second adjacent lens in the group 4 are specifically lenses L8, L9, L10, L11, L19, L20, L21 and L23 in this order from the reduction side toward the magnification side. FIG. 43 shows the glass material of each lens. FIG. 44 shows the value of the internal transmittance τ420 of the glass material. FIG. 45 shows the relative temperature coefficient dn/dt of the refractive index of the glass material. As shown in FIG. 44 and FIG. 45, all the lenses included in the groups 1 through 4 in Example 2 satisfy Formula (25) or Formula (26), and Formula (28).

FIG. 46 shows the abnormal dispersibility θg,F of major lenses in Example 2 of the present disclosure. In Example 2 of the present disclosure, two lenses of the lenses L2 and L5 are listed as positive lenses arranged toward the reduction side of the aperture stop AS1, which is the first stop, and five lenses of lenses L14, L16, L17, L23 and L24 are listed as positive lenses arranged toward the magnification side of the aperture stop AS1, and the abnormal dispersibility θg,F of these lenses are shown. As shown in FIG. 46, the image formation optical system 200 in Example 2 satisfies Formula (29) and (30).

Figure 16:
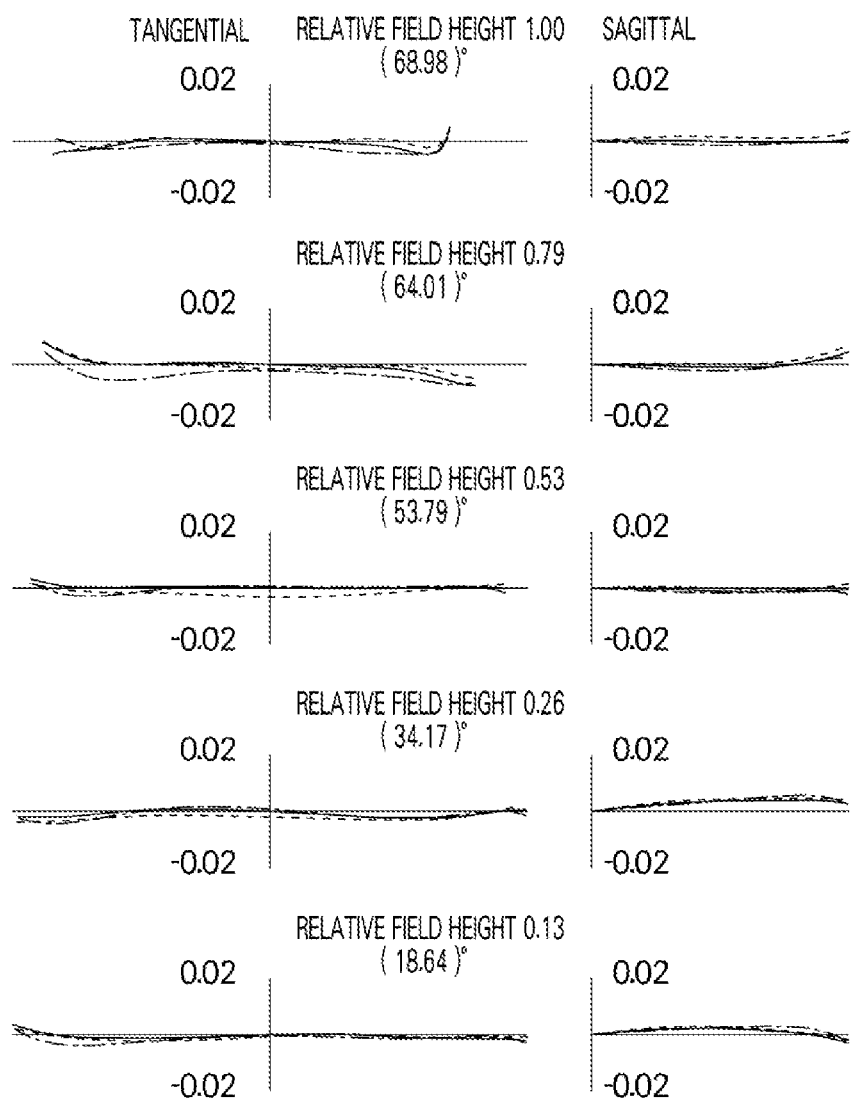
FIG. 16 graphs showing a lateral aberration of the image formation optical system in Example 2.

Next, aberrations of the image formation optical system 200 in Example 2 of the present disclosure will be described. FIG. 16 illustrates lateral aberrations when the image formation optical system 200 in Example 2 of the present disclosure is at a wide-angle end. The manner of illustrating the lateral aberrations in FIG. 16 is similar to the manner of illustration in FIGS. 10 and 11. As illustrated in FIG. 16, the lateral aberrations are excellently suppressed also in Example 2 of the present disclosure.

FIG. 17 illustrates a spherical aberration, an astigmatism and a distortion aberration (distortion) of the image formation optical system 200 in Example 2 of the present disclosure in this order from the left side. As illustrated in FIG. 17, the spherical aberration, astigmatism, distortion and lateral aberration are excellently corrected.

Next, Example 3 according to another embodiment of the present disclosure will be described. FIG. 18 is a cross-section of an image formation optical system 300, which is Example 3 of the present disclosure, illustrating its configuration together with major bundles of rays. FIG. 18 illustrates the image formation optical system 300 in a wide-angle end state. In FIG. 19, the bundles of rays are excluded, and the image formation optical system 300 in a wide-angle end state is illustrated.

This image formation optical system 300 is also applied to a projection apparatus that magnifies and projects an image displayed on an image display surface 1. Basically, the image formation optical system 300 comprises a first optical system OP1 and a second optical system OP2, arranged toward the magnification side of the first optical system OPT. The first optical system OP1 includes a first refractive system R1 and a second refractive system R2. Next, elements, such as lenses, constituting the first refractive system R1 and the second refractive system R2 in Example 3 of the present disclosure will be specifically described. The first refractive system R1 comprises a biconvex lens L1, a biconvex lens L2, a negative meniscus lens L3, a negative meniscus lens L4, a biconvex lens L5, a negative meniscus lens L6, a positive meniscus lens L7, a negative meniscus lens L8, a biconvex lens L9, a first field stop FS1, a first aperture stop AS1, a second field stop FS2, a biconvex lens L10, a negative meniscus lens L11, a biconvex lens L12, a biconcave lens L13, a biconvex lens L14, a negative meniscus lens L15, a positive meniscus lens L16, a positive meniscus lens L17 and a negative meniscus lens L18 arranged along the optical axis Z in this order from the reduction side toward the magnification side. The first intermediate image Im1 is formed by the first refractive system R1.

The second refractive system R2 comprises a positive meniscus lens L19, a biconvex lens L20, a second aperture stop AS2, a biconvex lens L21, a negative meniscus lens L22, a biconvex lens L23 and a biconvex lens L24 arranged along the optical axis Z in this order from the reduction side toward the magnification side. The first intermediate image Im1 is further formed as a second intermediate image Im2 by the second refractive system R2. The second intermediate image Im2 is reflected and magnified by the second optical system OP2, and projected onto a screen, which is not illustrated, as a magnified projection image.

FIG. 20 shows detailed data about the elements in Example 3 of the present disclosure. FIG. 21 shows aspheric data about aspheric surfaces in the elements. In Example 3 of the present disclosure, aspheric shapes of all the aspheric surfaces are expressed by the following formula by applying the aspheric coefficients in FIG. 21:

$$X=(1/Rdy)R^2/[1+\{1-(1+K)(1/Rdy)^2R^2\}^{1/2}]+A3R^3+A4R^4+A6R^6+A8R^8+A10R^{10}+A12R^{12}.$$

FIG. 42 illustrates a more detailed configuration in Example 3 of the present disclosure in a similar manner to Example 1. FIGS. 43, 44 and 45 show, as lens data in the vicinity of a stop in Example 3 of the present disclosure, data about first adjacent lenses and second adjacent lenses in groups 1 and 2 for aperture stop AS1 and first adjacent lenses and second adjacent lenses in groups 3 and 4 for aperture stop AS2. In Example 3 of the present disclosure, the second adjacent lens and the first adjacent lens in the group 1, the first adjacent lens and the second adjacent lens in the group 2, the second adjacent lens and the first adjacent lens in the group 3 and the first adjacent lens and the second adjacent lens in the group 4 are specifically lenses L8, L9, L10, L11, L19, L20, L21 and L23 in this order from the reduction side toward the magnification side. FIG. 43 shows the glass material of each lens. FIG. 44 shows the value of the internal transmittance τ420 of the glass material. FIG. 45 shows the relative temperature coefficient dn/dt of the refractive index of the glass material. As shown in FIG. 44 and FIG. 45, all the lenses included in the groups 1 through 4 in Example 3 satisfy Formula (25) or Formula (26), and Formula (28).

FIG. 46 shows the abnormal dispersibility θg,F of major lenses in Example 3 of the present disclosure. In Example 3 of the present disclosure, two lenses of the lenses L2 and L5 are listed as positive lenses arranged toward the reduction side of the aperture stop AS1, which is the first stop, and four lenses of lenses L14, L16, L23 and L24 are listed as positive lenses arranged toward the magnification side of the aperture stop AS1, and the abnormal dispersibility θg,F of these lenses are shown. As shown in FIG. 46, the image formation optical system 300 in Example 3 satisfies Formula (29) and (30).

Figure 22:
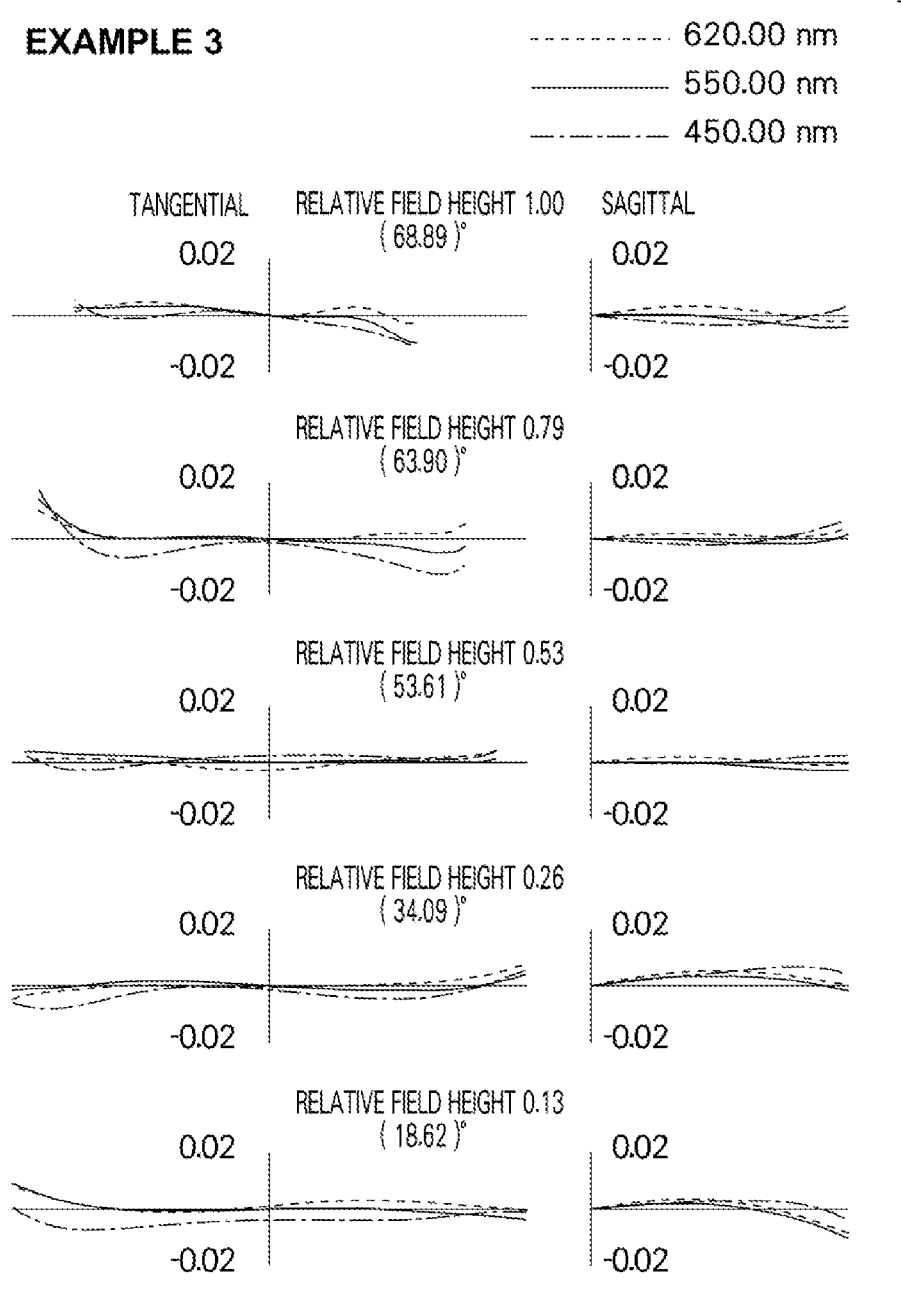
FIG. 22 graphs showing a lateral aberration of the image formation optical system in Example 3.

Next, aberrations of the image formation optical system 300 in Example 3 of the present disclosure will be described. FIG. 22 illustrates lateral aberrations when the image formation optical system 300 in Example 3 of the present disclosure is at a wide-angle end. The manner of illustrating the lateral aberrations in FIG. 22 is similar to the manner of illustration in FIGS. 10 and 11. As illustrated in FIG. 22, the lateral aberrations are excellently suppressed also in Example 3 of the present disclosure.

Figure 23:
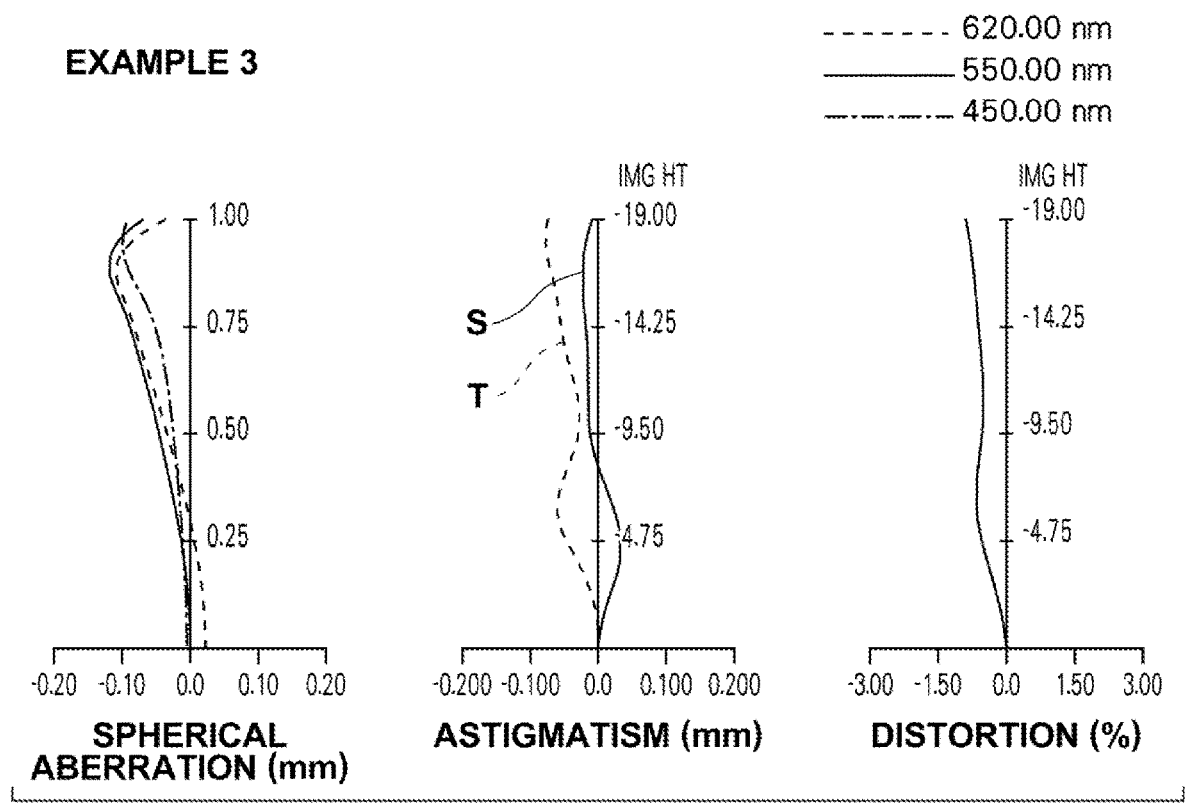
FIG. 23 graphs showing a spherical aberration (left), an astigmatism (center) and a distortion (right) of the image formation optical system in Example 3.

FIG. 23 illustrates a spherical aberration, an astigmatism and a distortion of the image formation optical system 300 in Example 3 of the present disclosure in this order from the left side. The method for measuring and the manner of illustrating these aberrations are similar to those in Example 2. As illustrated in FIG. 23, the spherical aberration, astigmatism, distortion and lateral aberration are excellently corrected also in Example 3 of the present disclosure.

Next, Example 4 according to another embodiment of the present disclosure will be described. FIG. 24 is a cross-section of an image formation optical system 400, which is Example 4 of the present disclosure, illustrating its configuration together with major bundles of rays. In FIG. 24, the image formation optical system 400 in a wide-angle end state is illustrated in the upper section, and the image formation optical system 400 in a telephoto end state is illustrated in the lower section. FIG. 25 illustrates the zoom groups z1 through z4 and the focus groups f1 through f4 when the image formation optical system 400 is in a wide-angle end state. Unlike the aforementioned examples, in which the image formation optical system is applied to a projection apparatus that reflects bundles of rays by using the concave surface mirror 6, the image formation optical system 400 is applied to a projection apparatus that projects bundles of rays emitted from the magnification side, i.e., from the second refractive system R2 side onto a screen without reflecting the bundles of rays before they reach the screen. This feature is similar also in the image formation optical system 500 in Example 5.

For the purpose of illustration, FIGS. 24 and 25 illustrate the reduction side on the right side and the magnification side on the left side in an opposite manner from those illustrated in Example 1 through 3. The reference numerals of the lens L1, lens L2 . . . and the reference numerals of the focus groups f1 through f4 and the zoom groups z1 through z4 in FIG. 25 increase from the magnification side toward the reduction side. However, the reference numerals of the aperture stops AS1 and AS2 and the field stop s FS1 through FS4, which are related to the essential part of the present disclosure, increase from the reduction side toward the magnification side. Specifically, regarding the aperture stops AS1, AS2, the aperture stop on the reduction side is the first stop (first aperture stop AS1) and the aperture stop on the magnification side is the second stop (second aperture stop AS2). The manner of illustrating FIGS. 24 and 25 is similarly applicable to FIGS. 33 and 34, illustrating the image formation optical system 500 in Example 5.

Like the image formation optical system 500, which will be described later, the image formation optical system 400 comprises a first optical system OP1 for forming, on a screen, an image formed on an image display element 12 on the reduction side end surface of a color combination prism 11, such as a dichroic prism and a TIR prism. The first optical system OP1 includes the first refractive system R1 and the second refractive system R2. Next, elements, such as lenses, constituting the first refractive system R1 and the second refractive system R2 in Example 4 of the present disclosure will be described.

As illustrated in FIGS. 24 and 25, the first refractive system R1 comprise a biconvex lens L26, a positive meniscus lens L25, a negative meniscus lens L24, a biconvex lens L23, a biconcave lens L22, a biconvex lens L21, a negative meniscus lens L20, a negative meniscus lens L19, a positive meniscus lens L18, a first field stop FS1, a first aperture stop AS1, a second field stop FS2, a biconvex lens L17, a negative meniscus lens L16, a biconvex lens L15, a biconcave lens L14, a negative meniscus lens L13, a biconcave lens L12 and a biconvex lens L11 arranged along the optical axis Z in this order from the reduction side toward the magnification side.

The second refractive system R2 arranged toward the magnification side of the first refractive system R1 with the intermediate image Im, formed by the first refractive system R1, between the two refractive systems comprises a biconvex lens L10, a negative meniscus lens L9, a biconvex lens L8, a negative meniscus lens L7, a biconvex lens L6, a biconvex lens L5, a third field stop FS3, a second aperture stop AS2, a fourth field stop FS4, a biconvex lens L4, a biconcave lens L3, a negative meniscus lens L2 and a negative meniscus lens L1 arranged along the optical axis Z in this order from the reduction side toward the magnification side. The second refractive system R2 further forms an image of the intermediate image Im on a screen, which is not illustrated.

FIG. 26 shows detailed data about the elements in Example 4 of the present disclosure. The manner of illustrating the elements in FIG. 26 is basically similar to FIGS. 5, 14 and 20. In FIG. 26, "Im", "PR11" and "IS12" represent the intermediate image Im, the prism 11 and the image display element 12, respectively. FIG. 27 shows aspheric data about aspheric surfaces in the elements. In Example 4 of the present disclosure, aspheric shapes of all the aspheric surfaces are expressed by the following formula by applying the aspheric coefficients in FIG. 27:

$$X=(1/Rdy)R^2/[1+\{1-(1+K)(1/Rdy)^2R^2\}^{1/2}]+A4R^4+A6R^6+A8R^8+A10R^{10}+A12R^{12}+A14R^{14}+A16R^{16}.$$

Next, with reference to FIG. 28, the moving amounts of the zoom group and the focus group will be described. In FIG. 28, the column of "s+numerical value" shows a surface distance (unit of mm) between surfaces shown in FIG. 26, and the numerical value represents the surface number (No.). For example, s2 is a surface distance from a surface having a surface number No.=2, i.e., a reduction-side lens surface of the lens L1 to the next surface having a surface number No.=3. The term "ZOOM" written under the box of "s+numerical value" represents that a surface distance in the column changes by zooming, and the term "FOCUS" represents that a surface distance in the column changes by focusing. The column of Z shows six states of different lens groups depending on zooming or focusing. The states 1 through 3 are states of focusing (focus) on a closest screen as possible. The states 4 through 6 are states of focusing on a farthest screen as possible. The states 1 and 4 are wide-angle end states set by zooming. The states 2 and 5 are intermediate states between the wide-angle end and the telephoto end. The states 3 and 6 are the telephoto end states.

FIG. 42 illustrates a detailed configuration in Example 4 of the present disclosure in a similar manner to Example 1. FIGS. 43, 44 and 45 show, as lens data in the vicinity of a stop in Example 4 of the present disclosure, data about first adjacent lenses and second adjacent lenses in groups 1 and 2 for aperture stop AS1 and first adjacent lenses and second adjacent lenses in groups 3 and 4 for aperture stop AS2. In Example 4 of the present disclosure, the second adjacent lens and the first adjacent lens in the group 1, the first adjacent lens and the second adjacent lens in the group 2, the second adjacent lens and the first adjacent lens in the group 3 and the first adjacent lens and the second adjacent lens in the group 4 are specifically lenses L19, L18, L17, L16, L6, L5, L4 and L3 in this order from the reduction side toward the magnification side.

Each data shown in FIG. 42 are data when the lenses L7, L8, L9 and L10 in FIG. 47A are regarded as the lenses L19, L18, L17 and L16 in Example 4 of the present disclosure, and when the lenses L22, L23, L24 and L25 in FIG. 47B are regarded as the lenses L6, L5, L4 and L3 in Example 4 of the present disclosure. FIG. 43 shows the glass material of the lenses 19 and 18, as the second adjacent lens and the first adjacent lens in the group 1, the lenses L17 and L16, as the first adjacent lens and the second adjacent lens in the group 2, the lenses L6 and L5, as the second adjacent lens and the first adjacent lens in the group 3, and the lenses L4 and L3, as the first adjacent lens and the second adjacent lens in the group 4. FIG. 44 shows the value of the internal transmittance t420 of the glass material. FIG. 45 shows the relative temperature coefficient dn/dt of the refractive index of the glass material. As shown in FIG. 44 and FIG. 45, all the lenses included in the groups 1 through 4 in Example 4 of the present disclosure satisfy Formula (25) or Formula (26), and Formula (28).

FIG. 46 shows the abnormal dispersibility θg,F of major lenses in Example 4 of the present disclosure. In Example 4 of the present disclosure, four lenses of the lenses L26, L25, L23 and L21 are listed as positive lenses arranged toward the reduction side of the aperture stop AS1, which is the first stop, and two lenses of lenses L11 and L10 are listed as positive lenses arranged toward the magnification side of the aperture stop AS1, and the abnormal dispersibility θg,F of these lenses are shown. As shown in FIG. 46, the image formation optical system 400 in Example 4 satisfies Formula (29) and (30).

Figure 29:
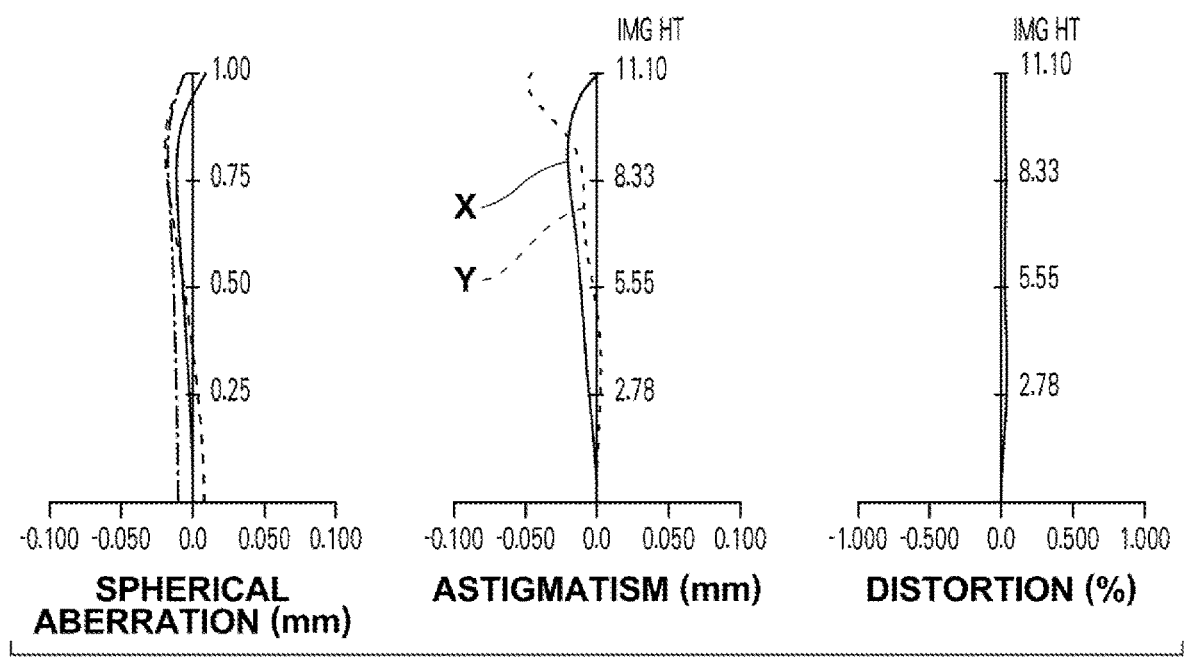
FIG. 29 graphs showing a spherical aberration (left), an astigmatism (center) and a distortion (right) when the image formation optical system in Example 4 is in a wide-angle end state.
Figure 30:
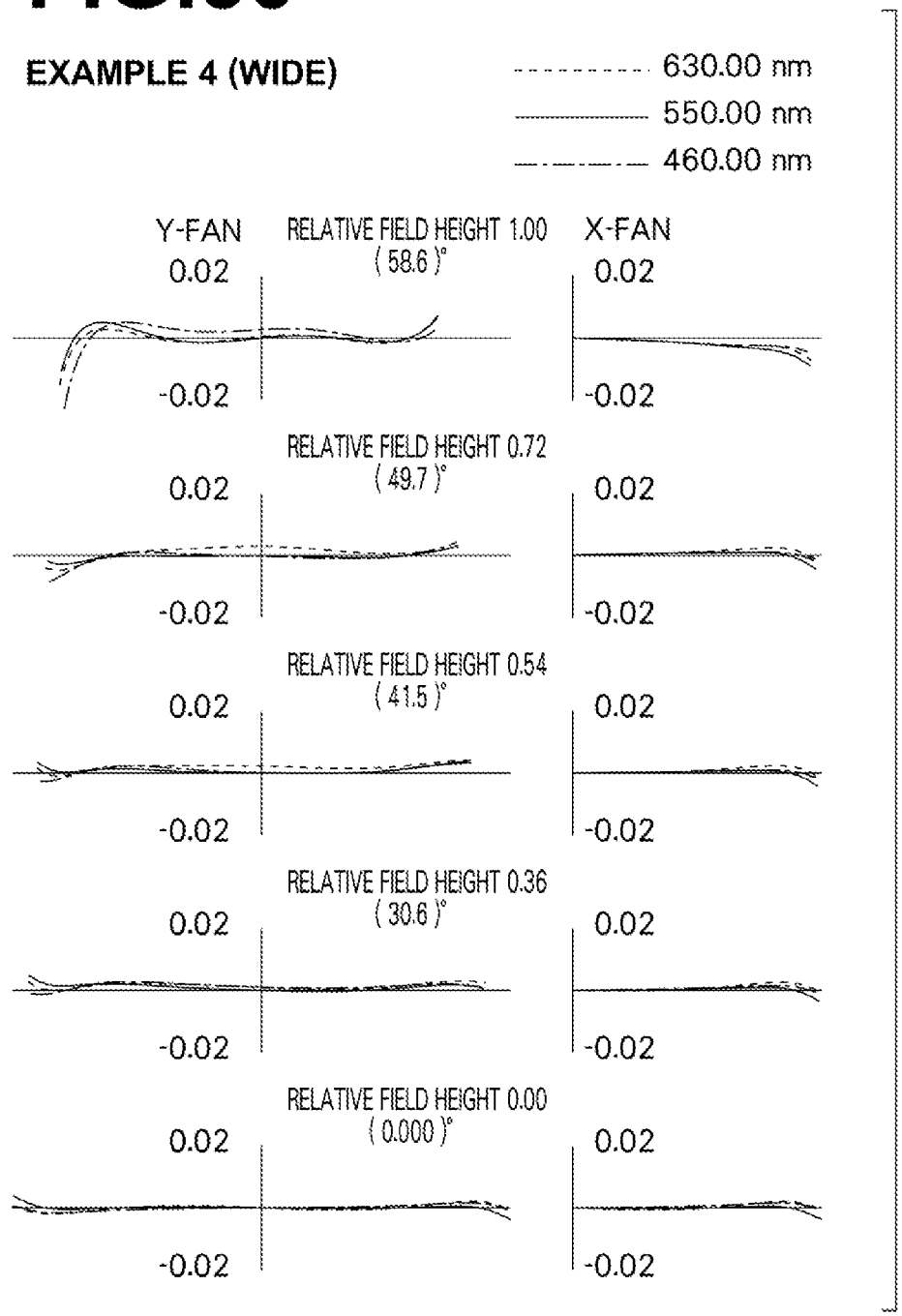
FIG. 30 graphs showing a lateral aberration of the image formation optical system in Example 4 in a wide-angle end state.

Next, aberrations of the image formation optical system 400 in Example 4 of the present disclosure will be described. FIG. 29 illustrates a spherical aberration, an astigmatism and a distortion in this order from the left side when the image formation optical system 400 in Example 4 of the present disclosure is at a wide-angle end. FIG. 30 illustrates lateral aberrations when the image formation optical system 400 is at a wide-angle end. As illustrated in FIGS. 29 and 30, the spherical aberration, astigmatism, distortion and lateral aberration are excellently corrected.

Figure 31:
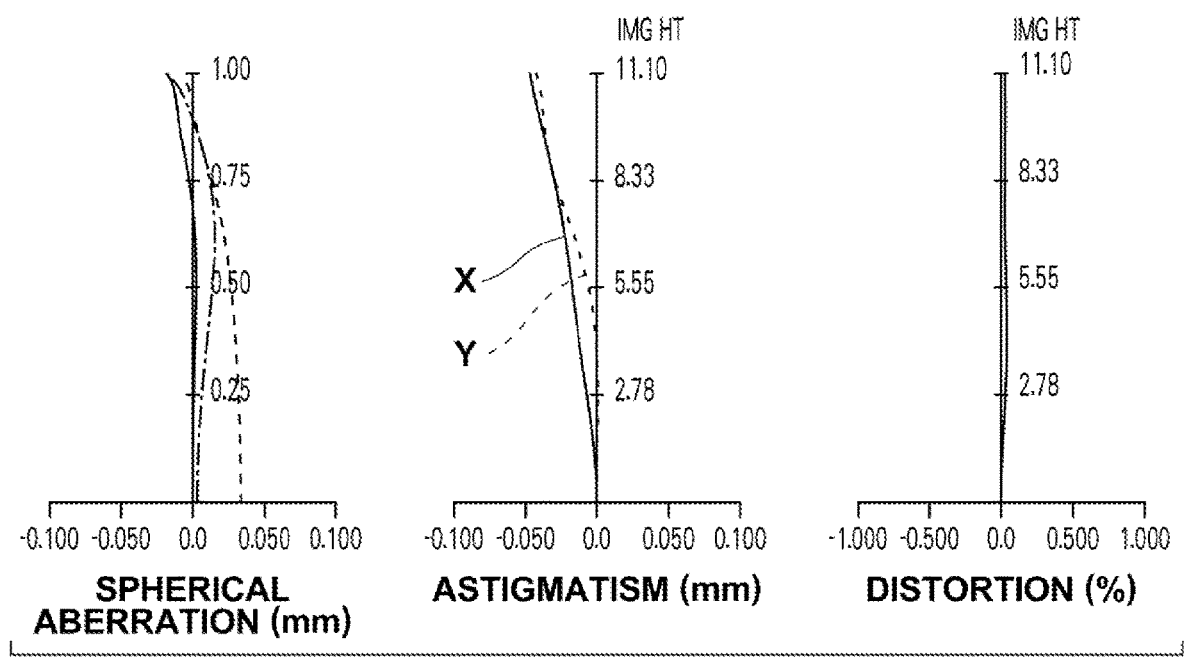
FIG. 31 graphs showing a spherical aberration (left), an astigmatism (center) and a distortion (right) when the image formation optical system in Example 4 is in a telephoto end state.
Figure 32:
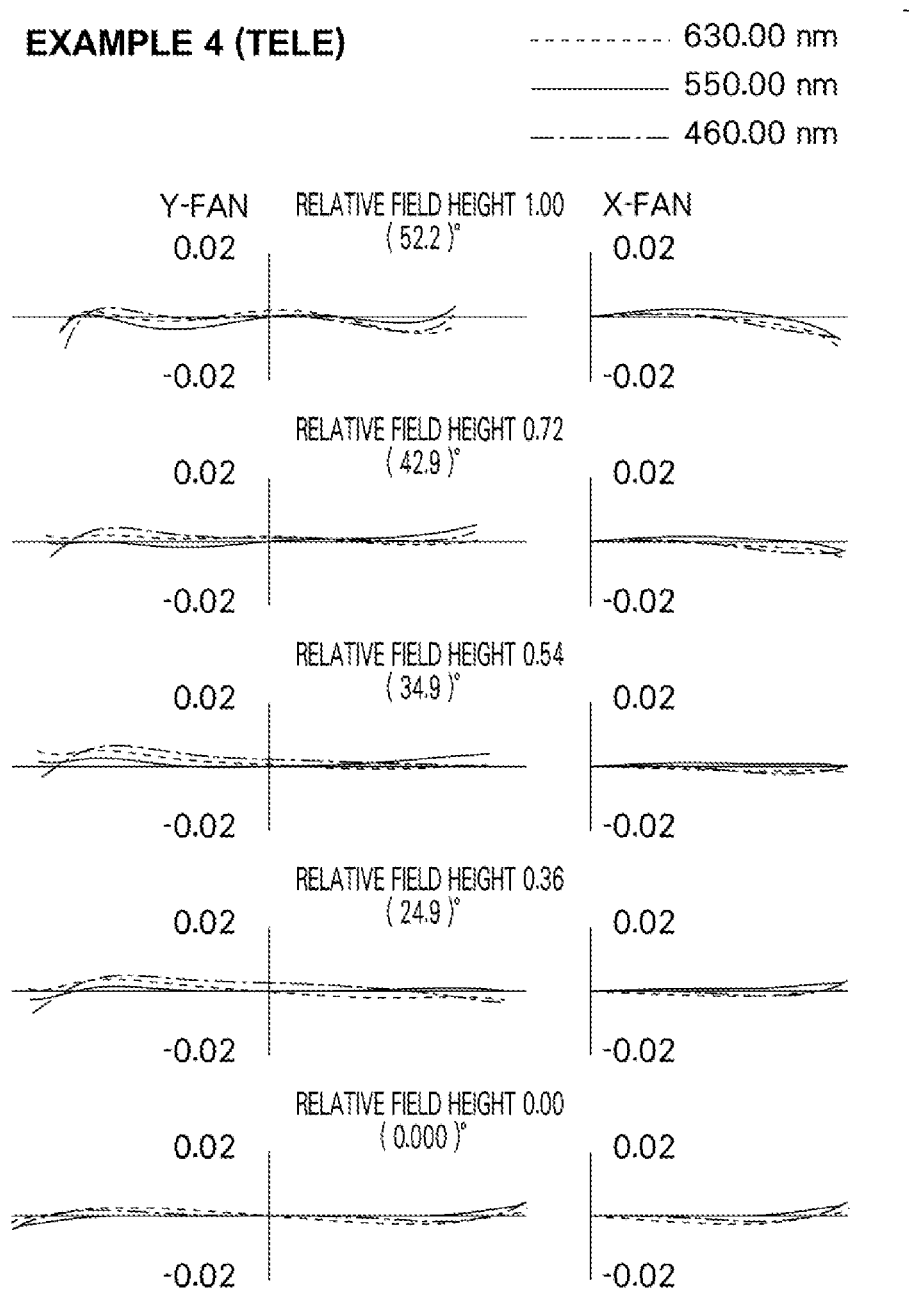
FIG. 32 graphs showing a lateral aberration of the image formation optical system in Example 4 in a telephoto end state.

FIG. 31 illustrates a spherical aberration, an astigmatism and a distortion when the image formation optical system 400 in Example 4 of the present disclosure is at a telephoto end. FIG. 32 illustrates lateral aberrations when the image formation optical system 400 is at a telephoto end. As illustrated in FIGS. 31 and 32, the spherical aberration, astigmatism, distortion and lateral aberration are excellently corrected.

Next, Example 5 according to another embodiment of the present disclosure will be described. FIG. 33 is a cross-section of an image formation optical system 500, which is Example 5 of the present disclosure, illustrating its configuration together with major bundles of rays. In FIG. 33, the image formation optical system 500 in a wide-angle end state is illustrated in the upper section, and the image formation optical system 500 in a telephoto end state is illustrated in the lower section. FIG. 34 illustrates the zoom groups z1 through z4 and the focus groups f1 through f when the image formation optical system 500 is in a wide-angle end state.

The image formation optical system 500 is also applied to a projection apparatus that forms and projects an image onto a screen without reflecting bundles of rays emitted from the second refractive system R2 before they reach the screen. Basically, the image formation optical system 500 comprises the first optical system OP1 for forming an image. The first optical system OP1 includes the first refractive system R1 and the second refractive system R2. Next, the elements, such as lenses, constituting the first refractive system R1 and the second refractive system R2 in Example 5 of the present disclosure will be described.

As illustrated in FIGS. 33 and 34, the first refractive system R1 comprises a biconvex lens L23, a positive meniscus lens L22, a negative meniscus lens L21, a biconvex lens L20, a biconcave lens L19, a biconvex lens L18, a negative meniscus lens L17, a first field stop FS1, a first aperture stop AS1, a second field stop FS2, a biconvex lens L16, a third field stop FS3, a biconvex lens L15, a biconvex lens L14, a biconcave lens L13, a negative meniscus lens L12, a biconcave lens L11 and a positive meniscus lens L10 arranged along the optical axis Z in this order from the reduction side toward the magnification side.

The second refractive system R2 arranged toward the magnification side of the first refractive system R1 with the intermediate image Im, formed by the first refractive system R1, between the two refractive systems comprises a biconvex lens L9, a biconcave lens L8, a biconvex lens L7, a negative meniscus lens L6, a biconvex lens L5, a fourth field stop FS4, a second aperture stop AS2, a fifth field stop FS5, a biconvex lens L4, a biconcave lens L3, a negative meniscus lens L2 and a negative meniscus lens L1 arranged along the optical axis Z in this order from the reduction side toward the magnification side. The second refractive system R2 further forms an image of the intermediate image Im on a screen, which is not illustrated.

FIG. 35 shows detailed data about the elements in Example 5 of the present disclosure. The manner of illustrating the elements in FIG. 35 is basically similar to FIGS. 5, 14 and 20. In FIG. 26, "Im", "PR11" and "IS12" represent the intermediate image Im, the prism 11 and the image display element 12, respectively. FIG. 36 shows aspheric data about aspheric surfaces in the elements. In Example 5 of the present disclosure, aspheric shapes of all the aspheric surfaces are expressed by the following formula by applying the aspheric coefficients in FIG. 36:

$$X=(1/Rdy)R^2/[1+\{1-(1+K)(1/Rdy)^2R^2\}^{1/2}]+A4R^4+A6R^6+A8R^8+A10R^{10}+A12R^{12}+A14R^{14}+A16R^{16}.$$

Next, with reference to FIG. 37, the moving amounts of the zoom group and the focus group will be described. In FIG. 37, the column of "s+numerical value" shows a surface distance (unit of mm) between surfaces shown in FIG. 35, and the numerical value represents the surface number (No.). For example, s2 is a surface distance from a surface having a surface number No.=2, i.e., a reduction-side lens surface of the lens L1 to the next surface having a surface number No.=3. The term "ZOOM" written under the box of "s+numerical value" represents that a surface distance in the column changes by zooming, and the term "FOCUS" represents that a surface distance in the column changes by focusing. The column of Z shows six states of different lens groups depending on zooming or focusing. The states 1 through 3 are states of focusing (focus) on a closest screen as possible. The states 4 through 6 are states of focusing on a farthest screen as possible. The states 1 and 4 are wide-angle end states set by zooming. The states 2 and 5 are intermediate states between the wide-angle end and the telephoto end. The states 3 and 6 are the telephoto end states.

FIG. 42 illustrates a detailed configuration in Example 5 of the present disclosure in a similar manner to Example 1. FIGS. 43, 44 and 45 show, as lens data in the vicinity of a stop in Example 5 of the present disclosure, data about first adjacent lenses and second adjacent lenses in groups 1 and 2 for aperture stop AS1 and first adjacent lenses and second adjacent lenses in groups 3 and 4 for aperture stop AS2. In Example 5 of the present disclosure, the second adjacent lens and the first adjacent lens in the group 1, the first adjacent lens and the second adjacent lens in the group 2, the second adjacent lens and the first adjacent lens in the group 3 and the first adjacent lens and the second adjacent lens in the group 4 are specifically lenses L18, L17, L16, L15, L6, L5, L4 and L3 in this order from the reduction side toward the magnification side.

Specifically, each data shown in FIG. 42 are data when the lenses L7, L8, L9 and L10 in FIG. 47A are regarded as the lenses L18, L17, L16 and L15 in Example 5 of the present disclosure, and when the lenses L22, L23, L24 and L25 in FIG. 47B are regarded as the lenses L6, L5, L4 and L3 in Example 5 of the present disclosure. FIG. 43 shows the glass material of the lenses 18 and 17, as the second adjacent lens and the first adjacent lens in the group 1, the lenses L16 and L15, as the first adjacent lens and the second adjacent lens in the group 2, the lenses L6 and L5, as the second adjacent lens and the first adjacent lens in the group 3, and the lenses L4 and L3, as the first adjacent lens and the second adjacent lens in the group 4. FIG. 44 shows the value of the internal transmittance 1420 of the glass material. FIG. 45 shows the relative temperature coefficient dn/dt of the refractive index of the glass material. As shown in FIG. 44 and FIG. 45, all the lenses included in the groups 1 through 4 in Example 5 of the present disclosure satisfy Formula (25) or Formula (26), and Formula (28).

FIG. 46 shows the abnormal dispersibility θg,F of major lenses in Example 5 of the present disclosure. In Example 5 of the present disclosure, four lenses of the lenses L23, L22, L20 and L18 are listed as positive lenses arranged toward the reduction side of the aperture stop AS1, which is the first stop, and two lenses of lenses L9 and L7 are listed as positive lenses arranged toward the magnification side of the aperture stop AS1, and the abnormal dispersibility θg,F of these lenses are shown. As shown in FIG. 46, the image formation optical system 500 in Example 5 of the present disclosure satisfies Formula (38) and (40).

Figure 38:
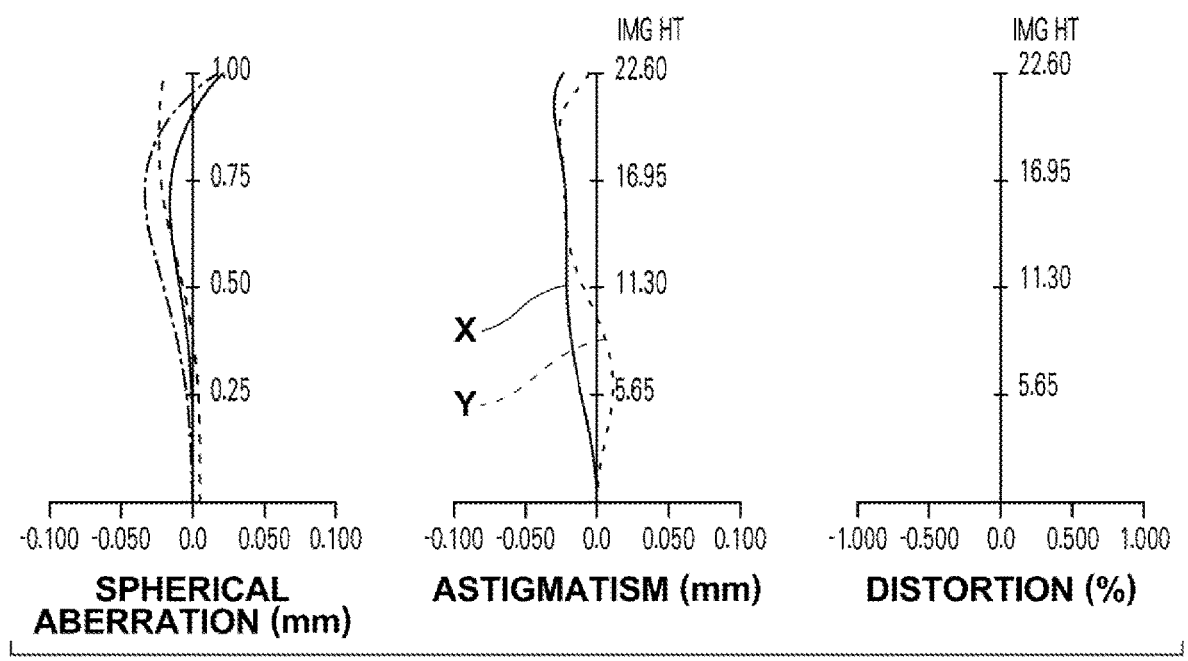
FIG. 38 graphs showing a spherical aberration (left), an astigmatism (center) and a distortion (right) when the image formation optical system in Example 5 is in a wide-angle end state.
Figure 39:
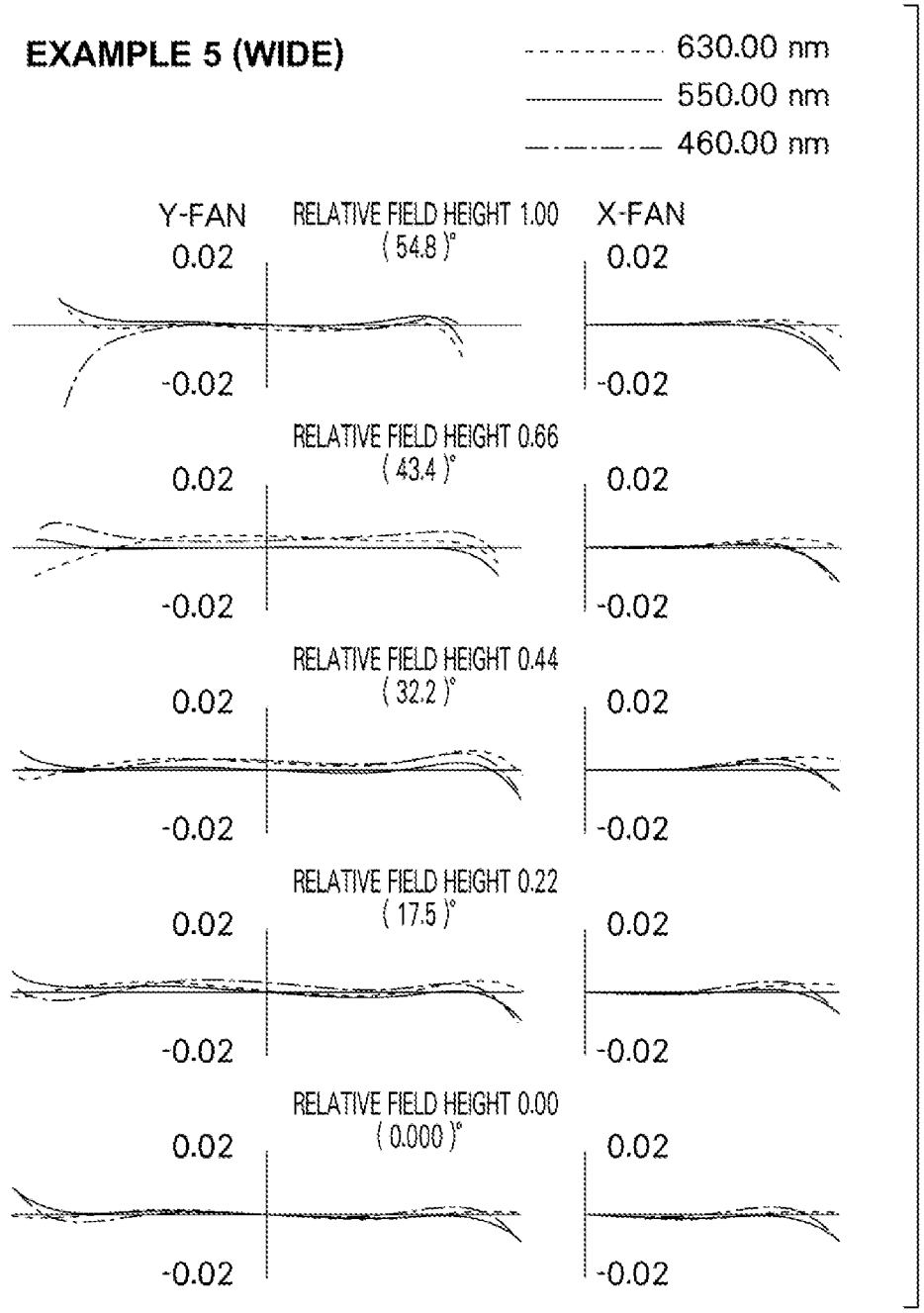
FIG. 39 graphs showing a lateral aberration of the image formation optical system in Example 5 in a wide-angle end state.

Next, aberrations of the image formation optical system 500 in Example 5 of the present disclosure will be described. FIG. 38 illustrates a spherical aberration, an astigmatism and a distortion in this order from the left side when the image formation optical system 500 in Example 5 of the present disclosure is at a wide-angle end. FIG. 39 illustrates lateral aberrations when the image formation optical system 400 is at a wide-angle end. As illustrated in FIGS. 38 and 39, the spherical aberration, astigmatism, distortion and lateral aberration are excellently corrected.

Figure 40:
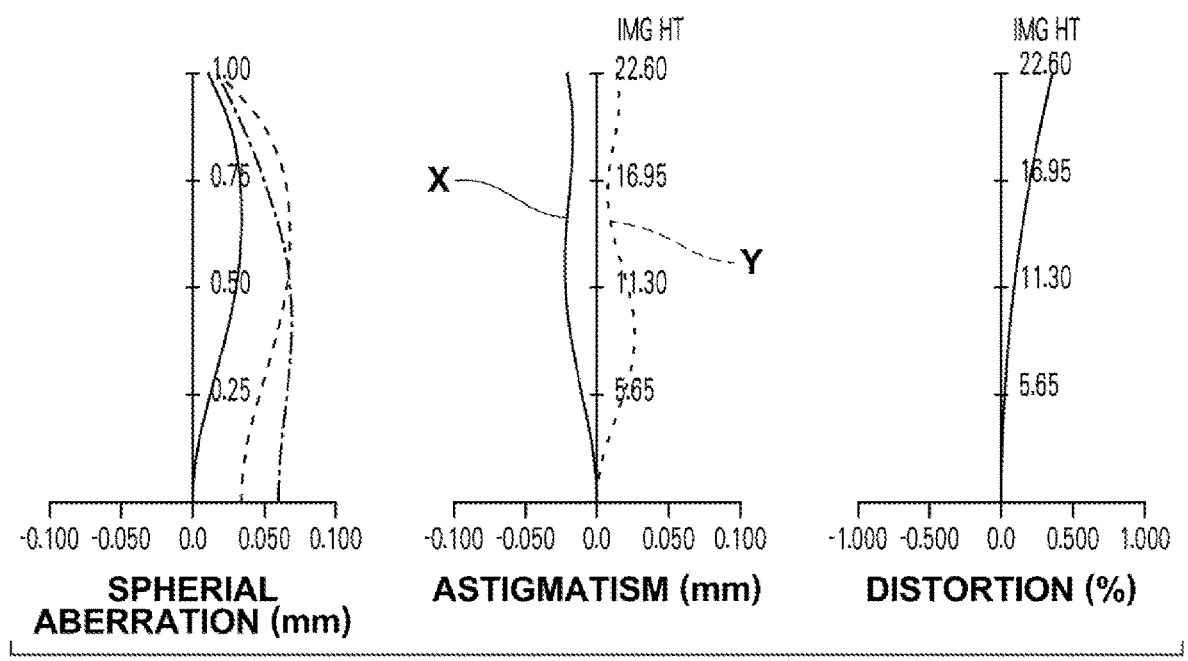
FIG. 40 graphs showing a spherical aberration (left), an astigmatism (center) and a distortion (right) when the image formation optical system in Example 5 is in a telephoto end state.
Figure 41:
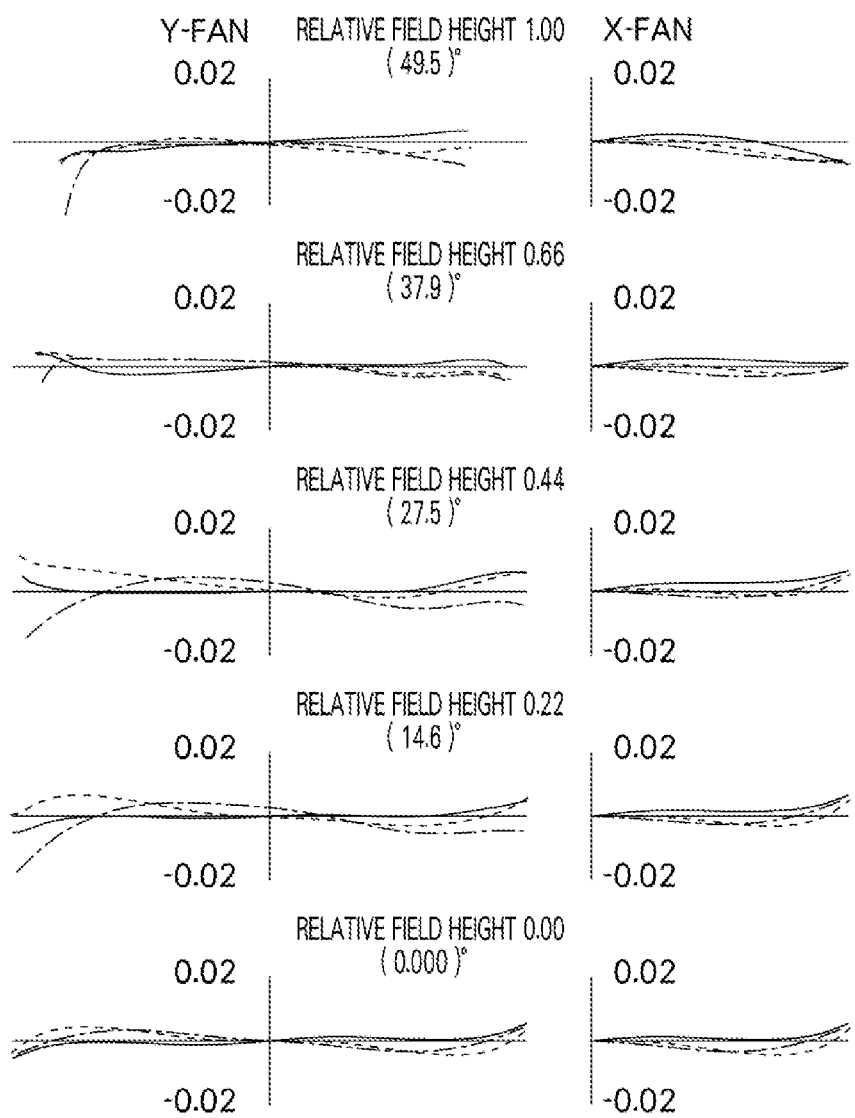
FIG. 41 graphs showing a lateral aberration of the image formation optical system in Example 5 in a telephoto end state.

FIG. 40 illustrates a spherical aberration, an astigmatism and a distortion from the left side when the image formation optical system 500 in Example 5 of the present disclosure is at a telephoto end. FIG. 41 illustrates lateral aberrations when the image formation optical system 500 is at a telephoto end. As illustrated in FIGS. 40 and 41, the spherical aberration, astigmatism, distortion and lateral aberration are excellently corrected.

So far, the present disclosure has been described by using the embodiments and examples. However, the image formation optical system of the present disclosure is not limited to the embodiments and examples, but the aspects of the present disclosure may be modified in various manners. For example, a radius of curvature, a surface distance, a refractive index and an Abbe's number of each lens may be appropriately modified. A projection apparatus to which the image formation optical system of the present disclosure is applied may be modified in a various manner, for example, about a used light bulb and an optical member used to separate or combine bundles of rays.

Figure 48:
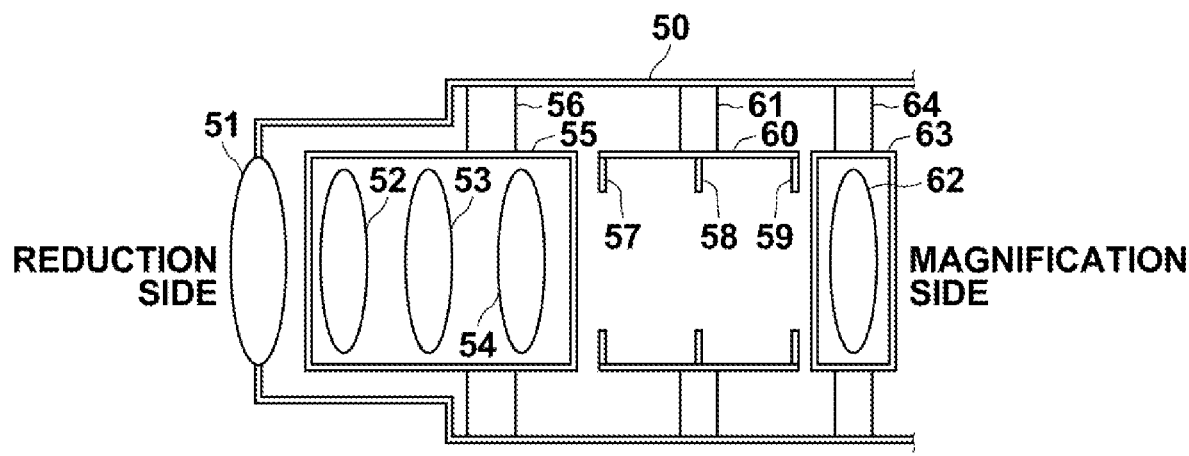
FIG. 48 a schematic diagram for explaining the configuration of the image formation optical system of the present disclosure in detail.

With reference to FIG. 48, which is a schematic diagram illustrating the configuration of an image formation optical system to which the present disclosure is applicable, various modifications will be described. In the schematic diagram of FIG. 48, a lens 51, as a fixed group, is arranged most toward the reduction side of a lens barrel 50, and a rear group frame member 55 holding lenses 52, 53 and 54 is engaged with the lens barrel 50 via an engagement part 56. A stop group frame member 60 holding a field stop 57, an aperture stop 58 and a field stop 59 is engaged with the lens barrel 50 via an engagement part 61. Further, a front group frame member 63 holding the most magnification side lens 62 is engaged with the lens barrel 50 via an engagement part 64.

When such a configuration is applied to a projection apparatus, a mechanical restriction is often present on the rear part of the image formation optical system in relation to an illumination system part and the like in the main body of the projection apparatus. Therefore, a suspension position (an engagement position with the lens barrel 50) of the rear group frame member 55 tends to be located on the front side with respect to the center of gravity of the group, in other words, toward the magnification side. If a stop is provided on the front side of the rear group frame member 55 by taking this tendency into consideration, the arrangement of weights is well balanced, and an inclination (tilt) of the rear group frame member 55 is suppressed, and a production yield of the image formation optical system is improved.

Further, a stop, such as an aperture stop 58, may become a heat generation member as it blocks light. Therefore, it is desirable that the stop group frame member 60 is arranged alone to be separated from the rear group frame member 55 and the front group frame member 63. Accordingly, it is possible to prevent heat transfer to lenses in a rear group and a front group, and to suppress a fluctuation in the focal length of lens by heat.

Lenses in a rear group generate heat by blocking a part of light. Generally, an abnormal dispersion glass is often used for positive lenses in the rear group. However, the temperature coefficient dn/dt of the refractive index of the abnormal dispersion glass has a large negative value. Therefore, when the temperature becomes high, the back focus of the rear group becomes long. In contrast, a glass material having a positive temperature coefficient dn/dt of the refractive index is used for the positive lens in the front group. Therefore, it is possible to correct a blur caused by the rear group by arranging the stop, which may become a heat generation member by blocking light, in the front group to transfer the heat of the stop to the lenses in the front group.

It is desirable that the rear group frame member 55 and the front group frame member 63 include a blur correction mechanism that is constituted of a member, such as a POM (polyacetal) pipe and a bimetal spring, which has a different expansion and contraction by temperature from metal.

It is preferable that an adjustment mechanism is provided in one of a plurality of lens groups that are movable as a focus group, in addition to a normal focus mechanism (as the product) used by a user of the image formation optical system. This adjustment mechanism makes it possible to perform fine adjustment in performance in the step of producing the image formation optical system, and it becomes possible to improve the production yield.

When the image formation optical system of the present disclosure is applied to a projection apparatus, it is preferable that a supplementary temperature correction mechanism is further provided by taking an influence of a fluctuation of room temperature on the whole projection apparatus into consideration.

So far, the embodiments and examples of the image formation optical system of the present disclosure applied to a projection apparatus have been described, but the image formation optical system of the present disclosure is also applicable to an imaging apparatus. Specifically, it is possible to form a reduced image on an imaging element by arranging the imaging element at a position where the image display element is placed in each of the examples, and by causing light to enter the image formation optical system of the present disclosure from the magnification side.

Explanation of the Reference Numerals

1 image display surface
2, 12 image display element
3, 11 prism
4, 5 glass block
6 concave surface mirror
100, 200, 300, 400, 500 image formation optical system
AS1 first aperture stop
AS2 second aperture stop
FS1 through FS5 field stop
IM intermediate image
IM1 first intermediate image
IM2 second intermediate image
L1 through L27 lenses
OP1 first optical system
OP2 second optical system
R1 first refractive system
R2 second refractive system
Z optical axis
f1 through f4 focus groups
z1 through z6 zoom groups

The invention claimed is:

1. An image formation optical system configured to form an image of a reduction-side conjugate surface on a magnification-side conjugate surface, the image formation optical system comprising:

a first optical system including an intermediate image inside and also a first refractive system arranged toward the reduction side of the intermediate image and a second refractive system arranged toward the magnification side of the intermediate image, wherein the first refractive system has a first stop, and the second refractive system has a second stop, wherein lens surfaces are arranged next to and both toward the reduction side and toward the magnification side of the first stop and lens surfaces are arranged next to and both toward the reduction side and toward the magnification side of the second stop, wherein the following Formula (1) through (8) are satisfied:

$$1.5 < Y1\text{-}1 \tag{1};$$

$$1.5 < Y1\text{-}2 \tag{2};$$

$$1.0 < Y2\text{-}1 \tag{3); and}$$

$$0.5 < Y2\text{-}2 \tag{4), where}$$

$$0.5 < Y1\text{-}1/|fW| \tag{5},$$

$$0.5 < Y1\text{-}2/|fw| \tag{6},$$

$$0.3 < Y2\text{-}1/|fw| \tag{7), and}$$

$$0.1 < Y2\text{-}2/|fw| \tag{8), where}$$

Y1-1: the absolute value of the ray height of a principal ray at an outermost angle of view in rays emitted from a lens surface 1 arranged next to and toward the reduction side of the first stop (unit of mm), Y1-2: the absolute value of the ray height of a principal ray at an outermost angle of view in rays entering a lens surface 2 arranged next to and toward the magnification side of the first stop unit of mm), Y2-1: the absolute value of the ray height of a principal ray at an outermost angle of view in rays emitted from a lens surface 3 arranged next to and toward the reduction side of the second stop (unit of mm), Y2-2: the absolute value of the ray height of a principal ray at an outermost angle of view in rays entering a lens surface 4 arranged next to and toward the magnification side of the second stop (unit of mm), and fw: a focal length of the entire system when focusing at closet at wide-angle end.

2. The image formation optical system, as defined in claim 1, wherein the following Formula (14) through (16), and (18) are satisfied:

$$1.0 < \tan\theta_1 \times |fw| < 3.0 \quad (14);$$

$$2.5 < \tan\theta_2 \times |fw| < 6.0 \quad (15);$$

$$1.5 < \tan\theta_2/\tan\theta_1 < 4.0 \quad (16), \text{ and}$$

$$8.0 < Ds2 \times \tan\theta_2 < 30.0 \quad (18), \text{ where}$$

θ1: an incident angle on the first stop of a principal ray at an outermost angle of view,
θ2: an incident angle on the second stop of a principal ray at an outermost angle of view,
fw: a focal length of the entire system when focusing at wide-angle end at closest, and Ds2: D2-1+D2-2.

3. An image formation optical system configured to form an image of a reduction-side conjugate surface on a magnification-side conjugate surface, the image formation optical system comprising:
a first optical system including an intermediate image inside and also a first refractive system arranged toward the reduction side of the intermediate image and a second refractive system arranged toward the magnification side of the intermediate image,
wherein the first refractive system has a first stop, and the second refractive system has a second stop,
wherein lens surfaces are arranged next to and both toward the reduction side and toward the magnification side of the first stop and lens surfaces are arranged next to and both toward the reduction side and toward the magnification side of the second stop,
wherein the following Formula (1) through (4) are satisfied:

$$1.5 < Y1\text{-}1 \quad (1);$$

$$1.5 < Y1\text{-}2 \quad (2);$$

$$1.0 < Y2\text{-}1 \quad (3); \text{ and}$$

$$0.5 < Y2\text{-}2 \quad (4), \text{ where}$$

Y1-1: the absolute value of the ray height of a principal ray at an outermost angle of view in rays emitted from a lens surface 1 arranged next to and toward the reduction side of the first stop (unit of mm),
Y1-2: the absolute value of the ray height of a principal ray at an outermost angle of view in rays entering a lens surface 2 arranged next to and toward the magnification side of the first stop (unit of mm),
Y2-1: the absolute value of the ray height of a principal ray at an outermost angle of view in rays emitted from a lens surface 3 arranged next to and toward the reduction side of the second stop (unit of mm), and
Y2-2: the absolute value of the ray height of a principal ray at an outermost angle of view in rays entering a lens surface 4 arranged next to and toward the magnification side of the second stop (unit of mm),
wherein when two lenses comprising a first adjacent lens arranged next to and toward the reduction side of the first stop and a second adjacent lens arranged next to and toward the reduction side of the first adjacent lens are regarded as a group 1,
two lenses comprising a first adjacent lens arranged next to and toward the magnification side of the first stop and a second adjacent lens arranged next to and toward the magnification side of the first adjacent lens are regarded as a group 2,
two lenses comprising a first adjacent lens arranged next to and toward the reduction side of the second stop and a second adjacent lens arranged next to and toward the reduction side of the first adjacent lens are regarded as a group 3, and
two lenses comprising a first adjacent lens arranged next to and toward the magnification side of the second stop and a second adjacent lens arranged next to and toward the magnification side of the first adjacent lens are regarded as a group 4,
the lenses included in the groups 1, 2, 3 and 4 satisfy the following Formula (25) or (26):

$$40 \leq vd \text{ and } 0.97 < \tau 420 \quad (25); \text{ or}$$

$$vd < 40 \text{ and } 0.90 < \tau 420 \quad (26), \text{ where}$$

vd: Abbe's number of an optical material constituting a lens, and
τ420: an internal transmittance of an optical material having a thickness of 10.0 mm at the wavelength of 420 nm.

4. The image formation optical system, as defined in claim 3, wherein when the Formula (26) is satisfied, the following Formula (27) is satisfied:

$$vd < 40 \text{ and } 0.93 < \tau 420 \quad (27).$$

5. The image formation optical system, as defined in claim 3, wherein when the temperature coefficient of a relative refractive index of the optical material is dn/dt, the lenses in all the lens groups satisfy the following Formula (28):

$$|dn/dt| < 6.5 \quad (28).$$

6. The image formation optical system, as defined in claim 1, comprising:
at least one zoom group configured to move during magnification change,
wherein the at least one zoom group comprises a first zoom group, which has a largest number of lenses among zoom groups arranged toward the reduction side of the stop in the first refractive system and has a positive focal length, and
wherein the first zoom group does not include lens toward the magnification side of the first stop but includes a lens or lenses toward the reduction side of the first stop.

7. The image formation optical system, as defined in claim 6, wherein a fixed group 1 that has a positive focal length and does not move during magnification change is arranged most toward the reduction side in the image formation optical system and wherein the fixed group 1 includes at least one negative lens.

8. The image formation optical system, as defined in claim 6, comprising:
a second zoom group arranged next to and toward the magnification side of the first stop,
wherein the second zoom group comprises a positive lens or lenses.

9. The image formation optical system, as defined in claim 8, wherein the positive lens or lenses constituting the second zoom group comprise a positive meniscus lens or lenses with a concave surface or surfaces directed to the image side.

10. The image formation optical system, as defined in claim 8, wherein the first zoom group and the second zoom group move independently during zooming.

11. The image formation optical system, as defined in claim 6, wherein a last zoom group, which is arranged most toward the magnification side among the zoom groups, includes a negative lens.

12. The image formation optical system, as defined in claim 11, wherein the negative lens is arranged most toward the magnification side in the last zoom group.

13. The image formation optical system, as defined in claim 12, wherein the last zoom group comprises only a negative lens or lenses.

14. The image formation optical system, as defined in claim 13, wherein a fixed group 2 is arranged next to and toward the magnification side of the last zoom group.

15. The image formation optical system, as defined in claim 14, wherein the fixed group 2 includes a negative meniscus aspheric lens.

16. The image formation optical system, as defined in claim 1, comprising:
at least one focus group configured to move during focusing,
wherein the at least one focus group includes a reduction-side focus group arranged in the first refractive system and wherein the at least one focus group includes a magnification-side focus group arranged in the second refractive system.

17. The image formation optical system, as defined in claim 16, wherein the at least one focus group includes an intermediate focus group including a most magnification side lens in the first refractive system and a most reduction side lens in the second refractive system,
wherein an intermediate image is formed inside the middle focus group
wherein in the intermediate focus group, a positive meniscus lens with a convex surface directed to the magnification side is arranged toward the reduction side of the intermediate image, and
a positive meniscus lens with a convex surface directed to the reduction side is arranged toward the magnification side of the intermediate image.

18. The image formation optical system, as defined in claim 17, wherein in the intermediate focus group, a negative meniscus lens is further arranged between a meniscus lens with a convex surface directed to the magnification side and the intermediate image.

19. The image formation optical system, as defined in claim 1, comprising:
at least one focus group configured to move during focusing,
wherein the at least one focus group includes a reduction-side focus group arranged in the first refractive system, and
wherein a last focus group arranged most toward the magnification side is arranged next to and toward the reduction side of the second stop.

20. The image formation optical system, as defined in claim 19, wherein the last focus group comprises three elements of a positive lens, a negative lens and a positive lens.

21. An image formation optical system configured to form an image of a reduction-side conjugate surface on a magnification-side conjugate surface, the image formation optical system comprising:
a first optical system including an intermediate image inside and also a first refractive system arranged toward the reduction side of the intermediate image and a second refractive system arranged toward the magnification side of the intermediate image,
wherein the first refractive system has a first stop, and the second refractive system has a second stop,
wherein lens surfaces are arranged next to and both toward the reduction side and toward the magnification side of the first stop and lens surfaces are arranged next to and both toward the reduction side and toward the magnification side of the second stop,
wherein the following Formula (1) through (4) are satisfied:

$$1.5 < Y1\text{-}1 \quad (1);$$

$$1.5 < Y1\text{-}2 \quad (2);$$

$$1.0 < Y2\text{-}1 \quad (3); \text{ and}$$

$$0.5 < Y2\text{-}2 \quad (4), \text{ where}$$

Y1-1: the absolute value of the ray height of a principal ray at an outermost angle of view in rays emitted from a lens surface 1 arranged next to and toward the reduction side of the first stop (unit of mm), Y1-2: the absolute value of the ray height of a principal ray at an outermost angle of view in rays entering a lens surface 2 arranged next to and toward the magnification side of the first stop (unit of mm), Y2-1: the absolute value of the ray height of a principal ray at an outermost angle of view in rays emitted from a lens surface 3 arranged next to and toward the reduction side of the second stop (unit of mm), and Y2-2: the absolute value of the ray height of a principal ray at an outermost angle of view in rays entering a lens surface 4 arranged next to and toward the magnification side of the second stop (unit of mm), wherein a second optical system including a reflective optical element is arranged toward the magnification side of the first optical system,
wherein the second optical system includes a concave surface mirror, and
wherein the concave surface mirror is arranged toward the magnification side of a second intermediate image formed by an image formation action of the first optical system.

22. The image formation optical system, as defined in any claim 21,
wherein the reflective optical element includes a prism having a solid structure, and which has a total internal reflection surface,
wherein the prism has two reflective surfaces and all incident bundles of rays are transmitted to a next surface at any of the surfaces by total reflection,
wherein the prism is arranged between the first optical system and the concave surface mirror.

23. A projection apparatus comprising:
the image formation optical system, as defined in claim 1; and
an image display element arranged at a reduction-side conjugate surface position of the image formation optical system.

24. An imaging apparatus comprising:
the image formation optical system, as defined in claim 1; and
an imaging element arranged at a reduction-side conjugate surface position of the image formation optical system.

* * * * *